US009183357B2

(12) United States Patent
Harada et al.

(10) Patent No.: US 9,183,357 B2
(45) Date of Patent: Nov. 10, 2015

(54) RECORDING/REPRODUCING SYSTEM, RECORDING MEDIUM DEVICE, AND RECORDING/REPRODUCING DEVICE

(75) Inventors: Shunji Harada, Osaka (JP); Masaya Yamamoto, Osaka (JP); Minehisa Nagata, Osaka (JP); Takahiro Yamaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 604 days.

(21) Appl. No.: 12/744,437
(22) PCT Filed: Sep. 18, 2009
(86) PCT No.: PCT/JP2009/004733
§ 371 (c)(1),
(2), (4) Date: May 24, 2010
(87) PCT Pub. No.: WO2010/035449
PCT Pub. Date: Apr. 1, 2010

(65) Prior Publication Data
US 2010/0275036 A1  Oct. 28, 2010

(30) Foreign Application Priority Data

Sep. 24, 2008 (JP) .................................. 2008-244376
Nov. 19, 2008 (JP) .................................. 2008-295503

(51) Int. Cl.
*G06F 21/10* (2013.01)
*G06F 21/33* (2013.01)
(Continued)

(52) U.S. Cl.
CPC ................ *G06F 21/10* (2013.01); *G06F 21/33* (2013.01); *G06F 21/44* (2013.01); *G06F 21/78* (2013.01);
(Continued)

(58) Field of Classification Search
CPC .......................... G06F 21/10; G06F 2221/2149
USPC ........................................................ 713/175
See application file for complete search history.

(56) References Cited

U.S. PATENT DOCUMENTS 5,392,351 A  2/1995  Hasebe et al.
5,883,960 A  3/1999  Maruyama et al.
(Continued)

FOREIGN PATENT DOCUMENTS

JP    5-257816    10/1993
JP    7-135680     5/1995
(Continued)

OTHER PUBLICATIONS

An Improved Digital Rights Management System Based on Smart Cards; Hung Min Sun et al; 2007 Inaugural IEEE International Conference on Digital Ecosystems and Technologies (IEEE DEST 2007); 2007.*
(Continued)

*Primary Examiner* — James Turchen
(74) *Attorney, Agent, or Firm* — Wenderoth, Lind & Ponack, L.L.P.

(57) ABSTRACT

A memory card and a recording/playback device are provided that are capable of deterring a memory card manufacturer from illicitly storing a same media ID on a plurality of memory cards. A memory card (100) includes a media ID storage module unit (610) and a memory unit (120). The media ID storage module unit (610) includes a media ID storage unit (611) that stores therein a media ID that is specific to the memory card, and a certification unit (609) that generates certification information that certifies the validity of the memory card based on the media ID. The memory unit (120) includes an encrypted content storage unit (122) for storing encrypted digital content. The recording/playback device (200) includes a memory card verification unit (200) that acquires the certification information from the memory card (100), verifies the validity of the memory card (100) based on the acquired certification information, and when the verification has failed, prohibits decrypting an encrypted content or encrypting a content, and a content encryption unit (209) that, when the verification has succeeded, encrypts the digital content or decrypts the encrypted digital content.

25 Claims, 47 Drawing Sheets

(51) Int. Cl.
  *G06F 21/78*    (2013.01)
  *G11B 20/00*    (2006.01)
  *H04N 21/418*   (2011.01)
  *H04N 21/433*   (2011.01)
  *H04N 21/4405*  (2011.01)
  *H04N 21/4408*  (2011.01)
  *H04L 9/08*     (2006.01)
  *H04L 9/14*     (2006.01)
  *H04L 9/32*     (2006.01)
  *G06F 21/44*    (2013.01)

(52) U.S. Cl.
  CPC ...... *G11B 20/0021* (2013.01); *G11B 20/00086* (2013.01); *G11B 20/00115* (2013.01); *H04L 9/0833* (2013.01); *H04L 9/0891* (2013.01); *H04L 9/14* (2013.01); *H04L 9/3263* (2013.01); *H04N 21/4182* (2013.01); *H04N 21/4334* (2013.01); *H04N 21/4405* (2013.01); *H04N 21/4408* (2013.01); *G06F 2221/0711* (2013.01); *G06F 2221/2103* (2013.01); *G06F 2221/2129* (2013.01); *G06F 2221/2149* (2013.01); *G11B 2220/17* (2013.01); *H04L 2209/60* (2013.01)

(56) References Cited

U.S. PATENT DOCUMENTS

| | | | |
|---|---|---|---|
| 5,892,900 A * | 4/1999 | Ginter et al. | 726/26 |
| 6,032,260 A * | 2/2000 | Sasmazel et al. | 726/10 |
| 6,301,660 B1 * | 10/2001 | Benson | 713/165 |
| 6,526,144 B2 * | 2/2003 | Markandey et al. | 380/28 |
| 6,918,036 B1 * | 7/2005 | Drews | 713/176 |
| 7,010,688 B1 * | 3/2006 | Kawasaki | 713/168 |
| 7,124,443 B2 | 10/2006 | Ishibashi et al. | |
| 7,159,244 B2 * | 1/2007 | Matsushima et al. | 726/30 |
| 7,299,358 B2 * | 11/2007 | Chateau et al. | 713/176 |
| 7,565,546 B2 * | 7/2009 | Candelore | 713/182 |
| 7,617,542 B2 * | 11/2009 | Vataja | 726/30 |
| 7,761,926 B2 * | 7/2010 | Asano et al. | 726/30 |
| 8,316,091 B2 * | 11/2012 | Hirvela et al. | 709/206 |
| 8,646,091 B2 * | 2/2014 | O'Connor et al. | 726/26 |
| 2002/0101989 A1 * | 8/2002 | Markandey et al. | 380/210 |
| 2002/0138733 A1 | 9/2002 | Ishibashi et al. | |
| 2004/0158708 A1 * | 8/2004 | Peyravian et al. | 713/156 |
| 2004/0158714 A1 * | 8/2004 | Peyravian et al. | 713/171 |
| 2005/0027991 A1 * | 2/2005 | DiFonzo | 713/185 |
| 2005/0038997 A1 * | 2/2005 | Kojima et al. | 713/165 |
| 2005/0066167 A1 * | 3/2005 | Asano et al. | 713/165 |
| 2005/0086497 A1 * | 4/2005 | Nakayama | 713/185 |
| 2005/0138387 A1 * | 6/2005 | Lam et al. | 713/185 |
| 2006/0072745 A1 * | 4/2006 | Fukaya | 380/28 |
| 2006/0168580 A1 * | 7/2006 | Harada et al. | 717/174 |
| 2006/0235805 A1 * | 10/2006 | Peng et al. | 705/76 |
| 2007/0038871 A1 | 2/2007 | Kahlman et al. | |
| 2007/0136612 A1 * | 6/2007 | Asano et al. | 713/193 |
| 2007/0186286 A1 * | 8/2007 | Shim et al. | 726/26 |
| 2008/0019517 A1 * | 1/2008 | Munguia et al. | 380/210 |
| 2008/0072072 A1 * | 3/2008 | Muraki et al. | 713/193 |
| 2008/0244716 A1 * | 10/2008 | Goto | 726/5 |
| 2009/0031409 A1 * | 1/2009 | Murray | 726/10 |

FOREIGN PATENT DOCUMENTS

| | | |
|---|---|---|
| JP | 11-212454 | 8/1999 |
| JP | 2000-196588 | 7/2000 |
| JP | 2001-119390 | 4/2001 |
| JP | 2001-230768 | 8/2001 |
| JP | 2002-259936 | 9/2002 |
| JP | 2004-46754 | 2/2004 |
| JP | 2004-272893 | 9/2004 |
| JP | 2005-122402 | 5/2005 |
| JP | 2007-509563 | 4/2007 |
| WO | 2006/003711 | 1/2006 |

OTHER PUBLICATIONS

Digital Rights Management in Consumer Electronics Products; Willem Jonker et al.; Mar. 2004; IEEE Signal Processing Magazine.*
International Search Report issued Dec. 8, 2009 in corresponding International Application No. PCT/JP2009/004733.

* cited by examiner

Manufacturer public key certificate/media ID storage module order form

| Card manufacturer ID | 001 |
|---|---|
| Manufacturer public key certificate necessary? | YES |
| Number of media ID storage module units ordered (number of memory cards to be manufactured) | 1,000 |

FIG. 9

Center public key order form  ~840

| Device manufacturer ID | 002 |
| --- | --- |
| Center public key necessary? | Yes |
| Number of recording/playback apparatuses to be manufactured | 1,000 |

FIG. 17

Media ID storage module order form ~850

| Card manufacturer ID | 001 |
|---|---|
| Number of media ID storage module units ordered (number of memory cards to be manufactured) | 1,000 |

FIG. 19

Encrypted media key group — 860

| Card device key ID=1 | AES_E (Card device key 1, media key) |
| Card device key ID=2 | AES_E (Card device key 2, media key) |
| | |
| Card device key ID=N | AES_E (Card device key N, media key) |
| Apparatus device key ID=1 | AES_E (Apparatus device key 1, media key) |
| Apparatus device key ID=2 | AES_E (Apparatus device key 2, media key) |
| | |
| Apparatus device key ID=M | AES_E (Apparatus device key M, media key) |

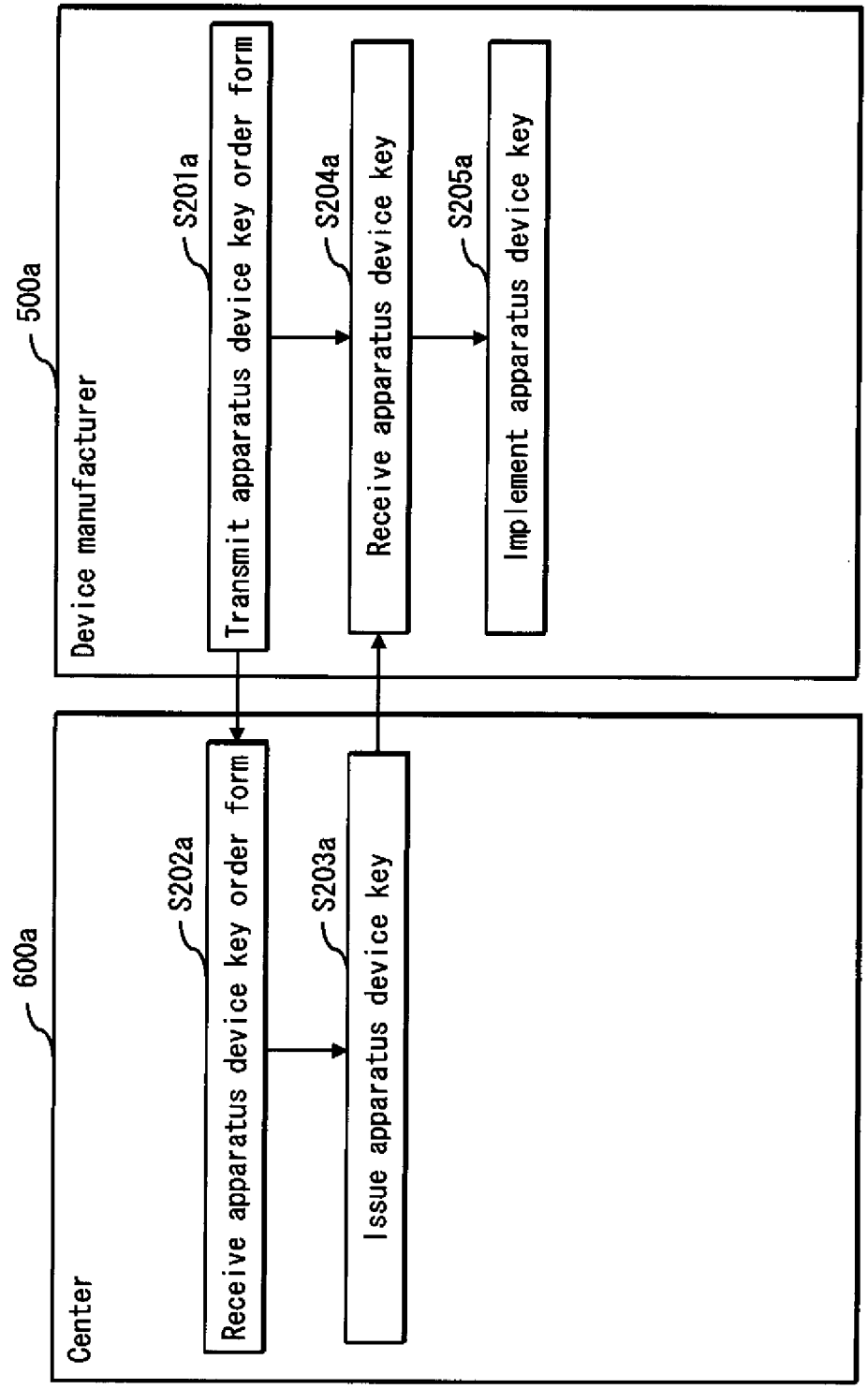

FIG. 21

Apparatus device key order form ~870

| Device manufacturer ID | 002 |
|---|---|
| Number of apparatus device keys ordered (number of recording/playback apparatuses to be manufactured) | 1,000 |
| Encrypted media key group necessary? | Yes |

FIG. 33

Controller key information 1810

| Vendor ID | Controller key identification information (lot number) | Controller key |
|---|---|---|
| 001 | 003 | Kc001-003 |
| 002 | 001 | Kc002-001 |
| 002 | 002 | Kc002-002 |
| 003 | 001 | Kc003-001 |

FIG. 34

Controller order form 1820

| Card manufacturer ID | 001 |
|---|---|
| Number of controllers ordered (number of memory cards to be manufactured) | 10,000 |

FIG. 35

Card device key order form — 1830

| Card manufacturer ID | 001 |
|---|---|
| Vendor ID | 002 |
| Controller key identification information (lot number) | 001 |
| Number of card device keys ordered (number of memory cards to be manufactured) | 1,000 |
| Encrypted media key group necessary? | Yes |

| Encrypted media key group | |
|---|---|
| Card device key ID=1 | AES_E (Card device key 1, media key) |
| Card device key ID=2 | AES_E (Card device key 2, media key) |
| Card device key ID=N | AES_E (Card device key N, media key) |
| Apparatus device key ID=1 | AES_E (Apparatus device key 1, media key) |
| Apparatus device key ID=2 | AES_E (Apparatus device key 2, media key) |
| Apparatus device key ID=M | AES_E (Apparatus device key M, media key) |

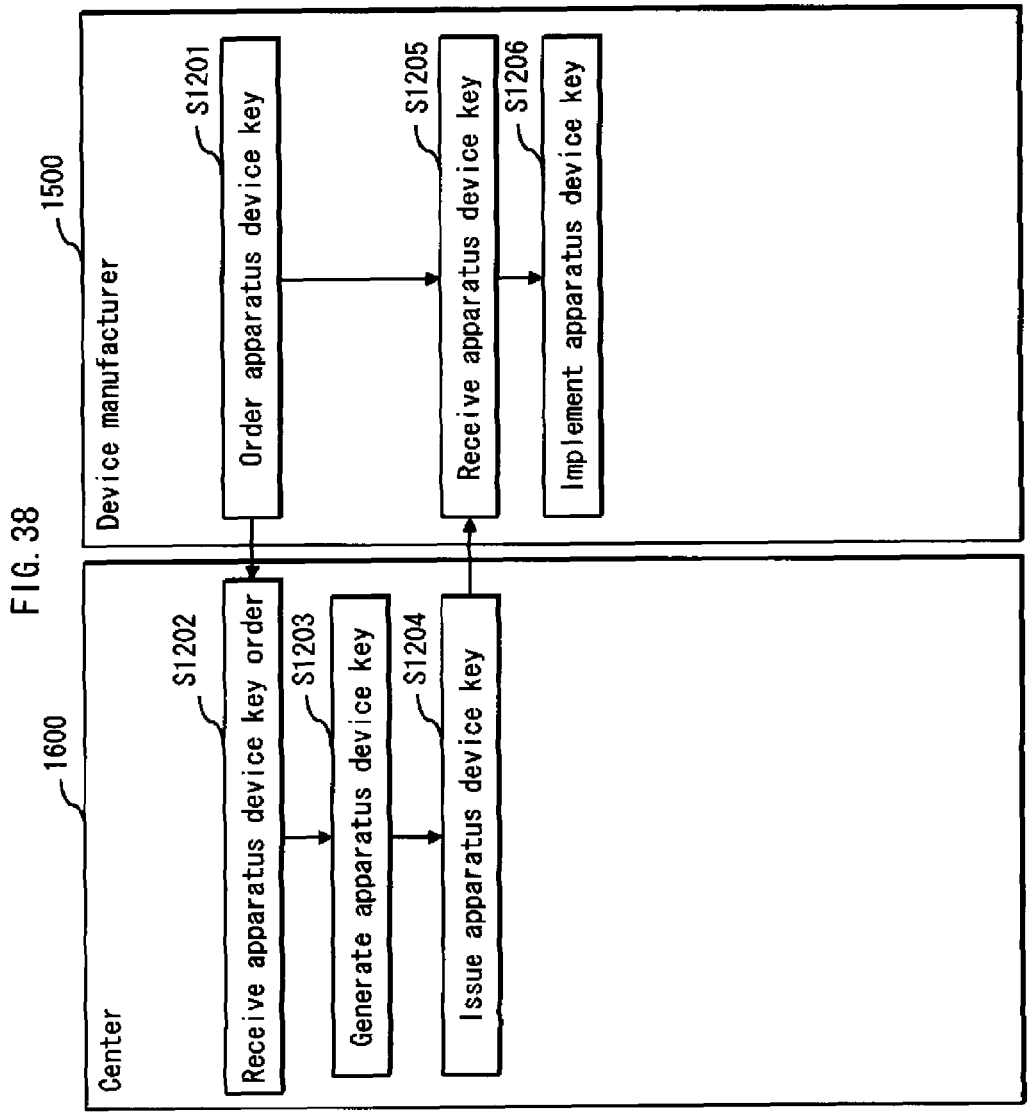

FIG. 39

Apparatus device key order form  ~1850

| Device manufacturer ID | 002 |
|---|---|
| Number of apparatus device keys ordered (number of recording/playback apparatuses to be manufactured) | 1,000 |
| Encrypted media key group necessary? | Yes |

FIG. 47

Card device key/encrypted media key group order form ↙ 855

| Card manufacturer ID | 001 |
| --- | --- |
| Number of card device keys ordered (number of memory cards to be manufactured) | 1,000 |
| Encrypted media key group necessary? | YES |

RECORDING/REPRODUCING SYSTEM, RECORDING MEDIUM DEVICE, AND RECORDING/REPRODUCING DEVICE

TECHNICAL FIELD

The present invention relates to technology for preventing unauthorized use of digital contents.

BACKGROUND ART

Recording/playback devices that record digitally broadcast digital contents on a recording medium, for example, a recordable DVD (Digital Versatile Disk), a memory card, etc., have become common. Specific examples of recording/playback devices include DVD recorders, mobile telephones supporting 1 segment broadcasting video recording, etc. Also, services for digitally distributing digital contents such as movies or music to a recording device over a network, and recording the digital contents on a recording medium with use of the recording device have become common. Specific examples of recording devices include KIOSK terminals, personal computers, etc. Furthermore, digital content distribution services for digitally distributing digital contents over a network to playback devices that play back the digital contents have become common. Specific examples of playback devices include music players, mobile phone terminals for displaying movies, etc.

In this case, technology to prevent a digital content from being copied to another recording medium and played back after the digital content has already been recorded on a recording medium once is necessary for protecting rights of copyright holders of digital contents.

According to patent literature 1, a unique medium-specific number that is specific to the recording medium and cannot be rewritten is stored on the recording medium. An apparatus that grants permission generates a medium-specific key according to the medium-specific number of the recording medium, encrypts, with use of this medium-specific key, a decryption key for decrypting the encrypted data, and writes the encrypted decryption key in the recording medium as permission information. A user apparatus reads the medium-specific number from the recording medium and generates a medium-specific key according to the read medium-specific number. Next, the original decryption key is generated by decrypting the encrypted decryption key that is the permission information with use of the medium-specific key. Then, the user apparatus decrypts the encrypted data with use of the decryption key to generate plain text electronic data.

According to this technology, even if a user copies encrypted data and permission data from an authorized recording medium to an unauthorized recording medium and attempts to decrypt the encrypted data from the unauthorized recording medium, the medium-specific number of the authorized recording medium cannot be copied to the unauthorized recording medium. Accordingly, the user cannot acquire the medium-specific number from the unauthorized recording medium, and the encrypted decryption key that is the permission information cannot be correctly decrypted. As a result, the user cannot correctly decrypt the encrypted data.

RELATED ART DOCUMENTS

Patent Literature

Patent Literature 1: Japanese Patent Application Publication No. H05-257816

SUMMARY OF INVENTION

Technical Problem

Here, suppose that a manufacturer of memory cards (hereinafter referred to as a "card manufacturer") stores an identical media ID on each of a plurality of memory cards. That is to say, assume that an identical media ID is stored by the card manufacturer on a first memory card and a second memory card. Also, assume that authorized encrypted content is stored on the first memory card. This encrypted content has been generated by encrypting a content using a content key generated based on the media ID.

In this case, assume that the encrypted content stored on the first memory card is illicitly copied to the second memory card. To illicitly play back the encrypted content copied on the second memory card, the media ID is acquired from the second memory card, and a content key is generated based on the acquired media key. The media ID stored on the second memory card is identical to the media ID stored on the first memory card. Accordingly, the content key generated according to the media ID of the second memory card is identical to the content key generated according to the media ID of the first memory card. Accordingly, when an attempt is made to decrypt the encrypted content copied to the second memory card with use of the generated content key, the decryption can be correctly performed.

When a card manufacturer performs the illicit action of storing an identical media ID on a plurality of memory cards in this way, the conventional technology cannot protect the rights of the copyright holders of the digital contents.

To solve the above problem, the present invention aims to provide a recording/playback system, a recording medium device, a recording/playback device, a method and a program capable of deterring the illicit action of storing one piece of identification information identifying one recording medium device on a plurality of recording medium devices.

Solution to the Problem

In order to solve the above problems, one aspect of the present invention is a recording-playback system including a recording medium device and a recording-playback device, wherein the recording medium device includes a tamper-resistant unit and a memory unit, the tamper-resistant unit includes an identification information storage subunit that stores therein identification information specific to the tamper-resistant unit, and a certification subunit operable to generate certification information that certifies validity of the recording medium device according to the identification information, and to output the generated certification information, the memory unit includes an encrypted content storage subunit for storing therein an encrypted digital content, the recording-playback device includes a verification unit operable to acquire the certification information from the recording medium device, verify the validity of the recording medium device according to the acquired certification information, and when the verification has failed, prohibit decrypting the encrypted digital content or encrypting a digital content, and a content encryption-decryption unit operable, when the verification has succeeded, to encrypt, according to the identification information, the digital content and record the encrypted digital content in the encrypted content storage subunit, or to decrypt the encrypted digital content read from the encrypted content storage subunit according to the identification information.

Effects of the Invention

According to the recording/playback system of the present invention, a verification unit of a recording/playback device verifies the validity of the recording medium device with use of certification information generated by a certification unit according to identification information stored in a tamper-resistant unit of the recording device. When the verification has failed, decryption of encrypted content and encryption of content is prohibited. When the verification has succeeded, encryption of digital content and decryption of encrypted digital content is permitted.

For this reason, even if a manufacturer of recording medium devices illicitly replicates identification information of a recording medium device on a plurality of recording medium devices, the manufacturer cannot replicate the tamper-resistant unit in the unauthorized recording medium device. According to this structure, the recording medium device cannot output certification information according to the identification information, and therefore authentication with the authorized recording/playback device fails.

Accordingly, even when a manufacturer of recording medium devices illicitly duplicates identification information, the digital content cannot be encrypted, and encrypted digital content cannot be decrypted. By doing this, an effect is achieved of enabling preventing illicit actions by manufacturers of recording medium devices.

BRIEF DESCRIPTION OF DRAWINGS

FIG. 4 shows an exemplary manufacturer public key certificate/media ID storage module order form 810 according to embodiment 1;

FIG. 9 shows an exemplary center public key order form 840 according to embodiment 1;

FIG. 17 shows an exemplary media ID storage module order form 850 according to embodiment 2;

FIG. 19 shows a data structure of an encrypted media key group 860 according to embodiment 2;

FIG. 20 is a flowchart showing operations of the center 600a and the device manufacturer 500a according to embodiment 2;

FIG. 21 shows an exemplary data structure of an apparatus device key order form 870 according to embodiment 2;

FIG. 33 shows an exemplary data structure of controller key information 1810 managed by the center 1600 according to embodiment 3;

FIG. 34 shows an exemplary data structure of a controller order form 1820 according to embodiment 3;

FIG. 35 shows an exemplary data structure of a card device key order form 1830 according to embodiment 3;

FIG. 37 shows an exemplary data structure of an encrypted media key group 1840 according to embodiment 3;

FIG. 38 shows a flowchart of operations of a center 1600 and a device manufacturer 1500 according to embodiment 3;

FIG. 39 shows an exemplary data structure of an apparatus device key order form 1850 according to embodiment 3;

FIG. 47 shows an exemplary card device key/encrypted media key group order form 855 according to embodiment 2.

DESCRIPTION OF EMBODIMENTS

Figure 1:
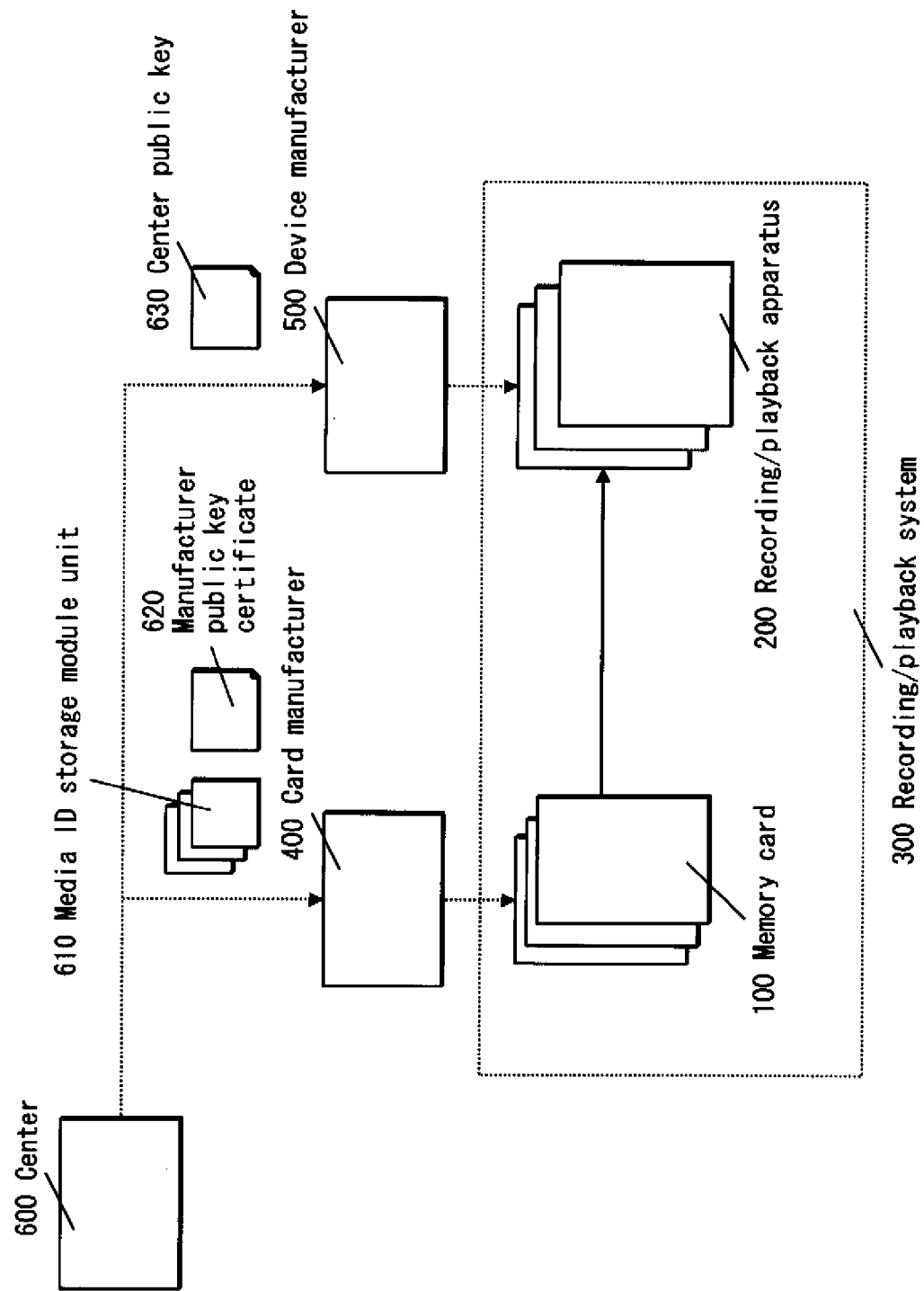
FIG. 1 shows an overall structure of a recording/playback system 300, a center 600, a card manufacturer 400 and a device manufacturer 500 according to embodiment 1.

A recording/playback system according to a first aspect of the present invention includes a recording medium device and a recording-playback device, wherein the recording medium device includes a tamper-resistant unit and a memory unit, the tamper-resistant unit includes an identification information storage subunit that stores therein identification information specific to the tamper-resistant unit, and a certification subunit operable to generate certification information that certifies validity of the recording medium device according to the identification information, and to output the generated certification information, the memory unit includes an encrypted content storage subunit for storing therein an encrypted digital content, the recording-playback device includes a verification unit operable to acquire the certification information from the recording medium device, verify the validity of the recording medium device according to the acquired certification information, and when the verification has failed, prohibit decrypting the encrypted digital content or encrypting a digital content, and a content encryption-decryption unit operable, when the verification has succeeded, to encrypt, according to the identification information, the digital content and record the encrypted digital content in the encrypted content storage subunit, or to decrypt the encrypted digital content read from the encrypted content storage subunit according to the identification information.

In the recording/playback system according to a second aspect of the present invention, the memory unit may further include an encrypted device key storage subunit that stores therein an encrypted device key, and an encrypted media key group storage subunit that stores therein an encrypted media key group, wherein the encrypted device key has been generated by encrypting, with use of a controller key, a device key specific to the recording medium device, the encrypted media key group includes a plurality of encrypted media keys that have been generated by encrypting one media key with use of the device key of the recording medium device or another recording medium device, and a device key of the recording-playback device or another recording-playback device, respectively, the tamper-resistant unit is a controller that is a semiconductor device, the certification subunit further includes a controller key storage subunit that stores therein a controller key that is specific to the controller, or is specific to a predetermined number of controllers as a set, a decryption subunit operable to decrypt the encrypted device key acquired from the encrypted device key storage subunit with use of the controller key stored in the controller key storage unit, a first media key generation subunit operable to generate a media key according to the device key generated by the decryption subunit and the encrypted media key group stored in the encrypted media key group storage subunit, and a first medium-specific key generation subunit operable to generate a medium-specific key according to the media key generated by the first media key generation subunit and the identification information stored in the identification information storage subunit, the verification unit includes a device key storage subunit that stores therein a device key specific to the recording-playback device, a second media key generation subunit operable to generate a media key according to the device key stored in the device key storage unit and the encrypted media key group acquired from the encrypted media key group storage subunit, and a second medium-specific key generation subunit operable to generate a medium-specific key according to the media key generated by the second media key generation subunit and the identification information acquired from the recording medium device, the certification subunit generates the certification information with use of the medium-specific key generated by the first medium-specific key generation subunit, and the verification unit verifies the validity of the recording medium device according to the certification information, with use of the medium-specific key generated by the second medium-specific key generation subunit.

According to this structure, since the tamper-resistant unit of the recording medium device includes a certification subunit, and the certification subunit includes a controller key storage subunit, a decryption subunit, a first media key generation subunit, and a first medium-specific key generation subunit, even if a manufacturer of recording medium devices illicitly duplicates identification information of the recording medium device in a plurality of recording medium devices, the manufacturer cannot duplicate the tamper-resistant unit in the unauthorized recording medium device, and the recording medium device is not capable of outputting certification information according to the identification information, and fails in authentication with the authorized recording/playback apparatus. This enables deterring illicit actions by the manufacturers of recording medium devices.

In a recording/playback system according to a third aspect of the present invention, the memory unit may further include an encrypted media key group storage subunit that stores therein an encrypted media key group, wherein the encrypted media key group includes a plurality of encrypted media keys that have been generated by encrypting one media key with use of a device key of the recording medium device and a device key of the recording-playback device, respectively, the certification subunit further includes a first device key storage subunit that stores a device key specific to the tamper-resistant unit, a first media key generation subunit operable to generate a media key according to the device key obtained by the decryption subunit and the encrypted media key group stored in the encrypted media key group storage subunit, and a first medium-specific key generation subunit operable to generate a medium-specific key according to the media key generated by the first media key generation subunit and the identification information stored in the identification information storage subunit, the verification unit further includes a second device key storage subunit that stores therein a device key specific to the recording-playback device, a second media key generation subunit operable to generate a media key according to the device key stored in the device key storage unit and the encrypted media key group acquired from the encrypted media key group storage subunit, and a second medium-specific key generation subunit operable to generate a medium-specific key according to the media key generated by the second media key generation subunit and the identification information acquired from the recording medium device, the certification subunit generates the certification information with use of the medium-specific key generated by the first medium-specific key generation subunit, and the verification unit verifies the validity of the recording medium device according to the certification information, with use of the medium-specific key generated by the second medium-specific key generation subunit.

According to this structure, since the tamper-resistant unit of the recording medium device includes the certification subunit, and the certification subunit includes the first device key storage subunit, the first media key generation subunit and the first medium-specific key generation unit, even if a manufacturer of recording medium devices illicitly duplicates identification information of the recording medium device in a plurality of recording medium devices, the manufacturer cannot duplicate the tamper-resistant unit in the unauthorized recording medium device, and the recording medium device is not capable of outputting certification information according to the identification information, and fails in authentication with the authorized recording/playback apparatus. This enables deterring illicit actions by the manufacturers of recording medium devices.

In a recording/playback system according to a fourth aspect of the present invention, the certification subunit may further include a manufacturer private key storage subunit that stores therein a manufacturer private key specific to the manufacturer of the recording medium device, and a signature generation subunit operable to receive a random number from the verification unit of the recording-playback device, and to generate digital signature data in correspondence with the received random number and the identification information stored in the identification information storage subunit, with use of the manufacturer private key, the memory unit further includes a manufacturer public key certificate storage unit that stores therein a manufacturer public key certificate issued by a reliable center to the manufacturer public key corresponding to the manufacturer private key, with use of a center private key of the center, the verification unit further includes a random number generation subunit operable to generate the random number and transmit the generated random number to the recording medium device, a center public key storage subunit that stores therein a center public key corresponding to the center private key of the center, a first signature verification subunit operable to verify the validity of the manufacturer public key included in the manufacturer public key certificate received from the recording medium device, and a second signature verification subunit operable to verify the validity of the recording medium device by verifying the validity of the digital signature data received from the recording medium device.

According to this structure, since the tamper-resistant unit of the recording medium apparatus includes the certification subunit, and the certification subunit includes a manufacturer private key storage subunit and a signature generation subunit, even if a manufacturer of recording medium devices illicitly duplicates identification information of the recording medium device in a plurality of recording medium devices, the manufacturer cannot duplicate the tamper-resistant unit in the unauthorized recording medium device, and the recording medium device is not capable of outputting certification information according to the identification information, and fails in authentication with the authorized recording/playback apparatus. This enables deterring illicit actions by the manufacturers of recording medium devices.

In a recording/playback system according to a fifth aspect of the present invention, the certification subunit may further include a first medium-specific key generation subunit that generates a medium-specific key of the tamper-resistant unit with use of the identification information, and a certification generation subunit that generates, with use of the medium-specific key as a key, the certification information as response data according to challenge data from the recording-playback device, and outputs the generated certification information as the response data, the verification unit includes a second medium-specific key generation subunit operable to generate a medium-specific key that is identical to the medium-specific key, with use of the identification information of the recording medium device, and a verification subunit operable to generate and output the challenge data, and to verify the validity of the recording medium device with use of the certification information as the response data acquired from the recording medium device and the challenge data.

In a recording/playback system according to a sixth aspect of the present invention, the certification subunit may further include a first media key generation subunit operable to generate a media key, the first medium-specific key generation subunit is operable to generate a medium-specific key with use of the identification information and the generated media key, the verification unit further includes a second media key generation subunit operable to generate a media key that is identical to the media key generated by the first media key generation subunit, and the second medium-specific key generation subunit generates the medium-specific key with use of the identification information and the generated media key.

In a recording/playback system according to a seventh aspect of the present invention, the certification subunit may further include a manufacturing private key storage subunit that stores therein a manufacturer private key of a manufacturer of the recording medium device, and a signature generation subunit operable to acquire the identification information from the identification information storage subunit, and generate signature data as the certification information by digitally signing the acquired identification information with use of the manufacturer private key, the verification unit includes a manufacturer public key storage subunit that stores therein a manufacturer public key of a manufacturer of the recording medium device, and a signature verification subunit operable to acquire the signature data, as the certification information, from the recording medium device, digitally sign the signature data as the acquired certification information with use of the manufacturer public key, if the verification has failed, prohibit decrypting encrypted content or encrypting the content, and if the verification has succeeded, acquire the identification information from the signature data, and the content encryption-decryption unit is operable to, if the verification has succeeded, encrypt the digital content according to the acquired identification information, or decrypt the encrypted digital content.

A recording medium device according to an eighth aspect of the present invention is a recording medium device for storing encrypted digital content including a tamper-resistant unit, and a memory unit, wherein the tamper-resistant unit includes an identification information storage subunit that stores therein identification information specific to the tamper-resistant unit, and a certification subunit operable to generate certification information that certifies the validity of the recording medium device according to the identification information, and to output the generated certification information, and the memory unit includes an encrypted content storage subunit for storing therein encrypted digital content.

In a recording medium device according to a ninth aspect of the present invention, the certification subunit may include a first medium-specific key generation subunit operable to generate a medium-specific key with use of the identification information, and a certification generation subunit operable to generate the certification information, as the response data, according to the challenge data from the recording-playback device, with use of the medium-specific key as a key, and to output the generated certification information as the response data.

In a recording medium device according to a tenth aspect of the present invention, the certification subunit may further include a first media key generation subunit operable to generate a media key, and the first medium-specific key generation subunit may generate a medium-specific key with use of the identification information and the generated media key.

In a recording medium device according to an eleventh aspect of the present invention, the memory unit may further include an encrypted media key group storage subunit that stores therein an encrypted media key group, the encrypted media key group may include a plurality of encrypted media keys, the plurality of encrypted media keys may correspond to a plurality of devices, and have been generated by encrypting the media key of the recording medium device with use of device keys allocated to each device, respectively, the certification subunit further includes a device key storage subunit that stores therein a device key allocated to the recording medium device, and the first media key generation subunit may specify an encrypted media key of the recording medium device from among the encrypted media key group stored in the encrypted media key group storage subunit, and encrypt the specified encrypted media key with use of the device key to generate the media key.

In a recording medium device according to a twelfth aspect of the present invention, the tamper-resistant unit may be a controller that is a semiconductor device, the memory unit may further include an encrypted device key storage subunit that stores therein the encrypted device key, the certification subunit may further include a controller key storage subunit that stores therein a controller key allocated to the tamper-resistant unit that is the controller, and a decryption subunit that decrypts the encrypted device key stored in the encrypted device key storage unit with use of the controller key, thus generating the device key.

In a recording medium device according to a thirteenth aspect of the present invention, the memory unit may further include an encrypted device key storage unit that stores therein the encrypted device key, the certification subunit may further include a specific key generation subunit operable to generate a specific key that is specific to the tamper-resistant area, and a decryption subunit that decrypts the encrypted device key stored in the encrypted device key storage unit to generate the device key.

In a recording medium device according to a fourteenth aspect of the present invention, the certification subunit may include a manufacturer private key storage subunit that stores therein a manufacturer private key of a manufacturer of the recording medium device, and a signature generation subunit that acquires the identification information from the identification information storage subunit and digitally signs the acquired identification information with use of the manufacturer private key, thereby generating signature data as the certification information.

In a recording medium device according to a fifteenth aspect of the present invention, the signature generation subunit may acquire a random number from the recording-playback device, and digitally sign a concatenation of the acquired identification information and the acquired random number.

In a recording medium device according to a sixteenth aspect of the present invention, the memory unit of the recording medium device may further include a manufacturer public key certificate storage subunit that stores therein a manufacturer public key certificate issued from a reliable center, with use of a center private key of the center, to a manufacturer public key corresponding to the manufacturer private key.

A recording/playback device according to a seventeenth aspect of the present invention is capable of decrypting an encrypted content and encrypting a content, and includes a verification unit operable to acquire certification information, that certifies the validity of the recording medium device according to the identification information, from the recording medium device, verify the validity of the recording medium device, and when the verification has failed, prohibit decrypting encrypted content or encrypting the content; and a content encryption-decryption unit operable to, when the verification has failed, encrypt the digital content and record the encrypted digital content in the recording medium device according to the identification information, or to decrypt encrypted digital content read from the recording medium device.

In a recording/playback device according to an eighteenth aspect of the present invention, the recording medium device may include a tamper-resistant unit and a memory unit, the recording medium device may generate a medium-specific key, generate the certification information as response data to challenge data from the recording-playback device with use of the medium-specific key as a key, and output the certification information, the verification unit may include a second medium-specific key generation subunit operable to generate an identical medium-specific key as the medium-specific key generated by the recording medium device, with use of the identification information of the recording medium device, and a verification subunit operable to generate and output the challenge data, and to verify the validity of the recording medium device with use of the certification information acquired from the recording medium device as response data, and the challenge data.

In a recording/playback device according to a nineteenth aspect of the present invention, the recording medium device may further generate a media key, and generate a medium-specific key with use of the identification information and the generated media key, the verification unit may further include a second media key generation subunit that generates a media key that is identical to the media key generated by the recording medium device, and the second medium-specific key generation subunit may generate the medium-specific key with use of the identification information and the generated media key.

In a recording/playback device according to a twentieth aspect of the present invention, the memory unit of the recording medium device may further include an encrypted media key group storage subunit that stores therein an encrypted media key group, the encrypted media key group may include a plurality of encrypted media keys, the plurality of encrypted media keys correspond to a plurality of devices, and have been generated by encrypting the media key of the recording medium device with use of device keys allocated to each device, respectively, the verification unit further includes a device key storage subunit that stores therein a device key allocated to the recording-playback device, and the second media key generation subunit specifies an encrypted media key of the recording-playback device from among the encrypted media key group stored in the encrypted media key group storage subunit, and decrypts the specified encrypted media key with use of the device key to generate the media key.

In a recording/playback device according to a twenty-first aspect of the present invention, the verification unit may include a manufacturer public key storage subunit that stores therein a manufacturer public key of a manufacturer of the recording medium device, and a signature verification subunit operable to acquire signature data generated as the certification information by digitally signing the identification information with use of the manufacturer private key of the manufacturer of the recording medium device, digitally sign the signature data as the acquired certification information with use of the manufacturer public key, when the verification has failed, prohibit decrypting encrypted content or encrypting the content, and when the verification has succeeded, acquire the identification information from the signature data, and the content encryption-decryption unit is operable to, when the verification has succeeded, encrypt the digital content according to the acquired identification information, or decrypt the encrypted digital content.

In a recording/playback device according to a twenty-second aspect of the present invention, the verification unit of the recording-playback device may further include a random number generation subunit operable to generate a random number and transmit the random number to the recording medium device, and the verification unit may acquire the signature data generated by digitally signing a concatenation of the identification information and the random number, and verify the validity of the recording medium device according to the concatenation of the acquired certification information and the generated random number.

In a recording/playback device according to a twenty-third aspect of the present invention, the verification unit may further include a center public key storage subunit that stores therein a center public key corresponding to a center private key of a reliable center, and a signature verification subunit that, with use of the center public key of the center public key storage unit, verifies the validity of the manufacturer public key included in the manufacturer public key certificate received from the recording medium device.

A recording/playback method according to a twenty-fourth aspect of the present invention is a recording-playback method used by a recording-playback device that decrypts encrypted content and encrypts content, wherein a recording medium device includes a tamper-resistant unit and a memory unit, the tamper-resistant unit includes an identification information storage subunit that stores therein identification information specific to the tamper-resistant unit, and a certification subunit operable to generate certification information that certifies validity of the recording medium device according to the identification information, and to output the generated certification information, the memory unit includes an encrypted content storage subunit for storing therein encrypted digital content, the recording-playback method includes the steps of acquiring the certification information from the recording medium device, verifying the validity of the recording medium device, and when the verification has failed, prohibiting decrypting encrypted content or encrypting the content, and when the verification has succeeded, encrypting the digital content and recording the encrypted digital content in the encrypted content storage subunit according to the identification information, or decrypting encrypted digital content read from the encrypted content storage subunit.

A computer program according to a twenty-fifth aspect of the present invention is a computer program for recording and playback used in a recording-playback device capable of decrypting an encrypted content or encrypting a content, wherein a recording medium device includes a tamper-resistant unit and a memory unit, the tamper-resistant unit includes an identification information storage subunit that stores therein identification information specific to the tamper-resistant unit, and a certification subunit operable to generate certification information that certifies validity of the recording medium device according to the identification information, and to output the generated certification information, the memory unit includes an encrypted content storage subunit for storing therein an encrypted digital content, the computer program causes execution of the following steps by a computer, acquiring the certification information from the recording medium device, verifying the validity of the recording medium device according to the acquired certification information, and when the verification has failed, prohibiting decrypting the encrypted digital content or encrypting a digital content, and if the verification has succeeded, encrypting the digital content and recording the encrypted digital content in the encrypted content storage subunit according to the identification information, or decrypting the encrypted digital content read from the encrypted content storage subunit according to the identification information.

In a computer program according to a twenty-sixth aspect of the present invention, the computer program may be recorded on a computer-readable recording medium.

In an integrated circuit according to a twenty-seventh aspect of the present invention, a recording medium device includes a tamper-resistant unit and a memory unit, the tamper-resistant unit includes an identification information storage subunit that stores therein identification information specific to the tamper-resistant unit, and a certification subunit operable to generate certification information that certifies validity of the recording medium device according to the identification information, and to output the generated certification information, the memory unit includes an encrypted content storage subunit for storing therein an encrypted digital content, the integrated circuit includes a verification unit operable to acquire the certification information from the recording medium device, verify the validity of the recording medium device according to the acquired certification information, and when the verification has failed, prohibit decrypting the encrypted digital content or encrypting a digital content, and a content encryption-decryption unit operable, if the verification has succeeded, to encrypt the digital content and record the encrypted digital content in the encrypted content storage subunit according to the identification information, or to decrypt the encrypted digital content read from the encrypted content storage subunit according to the identification information.

A manufacturing method according to a twenty-eighth aspect of the present invention is a manufacturing method for manufacturing a finished controller, to be incorporated in a recording medium device, out of a semifinished controller, wherein the semifinished controller is a tamper-resistant semiconductor device, and includes an identification information storage unit, and a certification unit operable to generate certification information that certifies validity of the controller according to identification information to be stored in the identification information storage unit, and to output the generated certification information, the certification unit includes a controller key storage subunit, a decryption subunit operable to decrypt the encrypted device key with use of a controller key to be stored in the controller key storage unit, a first media key generation subunit operable to generate a media key according to the device key generated by the decryption unit and the encrypted media key group, a first medium-specific key generation subunit operable to generate a medium-specific key according to the media key generated by the first media key generation subunit and the identification information stored in the identification information storage unit, and a certification generation subunit operable to generate the certification information with use of the medium-specific key generated by the first medium-specific key generation subunit, the manufacturing method including the steps of: (a) a computer of a controller vendor generating identification information specific to the controller targeted for manufacture, (b) the computer of the controller vendor generating the controller key that is specific to the controller or specific to a set of a predetermined number of controllers, (c) an implementation unit of the controller vendor storing the generated identification information in the identification information storage unit, and (d) the implementation unit of the controller vendor storing the generated controller key in the controller key storage unit.

A manufacturing method according to a twenty-ninth aspect of the present invention is a manufacturing method for a recording medium device including the controller manufactured according to the manufacturing method of claim 28, comprising the steps of: (e) the computer of the controller vendor transmitting a vendor ID that identifies the controller vendor, controller key identification information that identifies the controller key, and the controller key to a center that is a key issuing authority, (f) the computer of the center receiving the vendor ID, the controller key identification information and the controller key, (g) the computer of the center storing the received vendor ID, the received controller key identification information and the received controller key in the storage unit of the computer of the center, (h) the computer of the recording medium device manufacturer transmitting order information for the controller to the controller vendor, (i) the computer of the controller vendor receiving the order information for the controller, (j) the controller vendor issuing the controller to the recording medium device manufacturer, (k) the computer of the controller vendor issuing the controller vendor ID, and the controller key identification information of the controller key stored in the controller to the recording medium device manufacturer, (l) the recording medium device manufacturer receiving the controller from the controller vendor, (m) the computer of the recording medium device manufacturer receiving the vendor ID and the controller key identification information from the controller vendor, (n) a mounting device of the recording medium device manufacturer implements the received controller in the recording medium device, (o) the computer of the recording medium device transmitting card device key order information including the vendor ID received from the controller and the controller key identification information received from the controller to the center, (p) the computer of the center receiving the card device key order information from the recording medium device manufacturer, (q) the computer of the center generating a device key according to the card device key order information, (r) the computer of the center acquiring the vendor ID from the storage unit, and acquiring the controller key corresponding to the controller key identification information, from the storage unit, and encrypting the generated device key with use of the acquired controller key, thereby generating the encrypted device key, (s) the computer of the center generating the encrypted media key group by encrypting the media key with device keys of a plurality of recording medium devices, or with device keys of a plurality of recording-playback devices respectively, (t) the computer of the center issuing the generated encrypted device key and the encrypted media key group to the recording medium device manufacturer, (u) the computer of the manufacturer of the recording medium device receiving the encrypted device key and the encrypted media key group from the computer of the manufacturer of the recording medium device, and (v) the implementation unit of the manufacturer of the recording medium device storing the encrypted card device key and the encrypted media key group received from the center in the encrypted card device key storage unit and the encrypted media key group storage subunit of the memory of the recording medium device.

1. Embodiment 1

The following describes embodiment 1 of the present invention with reference to the drawings.

1.1 Overall Structure

FIG. 1 shows overall relationships between a recording/playback system 300 according to embodiment 1 of the present invention, and a card manufacturer 400, a device manufacturer 500, and a center (key issuing authority) 600 pertaining to manufacture of the recording/playback system. The recording/playback system 300 is constituted from a plurality of memory cards 100, . . . and a plurality of recording/playback devices 200, . . . . Note that the card manufacturer 400, the device manufacturer 500, and the center 600 represent devices that respectively include a card manufacturer, a device manufacturer, and a center.

Here, the center 600 issues a media ID storage module unit 610, . . . and a manufacturer public key certificate 620, which are necessary for manufacturing a memory card 100, to the card manufacturer 400 which has been licensed to manufacture the memory card 100. Also, the center 600 issues, to the device manufacturer 500 which has been licensed to manufacture the recording/playback device 200, a center public key 630 necessary for manufacturing the recording/playback device 200. The media ID storage module unit 610, the manufacturer public key certificate 620, and the center public key 630 are described in detail later.

The card manufacturer 400 manufactures a plurality of memory cards 100, . . . , and implements the media ID storage module unit 610 and the manufacturer public key certificate 620 received from the center 600 in the memory cards 100, . . . .

The device manufacturer 500 implements the center public key 630 received from the center 600 in the recording/playback device 200.

1.2 Structure of Center 600, Card Manufacturer 400, and Device Manufacturer 500

Figure 2:
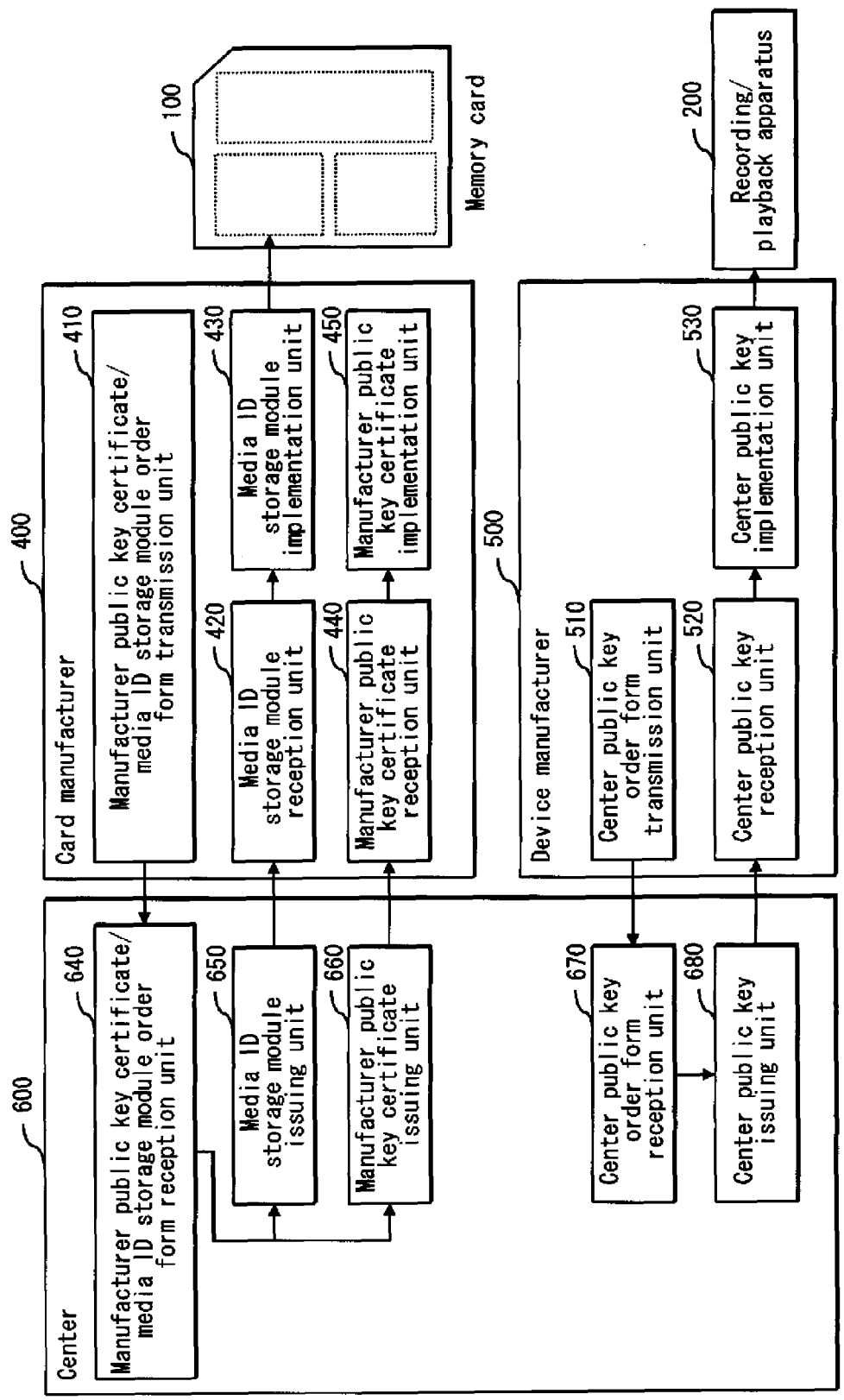
FIG. 2 shows structures of the center 600, the card manufacturer 400 and the device manufacturer 500 according to embodiment 1.

FIG. 2 shows the structure of the center 600, the card manufacturer 400 and the device manufacturer 500.

As shown in FIG. 2, the center 600 includes a manufacturer public key certificate/media ID storage module order form reception unit 640, a media ID storage module issuing unit 650, a manufacturer public key certificate issuing unit 660, a center public key order form reception unit 670, and a center public key issuing unit 680.

As shown in FIG. 2, the card manufacturer 400 includes a manufacturer public key certificate/media ID storage module order form transmission unit 410, a media ID storage module reception unit 420, a media ID storage module implementation unit 430, a manufacturer public key certificate reception unit 440, and a manufacturer public key certificate implementation unit 450.

As shown in FIG. 2, the device manufacturer 500 includes a center public key order form transmission unit 510, a center public key reception unit 520 and a center public key implementation unit 530.

1.3 Operations of Center and Card Manufacturer

Operations performed between the center 600 and the card manufacturer 400 are described with reference to the flowchart shown in FIG. 3.

Figure 3:
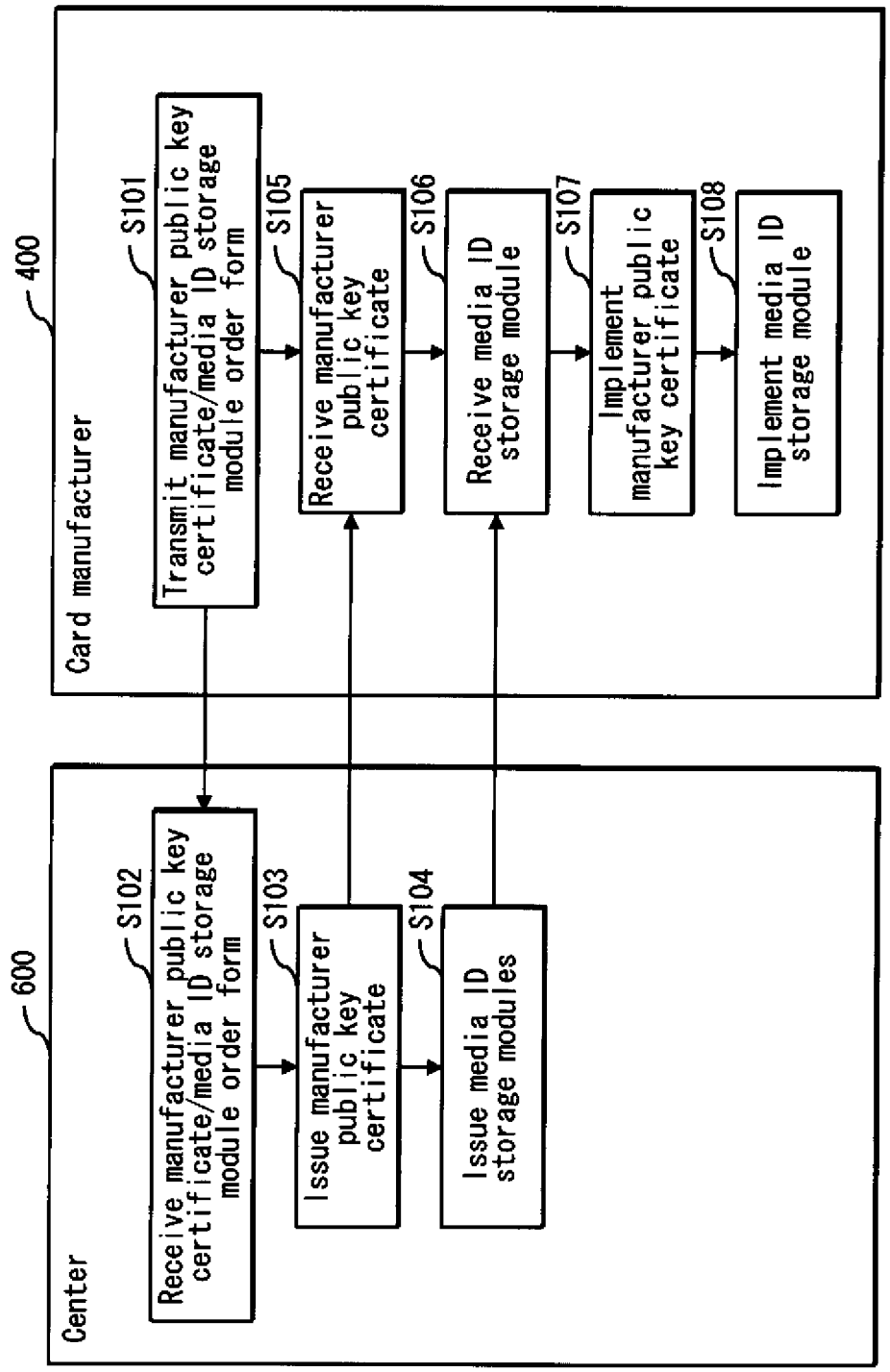
FIG. 3 is a flowchart showing operations of the center 600 and the card manufacturer 400 according to embodiment 1.

As shown in FIG. 3, the manufacturer public key certificate/media ID storage module order form transmission unit 410 of the card manufacturer 400 transmits a manufacturer public key certificate/media ID storage module order form to the center 600 (S101).

Here, an example of the manufacturer public key certificate/media ID storage module order form is shown in FIG. 4. As shown in FIG. 4, a card manufacturer ID, information indicating whether a manufacturer public key certificate is necessary, a number of media ID storage module units ordered (number of memory cards to be manufactured), etc., are written in the manufacturer public key certificate/media ID storage module order form 810. Here, the card manufacturer ID is a unique value that is different for each card manufacturer, and is given by the center 600 at the time of the license contract. The column for the information indicating whether the manufacturer public key certificate is necessary is normally filled in with simply "YES" when the first order is made. The number of media ID storage module units ordered column is filled in with a number of ordered media ID storage module units required by the card manufacturer 400. This enables the card manufacturer 400 to order media ID storage module units as necessary on a case-by-case basis.

Next, the manufacturer public key certificate/media ID storage module order form reception unit 640 receives the manufacturer public key certificate/media ID storage module order form from the card manufacturer 400 (S102). If "YES" is written in the column of the manufacturer public key certificate/media ID storage module order form for the information indicating whether the manufacturer public key certificate is necessary, the manufacturer public key certificate issuing unit 660 issues a manufacturer public key certificate to the card manufacturer 400 (S103). Then, according to the number indicated in the number of media ID storage module units ordered column of the manufacturer public key certificate/media ID storage module order form, the media ID storage module issuing unit 650 issues that number of media ID storage module units to the card manufacturer 400 (S104).

Note that, as described later, either of the following two methods can be used for the center 600 issuing the media ID storage module units to the card manufacturer 400, namely a method in which the media ID storage module units are provided as media ID storage devices that are semiconductor devices such as LSIs, and a method in which the media ID storage module units are provided as media ID storage circuit IPs that are circuit IPs necessary for manufacturing semiconductor devices such as LSIs. In the former case, as in step S104, a number of ordered media ID storage devices are issued to the card manufacturer according to the number indicated in the number of media ID storage module units ordered column, as the number of ordered media ID storage module units. In the latter case, media ID storage circuit IPs are issued as media ID storage module units regardless of the number ordered.

Next, the manufacturer public key certificate reception unit 440 of the card manufacturer 400 receives the manufacturer public key certificate from the center 600 (S105). The media ID storage module reception unit 420 of the card manufacturer 400 receives the media ID storage module unit from the center 600 (S106).

To manufacture the memory card 100, the media ID storage module implementation unit 430 and the manufacturer public key certificate implementation unit 450 of the card manufacturer 400, respectively, implement a manufacturer public key certificate and a media ID storage module unit in each memory card (S107, S108). Specifically, in step S106, if a media ID storage device is received from the center 600 as the media ID storage module unit, in step S108, the received media ID storage device is implemented in each memory card. Also, if a media ID storage circuit IP is received from the center 600 as the media ID storage module unit, the card manufacturer implements a media ID storage device manufactured according to the media ID storage circuit IP in each memory card 100.

When the stock of media ID storage module units is low (for example, if the stock runs out), the card manufacturer 400 again transmits a manufacturer public key certificate/media ID storage module order form to the center 600.

Figure 5:
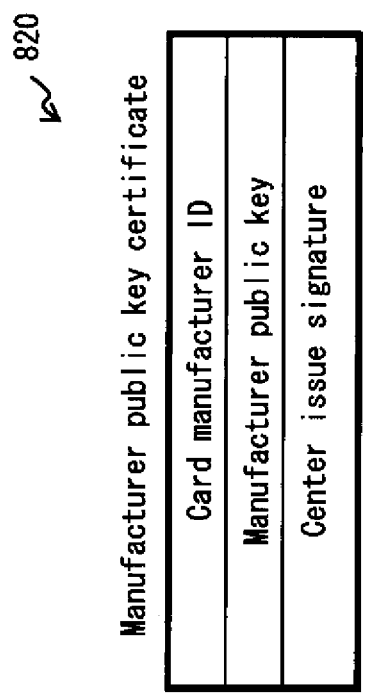
FIG. 5 shows an exemplary manufacturer public key certificate 820 according to embodiment 1.

The structure of the manufacturer public key certificate is shown in FIG. 5. As shown in FIG. 5, the manufacturer public key certificate 820 includes a card manufacturer ID for identifying the card manufacturer 400, a manufacturer public key that is different for each card manufacturer, and a center issue signature that is a digital signature issued by the center 600 for the manufacturer public key.

Here, an RSA (Rivest Shamir Adleman) signature algorithm is used for generating the center issue signature. Since the RSA signature algorithm is widely known, description thereof is omitted here.

Note that although a case is described here of using the RSA signature algorithm, another digital signature algorithm may be used.

Also, the center 600 generates in advance, and manages, a center private key used for generating the center issue signature, and a later-described corresponding center public key used for verifying the center issue signature. Also, the center 600 generates in advance and manages, for each card manufacturer, a manufacturer public key and a corresponding manufacturer private key stored in the media ID storage module unit.

Here, the RSA signature function is expressed as RSA-SIGN (private key, signed data), and the RSA verification function is expressed as RSA-VERIFY (public key, signature data). At this time, assume that the center issue signature=RSA-SIGN (center private key, manufacturer ID||manufacturer public key). Here, A||B indicates concatenating data A and data B.

1.4 Structure of Media ID Storage Module Unit 610

Figure 6:
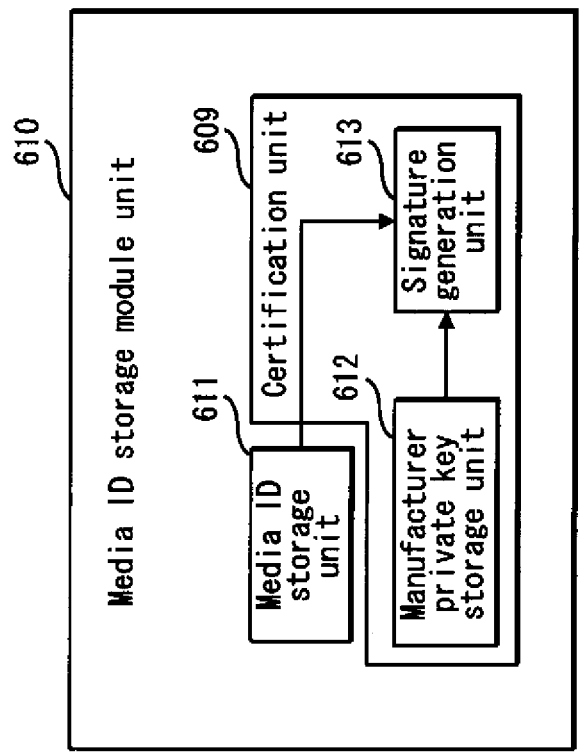
FIG. 6 shows a structure of a media ID storage module unit 610 according to embodiment 1.

FIG. 6 shows a structure of a media ID storage module unit 610 according to embodiment 1. As shown in FIG. 6, the media ID storage module unit 610 is a tamper-resistant module, and includes a media ID storage unit 611, a manufacturer private key storage unit 612 and a signature generation unit 613. The manufacturer private key storage unit 612 and the signature generation unit 613 make up a certification unit 609. As described later, the certification unit 609 generates certification information to demonstrate the validity of the media ID storage module unit 610.

Two procedures are described below for realizing the tamper-resistant media ID storage module unit 610 and issuing the media ID storage module unit 610 from the center 600 to the card manufacturer 400.

(a) The center 600 realizes the media ID storage module unit as a media ID storage device which is a semiconductor device such as an LSI, and issues the media ID storage device to the card manufacturer 400. At this time, the center 600 issues a number of media ID storage devices ordered according to a number of orders from the card manufacturer 400. In other words, if the number of orders is 1000, 1000 media ID storage devices are issued. Each media ID storage device issued by the card manufacturer 400 is implemented on one memory card.

(b) The center 600 realizes the media ID storage module unit as a media ID storage circuit IP that is a circuit IP which is design information necessary for manufacturing the media ID storage device of (a), and issues the media ID storage circuit IP to the card manufacturer 400. In this case, the card manufacturer 400 manufactures the same number of media ID storage devices as manufactured memory cards, according to the media ID storage circuit IPs issued from the center 600, and implements each of the media ID storage devices on one memory card.

Note that, in case (a), the media ID storage module unit is realized as hardware and is a tamper-resistant semiconductor device, such as an LSI. For this reason, the card manufacturer 400 has great difficulty analyzing the media ID storage unit 611 that is in the media ID storage module unit and rewriting the media ID. Also, as described later, since technology such as an electric fuse or PUF (Physical Unclonable Function) is used for realizing the media ID storage unit 611, duplicating an LSI to generate the same media ID is also difficult.

Also, in case (b), the media ID storage module unit is realized as a circuit IP. For this reason, to make it difficult for the card manufacturer 400 to rewrite the media ID in the media ID storage module unit, the circuit IP may be further obfuscated as necessary. This makes it difficult for the card manufacturer 400 to analyze the media ID storage unit 611 in the media ID storage module unit, and to rewrite the media ID. Also, since the media ID storage unit 611 is realized with use of technology such as PUF as described later, duplicating an LSI to generate the same media ID is also difficult.

Next, when the media ID storage units 611 of the media ID storage module units 610 are implemented on the memory cards, different 128-bit values are stored as different specific media IDs (in other words, media identification information) for each media ID storage module unit. Generally, in semiconductor devices such as LSIs, as a way of generating specific data that is different for each semiconductor device, specific data for each semiconductor device is set by an electric fuse, etc., or a PUF (Physical Unclonable Function) or the like is implemented on a semiconductor device, and different data is generated for each semiconductor device, using variations in implementation of the PUF. The media ID storage unit 611 uses such methods.

The manufacturer private key storage unit 612 stores a different manufacturer private key (private key for RSA signature generation) for each card manufacturer.

Figure 7:
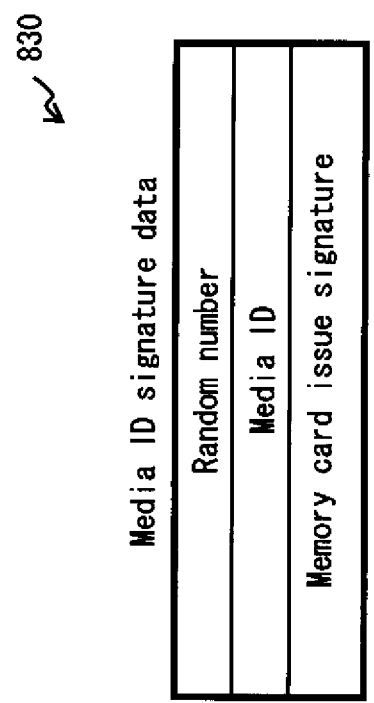
FIG. 7 shows exemplary media ID signature data 830 according to embodiment 1.

With use of the RSA signature generation function, the signature generation unit 613 generates media ID signature data. The media ID signature data is shown in FIG. 7. As shown in FIG. 7, the media ID signature data 830 includes a random number, a media ID, and a memory card issue signature. The media ID signature data is the certification information.

Here, the media ID is the media ID stored in the media ID storage unit 611. As described later, the random number is a random number received from the recording/playback device 200. The memory card issue signature is generated by RSA-SIGN (manufacturer private key, random number∥media ID).

1.5 Operations Performed Between the Center 600 and the Device Manufacturer 500

The operations performed between the center 600 and the device manufacturer 500 are described with reference to the flowchart in FIG. 8.

Figure 8:
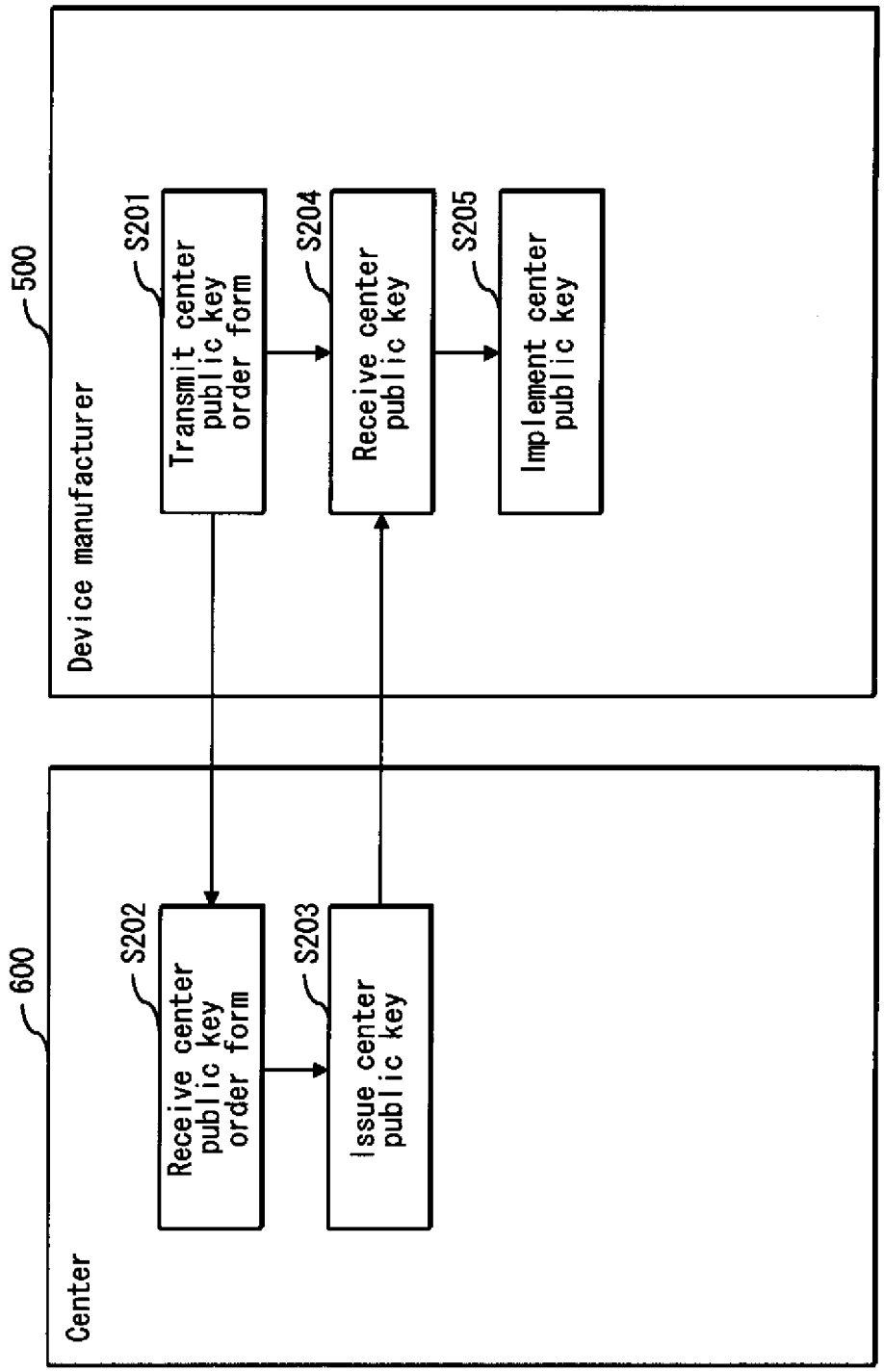
FIG. 8 is a flowchart showing operations of a center 600 and a device manufacturer 500 according to embodiment 1.

As shown in FIG. 8, the center public key order form transmission unit 510 of the device manufacturer 500 licensed to manufacture the recording/playback device transmits a center public key order form to the center 600 (S201).

FIG. 9 shows an exemplary center public key order form. As shown in FIG. 9, a device manufacturer ID, information indicating whether a center public key is necessary, and a number of recording/playback devices in which to implement the center public key (number of recording/playback devices to manufacture) are written in the center public key order form 840. Here, the device manufacturer IDs are different values that are specific to each device manufacturer, and are given by the center 600 at the time of the license contract. Normally, "YES" is written in the column for information indicating whether the center public key is necessary only at the time of the first order. The column for the number of recording/playback devices to be manufactured is filled in with the number of recording/playback devices to manufacture in which the device manufacturer 500 implements a center public key. In this way, the device manufacturer 500 can order the center public keys.

Next, the center public key order form unit 670 of the center 600 receives a center public key order form from the device manufacturer 500 (S202). When "YES" is written in the column of the center public key order form for information indicating whether the center public key is necessary, the center public key issuing unit 680 of the center 600 issues a center public key to the device manufacturer 500 (S203).

Next, the center public key reception unit 520 of the device manufacturer 500 receives a center public key from the center 600 (S204).

Then, to manufacture the recording/playback device 200, the center public key implementation unit 530 of the device manufacturer 500 implements center public keys respectively in each of the recording/playback devices 200 (S205).

1.6 Structure of the Recording/Playback System 300

As shown in FIG. 1, the recording/playback system 300 is constituted from the plurality of memory cards 100, . . . and the plurality of recording/playback devices 200, . . . . As a representative example, FIG. 10 shows detailed structures of the memory card 100 and the recording/playback device 200 included in the recording/playback system 300.

(1) Detailed Structure of the Memory Card 100

Figure 10:
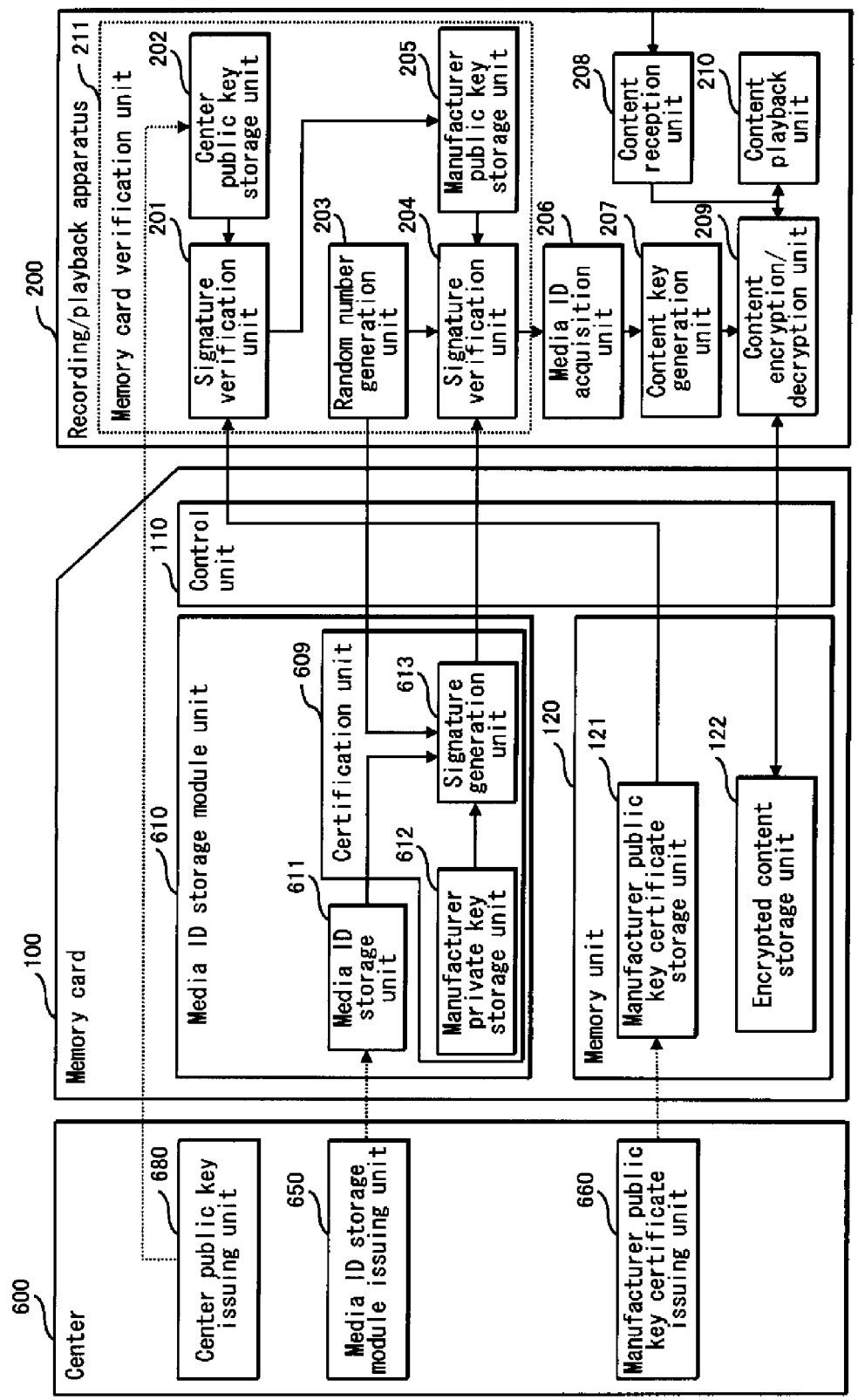
FIG. 10 shows a structure of a recording/playback system 300 (a memory card 100 and a recording/playback device 200) according to embodiment 1.

As shown in FIG. 10, the memory card 100 includes a control unit 110, a memory unit 120, and a media ID storage module unit 610.

The control unit 110 performs processing to perform a predetermined control on the media ID storage module unit 610 and the memory unit 120. Also, the control unit 110 performs processing to perform the predetermined control in accordance with a request from the recording/playback device 200. Specifically, the control unit 110 performs control such as requesting the media ID storage module unit 610 to generate media ID signature data, acquiring the generated media ID signature data, transmitting the generated media ID signature data to the recording/playback device 200, and storing encrypted content received from the recording/playback device 200 in the memory unit 120.

The memory unit 120 further includes a manufacturer public key certificate storage unit 121 and an encrypted content storage unit 122. The manufacturer public key certificate storage unit 121 of the memory unit 120 is an area in which only reading the data from the recording/playback device 200 is possible. The manufacturer public key certificate storage unit 121 stores therein a manufacturer public key certificate received by the card manufacturer 400 from the center 600 at the time of manufacturing the memory card. The encrypted content storage unit 122 of the memory unit 120 is an area in which data from the recording/playback device 200 can be read, and content encrypted by the recording/playback device 200 is stored therein.

Also, when the card manufacturer 400 has received a media ID storage module unit in the form of a semiconductor device such as an LSI from the center 600, the received media ID storage module unit is implemented as is on the memory card 100. When the card manufacturer 400 has received a circuit IP instead of a media ID storage module unit from the center 600, a semiconductor device such as an LSI manufactured according to the circuit IP received by the card manufacturer 400 is implemented in the memory card 100. Since the inner structure of the media ID storage module unit 610 has already been described, description thereof is omitted here.

Here, the control unit 110 is, for example, made up of a semiconductor device such as an LSI, the memory unit 120 is, for example, made up of a flash memory, and the media ID storage module unit 610 is made up of a semiconductor device such as an LSI.

(2) Detailed Structure of the Recording/Playback Device 200

As shown in FIG. 10, the recording/playback device 200 includes a memory card verification unit 211, a media ID acquisition unit 206, a content key generation unit 207, a content reception unit 208, a content encryption/decryption unit 209, and a content playback unit 210. The memory card verification unit 211 includes a signature verification unit 201, a center public key storage unit 202, a random number generation unit 203, a signature verification unit 204, and a manufacturer public key storage unit 205.

The memory card verification unit 211 verifies the manufacturer public key certificate and media ID signature data received from the memory card 100. This verification enables distinguishing whether the memory card 100 is an authorized memory card or an unauthorized memory card.

The following describes the signature verification unit 201, the center public key storage unit 202, the random number generation unit 203, the signature verification unit 204 and the manufacturer public key storage unit 205, which constitute the memory card verification unit 211.

The signature verification unit 201 receives the manufacturer public key certificate from the manufacturer public key certificate storage unit 121 of the memory card 100, and verifies the center issue signature included in the received manufacturer public key certificate with use of the RSA signature verification function. If the verification succeeds, the signature verification unit 201 transmits the manufacturer public key included in the received manufacturer public key certificate to the manufacturer public key storage unit 205.

Note that the specifics of verification processing are described later. Also, since the structure of the manufacturer public key certificate has already been described, description thereof is omitted here (see FIG. 5).

The center public key storage unit 202 stores therein the center public key received by the device manufacturer 500 from the center at the time of manufacturing the recording/playback device 200.

The random number generator 203 generates a random number, and transmits the random number to the memory card. The length of the random number is, for example, 128 bits.

The signature verification unit 204 verifies the media ID signature data received from the memory card 100 with use of the manufacturer public key received from the manufacturer public key storage unit 205. The verification of the signature in this case is message recovery verification. If the verification succeeds, a media ID is extracted from the media ID signature data that is the target of verification, and the extracted media ID is sent to the media ID acquisition unit 206. Note that the specifics of the verification processing are described later.

The manufacturer public key storage unit 205 stores therein the manufacturer public key received from the signature verification unit 201.

Next, only when the verification by the signature verification unit 204 has succeeded, the media ID acquisition unit 206 acquires the media ID from the signature verification unit 204, and transmits the acquired media ID to the content key generation unit 207.

The content key generation unit 207 generates a content key according to a media ID received from the media ID acquisition unit. The specifics of the content key generation method are described later.

The content reception unit 208 receives digitally-broadcast digital content and digitally-distributed digital content, and transmits the received digital content to the content encryption/decryption unit 209.

The content encryption/decryption unit 209, with use of the content key received from the content key generation unit 207, encrypts the digital content received from the content reception unit 208, and transmits the content to the memory card 100. Also, the content encryption/decryption unit 209 decrypts the digital content received from the memory card 100, thus generating decrypted digital content, and transmits the generated digital content to the content playback unit 210. The details of the decryption of the contents are described later.

The content playback unit 210 receives the decrypted digital content from the content encryption/decryption unit 209, and plays back the received digital content. Here, playback of the digital content refers to generating digital signals for video and audio by expanding compression-encoded audio and video digital signals, and outputting the generated video and audio digital signals to an external display device connected to the recording/playback device 200. Also, playing back the digital content refers to, when the content playback unit 210 includes a video display unit and an audio output unit, generating digital signals for video and audio by expanding compression-encoded audio and video digital signals, and outputting the generated audio and video digital signals to the video display unit and the audio output unit, so that the video display unit displays the video, and the audio output unit outputs the audio.

1.7 Operations of the Recording/Playback System 300

(1) Operations at the Time of Recording

The operations of the recording/playback device 200 when recording content to the memory card 100 is described with reference to the flowchart in FIG. 11.

Figure 11:
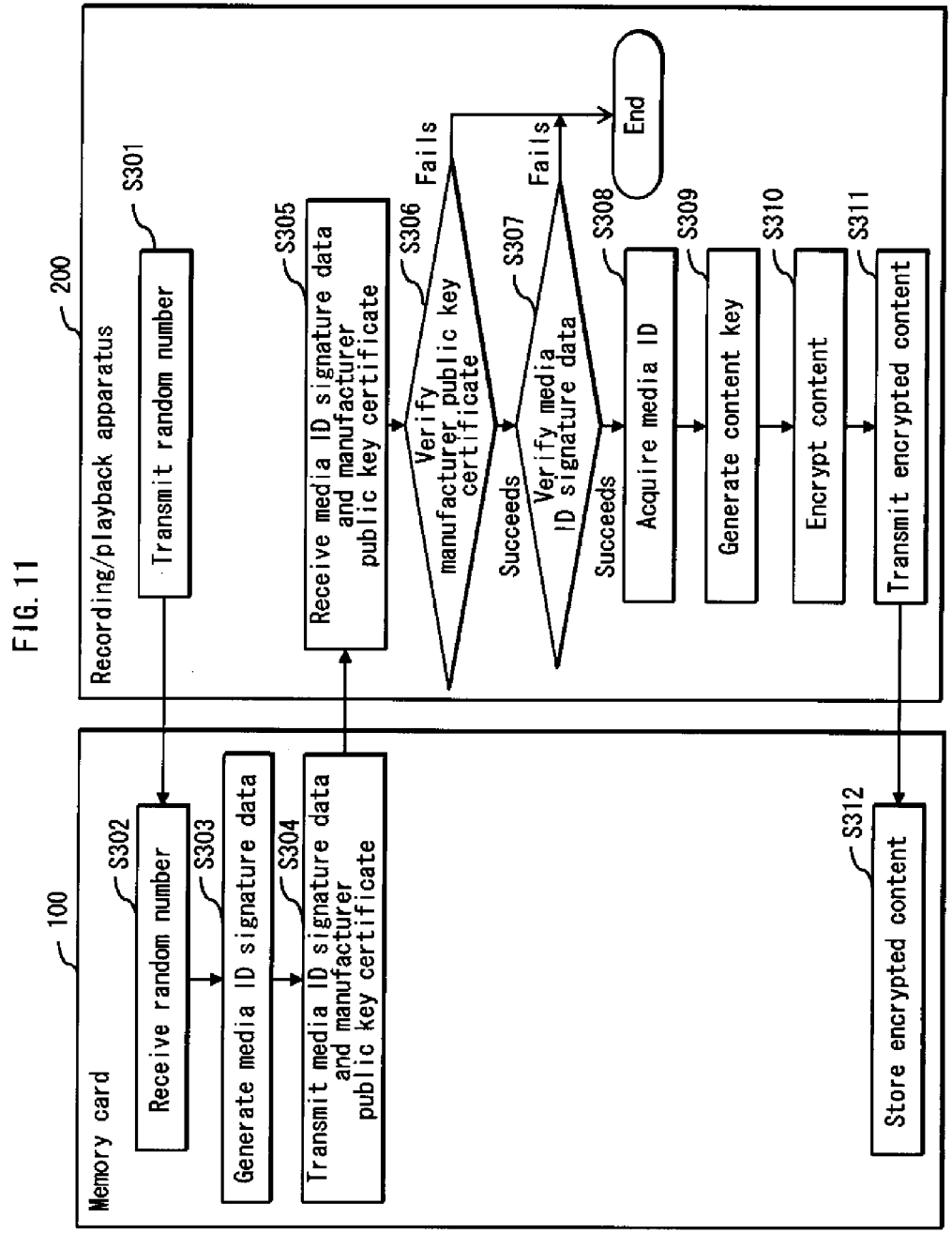
FIG. 11 is a flowchart showing operations of the recording/playback system 300 (the memory card 100 and the recording/playback device 300) at the time of recording according to embodiment 1.

As shown in FIG. 11, the random number generation unit 203 of the recording/playback device 200 generates a 128-bit random number, and transmits the generated random number to the memory card 100 (S301). The control unit 110 of the memory card 100 receives the 128-bit random number from the recording/playback device 200 (S302), and transmits the received random number to the signature generation unit 613. The signature generation unit 613 of the memory card 100 receives a manufacturer private key from the manufacturer private key storage unit 612, and receives a 128-bit media ID specific to each memory card from the media ID storage unit 611. The signature generation unit 613 of the memory card 100, with use of the manufacturer private key, generates a signature (memory card issue signature) corresponding to the random number and the media ID, according to the expression below. The signature generation unit 613 transmits media ID signature data including the random number, the media ID, and the generated memory card issue signature to the control unit 110 (S303). FIG. 7 shows an exemplary structure of the media ID signature data.

Memory card issue signature=RSA-SIGN(manufacturer private key, random number||media ID)

Here, RSA-SIGN is a message recovery signature. When verification of the media ID signature data generated by RSA-SIGN has succeeded, the random number media ID is extracted.

Next, the control unit 110 of the memory card 100 transmits the media ID signature data received from the signature generation unit 613 and the manufacturer public key certificate read from the manufacturer public key certificate storage unit 121 to the recording/playback device 200 (S304).

The signature verification unit 204 of the recording/playback device 200 receives the media ID signature data and the manufacturer public key certificate from the memory card 100 (S305). The signature verification unit 201 of the recording/playback device 200, with use of the manufacturer public key certificate received from the memory card in step S305 and the center public key read from the center public key storage unit 202, verifies whether the following expression has equality (S306).

(Manufacturer ID||manufacturer public key)=RSA-VERIFY(center public key, center issue signature)

Here, as shown in FIG. 5, the manufacturer public key and the center issue signature are included in the manufacturer public key certificate. As has been described already, the following expression is given to the center issue signature.

Center issue signature=RSA-SIGN(center private key, manufacturer ID||manufacturer public key)

Then, if the above verification expression has equality, the signature verification unit 201 stores the manufacturer public key in the manufacturer public key storage unit 205, and proceeds to the next step. If the above verification expression does not have equality, the processing for recording the content ends.

Next, if the verification expression has equality in step S306, the signature verification unit 201 verifies whether the below expression has equality with use of the media ID signature data received from the memory card 100, and the manufacturer public key received from the manufacturer public key storage unit 205 (the manufacturer public key whose validity has been verified in step S306) (S307).

(Random number||media ID)=RSA-VERIFY(manufacturer public key, memory card issue signature)

Here, as shown in FIG. 7, the random number and the media ID are included in the media ID signature data, and the following expression is given to the memory card issue signature, as has already been described.

Memory card issue signature=RSA-SIGN(manufacturer private key, random number||media ID).

Then, if the above verification expression has equality, the signature verification unit 204 transmits the media ID to the media ID acquisition unit 206, and proceeds to the next step. If the above verification expression is not true, the signature verification unit 204 ends the processing to record the content. By doing this, the signature verification unit 204 prohibits the decryption of encrypted content and encryption of content.

If validity has been verified in step S307, the media ID acquisition unit 206 acquires the media ID (the media ID whose validity has been verified in step S307) from the signature verification unit 204 (S308).

The content key generation unit 207, with use of a one-way function F, generates a content key for the media ID acquired from the media ID acquisition unit 206 according to the following expression, and transmits the generated content key to the content encryption/decryption unit 209 (S309).

Content key=F(media ID)

The one-way function F can be realized with use of AES (Advanced Encryption Standard) encryption as a specific example according to the following expression.

Content key=AES-E(Content key generation private key, media ID)(+)media ID

Here, (+) represents an exclusive-or operation. Also, the private key for content key generation is 128 bits, is shared privately between all the recording/playback devices, and is stored in advance by the content key generation unit 207. Since AES encryption is widely known, description thereof is omitted here. Also, in the present specification, X=AES-E (Y, Z) indicates generating an encrypted text X by encrypting a plain text Z with use of the AES encryption function, using a key Y. Z=AES-D (X, Y) indicates generating a decrypted text Z by decrypting the encrypted text X with use of the AES decryption function using the key Y.

Note that here, although AES encryption is used as an example of the content key generation function, any one-way function that generates a 128-bit random number as a content key according to a 128-bit media ID may be used.

The content encryption/decryption unit 209 encrypts digitally broadcast digital content or digitally distributed digital content received by the content reception unit 208, with use of the content key received from the content key generation unit 207 (S310), and transmits the encrypted digital content to the memory card 100 (S311).

Here, the encryption of the content is performed according to the following expression, for example.

Encrypted digital content=AES-ECBC(content key, digital content)

Here, AES-ECBC refers to performing AES encryption using CBC mode (Cipher Block Chaining). Since CBC mode is widely known, description thereof is omitted here. Also, in the present specification, X=AES-ECBC (Y, Z) indicates generating the encrypted text X by encrypting the plain text Z according to the AES encryption function, using the key Y, in CBC mode. Z=AES-DCBC (Y, X) indicates generating the decrypted text Z by decrypting the encrypted text X with use of the AES decryption function using the key Y in CBC mode. Note that although AES-ECBC is described here, the invention is not limited to this structure.

The control unit 110 of the memory card 100 receives encrypted digital content from the recording/playback device 200, and stores the encrypted digital content in the encrypted content storage unit 122 (S312).

(2) Operations at the Time of Playback

The operations at the time that the recording/playback device 200 reads the encrypted content from the memory card 100 and plays back the content are described below with reference to the flowchart in FIG. 12.

Figure 12:
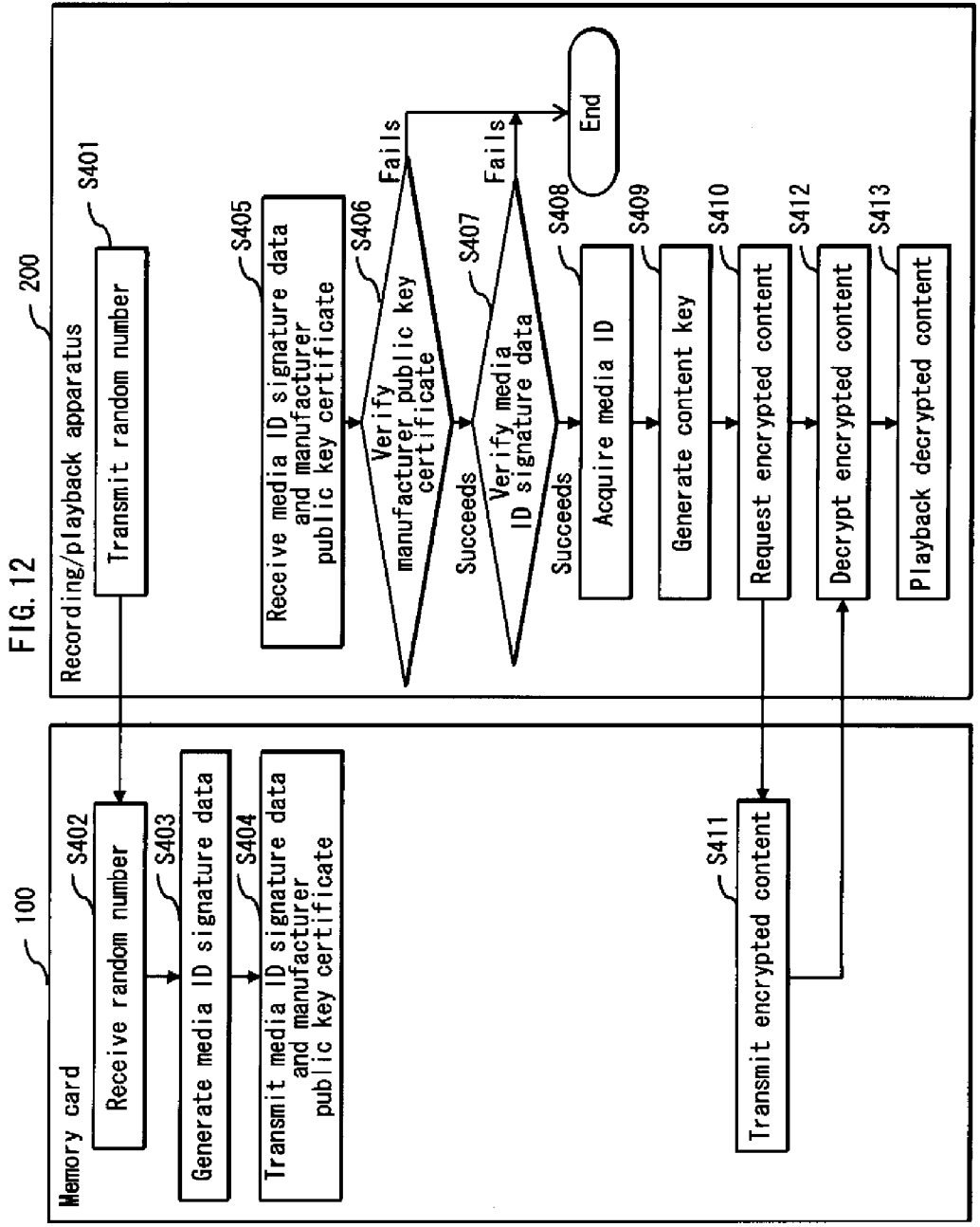
FIG. 12 is a flowchart showing operations of the recording/playback system 300 (the memory card 100 and the recording/playback device 200) at the time of playback according to embodiment 1.

Note that since the steps from S401 to S409 of FIG. 12 are, respectively, exactly the same as the steps from S301 to S309 of FIG. 11, description thereof is omitted.

The recording/playback device 200 transmits a request to the memory card 100 to transmit the encrypted content (S410). The control unit 110 of the memory card 100, in accordance with the request from the recording/playback device 200 to transmit the encrypted content, reads the encrypted content from the encrypted content storage unit 122, and transmits the read encrypted content to the recording/playback device 200 (S411). The content encryption/decryption unit 209 decrypts the encrypted content received from the memory card 100 with use of the content key received from the content key generation unit 207, and transmits the decrypted content to the content playback unit 210 (S412).

Here, the decryption of the content is represented according to the following expression.

Decrypted content=AES-DCBC(content key, encrypted digital content)

Here, the AES-DCBC indicates performing AES encryption with use of CBC mode (Cipher Block Chaining).

The content playback unit 210 plays back decrypted content received from the content encryption/decryption unit 209 (S413).

1.8 Distinguishing Unauthorized Memory Cards

In the above structure, according to the structure of embodiment 1 of the present invention, even if the card manufacturer 400 manufactures an unauthorized memory card, the memory card verification unit 211 of the recording/playback device 200 can distinguish whether a memory card is a legitimately manufactured memory card or an unauthorized memory card. This process is described below with reference to FIG. 13.

Figure 13:
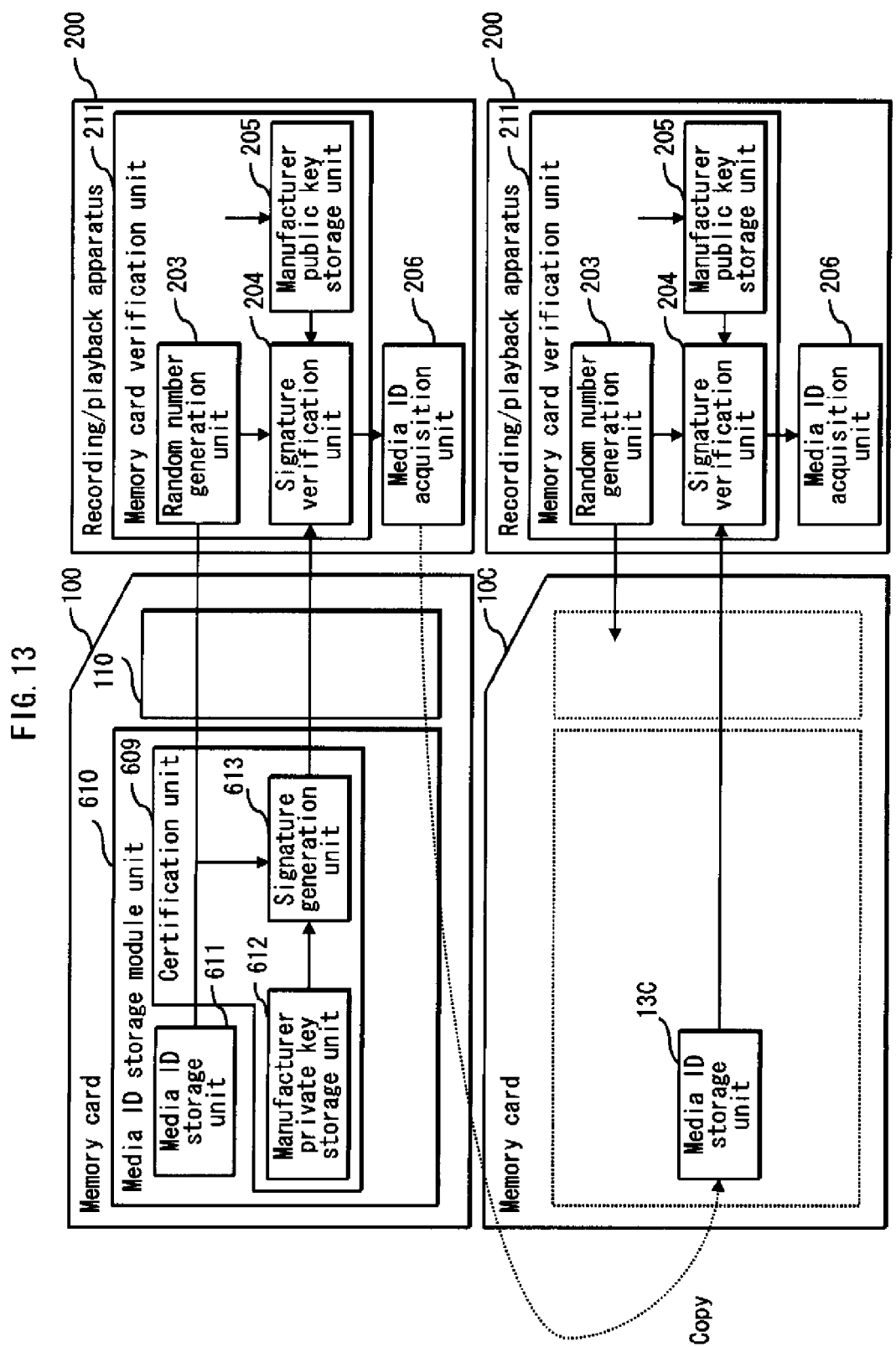
FIG. 13 illustrates effects of the recording/playback system 300 according to embodiment 1.

In FIG. 13, the memory card 100 is the memory card according to embodiment 1 of the present invention (hereinafter referred to as the authorized memory card), the recording/playback device 200 is the recording/playback device according to embodiment 1 of the present invention (hereinafter referred to as the authorized recording/playback device), and the memory card 10C is a memory card (hereinafter referred to as an unauthorized memory card) manufactured by an unauthorized card manufacturer by acquiring a media ID by operating the memory card 100 and the recording/playback apparatus 200 of embodiment 1 of the present invention, and storing the media ID in a media ID storage unit 13C of the memory card 10C, which has a conventional structure.

At this time, if recording/playback processing is attempted by the authorized recording/playback device 200 with use of the unauthorized memory card 10C, the unauthorized memory card 10C cannot generate the media ID signature corresponding to the random number received from the authorized recording/playback device 200. For this reason, in the authorized recording/playback device 200, the signature verification processing by the signature verification unit 204 of the memory card verification unit 211 fails. In other words, even if the card manufacturer manufactures an unauthorized memory card, the authorized recording/playback device 200 is capable of distinguishing between an authorized memory card and an unauthorized memory card.

Embodiment 2

The following describes another embodiment of the present invention with reference to the drawings.

2.1 Overall Structure

Figure 14:
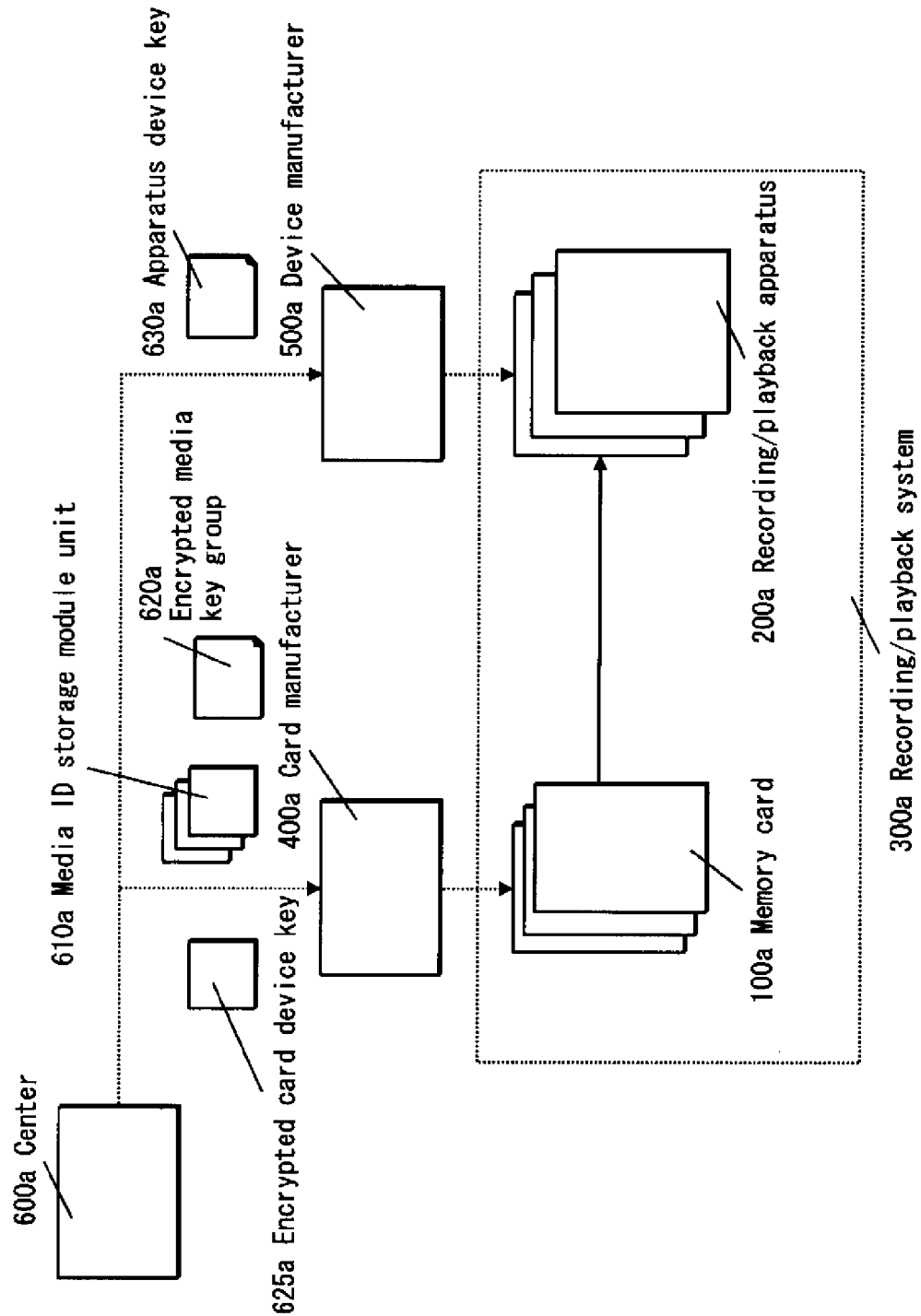
FIG. 14 shows an overall structure of a recording/playback system 300a, a center 600a, a card manufacturer 400a, and a device manufacturer 500a according to embodiment 2.

FIG. 14 shows overall structures of a recording/playback system 300a pertaining to embodiment 2, a card manufacturer 400a pertaining to manufacture of the recording/playback system 300a, a device manufacturer 500a and a center 600a (key issuing authority). The recording/playback system 300a includes a plurality of memory cards 100a, . . . and a plurality of recording/playback devices 200a . . . . Note that the card manufacturer 400a, the device manufacturer 500a and the center 600a represent devices that include a card manufacturer, a device manufacturer, and a center, respectively.

Here, the center 600a issues, to the card manufacturer 400a licensed to manufacture the memory card 100a, at least one media ID storage module unit 610a, encrypted card device key 625a, and encrypted media key group 620a, which are necessary for manufacturing the memory card 100a. Also, the center 600a issues, to the device manufacturer 500a licensed to manufacture the recording/playback device 200a, an apparatus device key 630a necessary for manufacturing the recording/playback device 200a. The details of the media ID storage module unit 610a, the encrypted card device key 625a, the encrypted media key group 620a, and the apparatus device key 630a are described later.

The card manufacturer 400a implements, in the memory card 100a, the media ID storage module unit 610a, the encrypted card device key 625a, and the encrypted media key group 620a received from the center 600a.

Also, the device manufacturer 500a implements, in the recording/playback device 200a, the apparatus device key 630a received from the center 600a.

Figure 15:
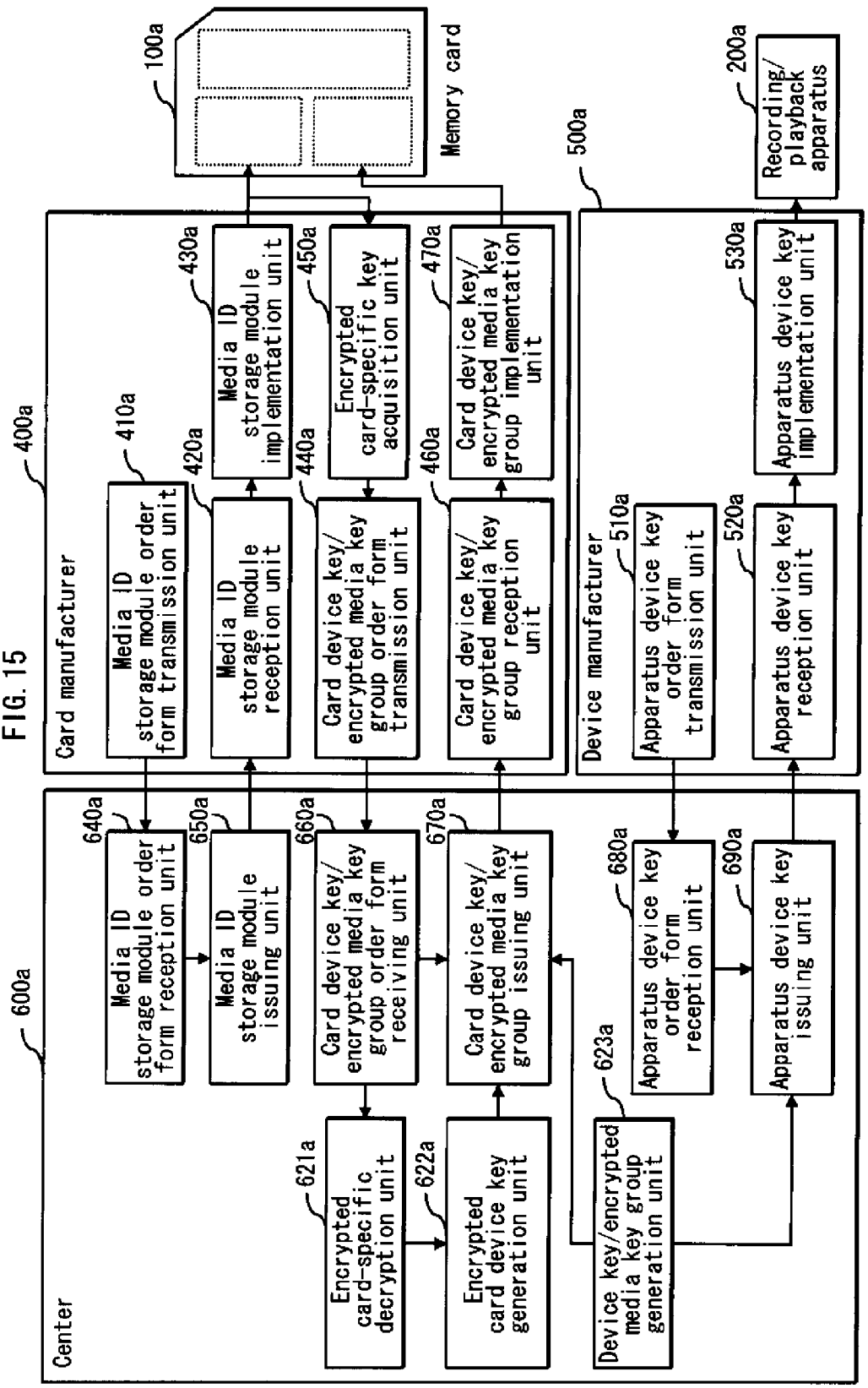
FIG. 15 shows a structure of the center 600a, the card manufacturer 400a, and the device manufacturer 500a according to embodiment 2.

2.2 Structure of the Center 600a, the Card Manufacturer 400a, and the Device Manufacturer 500a FIG. 15 shows the structure of the center 600a, the card manufacturer 400a, and the device manufacturer 500a.

As shown in FIG. 15, the center 600a includes a media ID storage module order form reception unit 640a, a media ID storage module issuing unit 650a, a card device key/encrypted media key order form reception unit 660a, a card device key/encrypted media key group issuing unit 670a, an apparatus device key order form reception unit 680a, an apparatus device key issuing unit 690a, an encrypted card-specific key decryption unit 621a, an encrypted card device key generation unit 622a and a device key/encrypted media group generation unit 623a.

As shown in FIG. 15, the card manufacturer 400a includes a media ID storage module order form transmission unit 410a, a media ID storage module reception unit 420a, a media ID storage module implementation unit 430a, a card device key/encrypted media key group order form transmission unit 440a, an encrypted card-specific key acquisition unit 450a, a card device key/encrypted media key group reception unit 460a, and a card device key/encrypted media implementation unit 470a.

As shown in FIG. 15, the device manufacturer 500a includes an apparatus device key order form transmission unit 510a, an apparatus device key reception unit 520a, and an apparatus device key implementation unit 530a.

2.3 Operations Performed Between the Center and the Manufacturer

Figure 16:
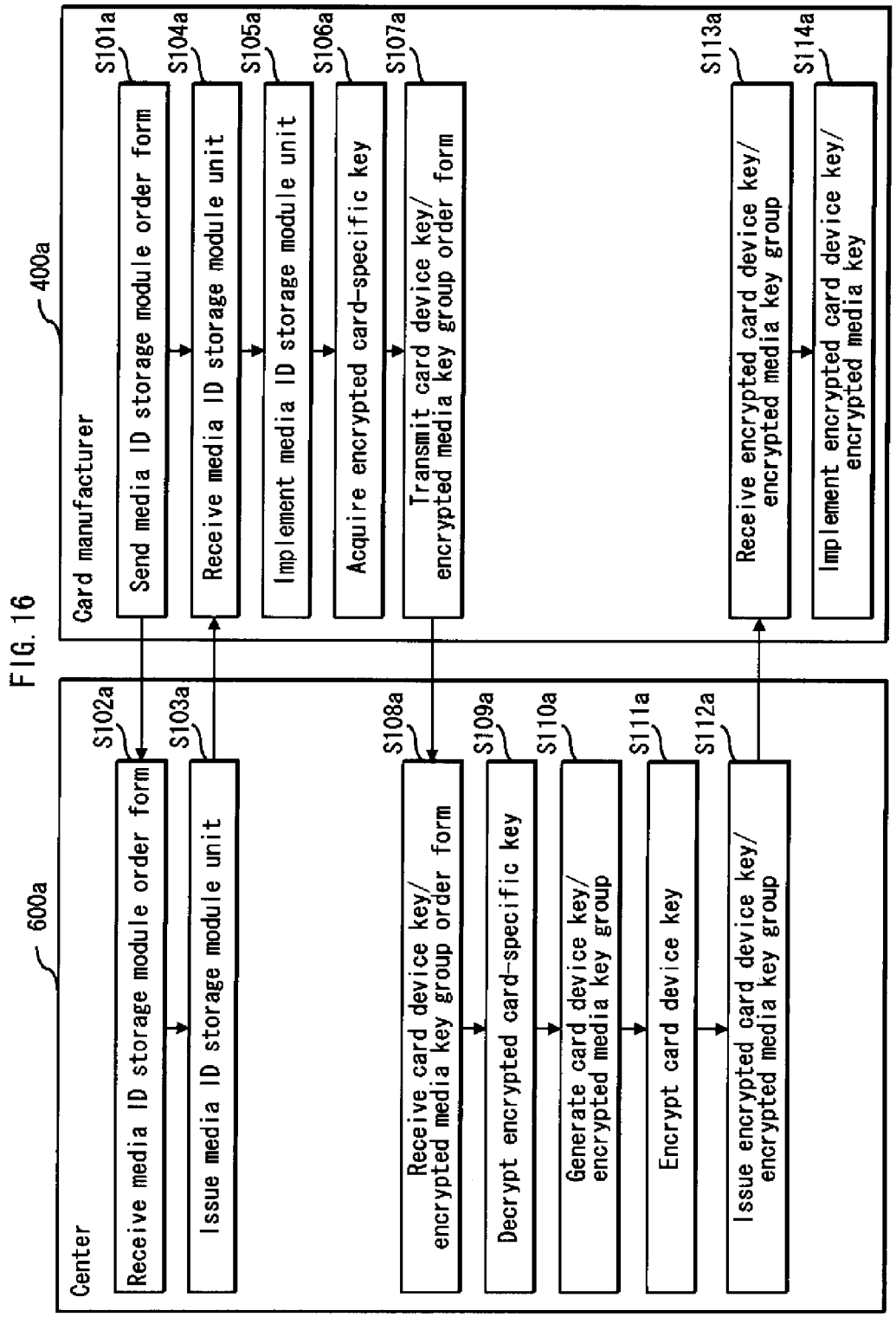
FIG. 16 is a flowchart showing operations of the center 600a and the card manufacturer 400a according to embodiment 2.

The following describes the operations performed between the center 600a and the card manufacturer 400a with reference to the flowchart in FIG. 16.

As shown in FIG. 16, the media ID storage module order form transmission unit 410a of the card manufacturer 400a transmits a media ID storage module order form to the center 600a (S101a).

Here, an exemplary media ID storage module order form is shown in FIG. 17. As shown in FIG. 17, a card manufacturer ID, a number of orders for media ID storage module units (number of memory cards to be manufactured), etc. are written in the media ID storage module order form 850. Here, the card manufacturer ID is a specific value that is different for each card manufacturer, and is given by the center 600a at the time of the license contract. The column for the number of orders of media ID storage modules is filled in with the number of orders for the media ID storage modules, which is required by the card manufacturer 400a. This enables the card manufacturer 400a to order the required number of media ID storage module units as necessary on a case-by-case basis.

Next, the media ID storage module order form reception unit 640a of the center 600a receives a media ID storage module order form from the card manufacturer 400a (S102a). The media ID storage module issuing unit 650a issues a media ID storage module unit to the card manufacturer 400a (S103a).

Note that as in embodiment 1, the methods of issuing media ID storage module units are a method in which the media ID storage module units are provided as media ID storage devices that are semiconductor devices such as LSIs, and a method in which the media ID storage module units are provided as media ID storage circuit IPs that are circuit IPs necessary for manufacturing semiconductor devices such as LSIs. In the former case, as in step S103a, a number of ordered media ID storage module units (media ID storage devices) are issued (shipped) to the card manufacturer 400a according to the number indicated in the number of media ID storage module units ordered column. In the latter case, media ID storage circuit IPs are issued as media ID storage module units regardless of the number ordered.

Next, the media ID storage module reception unit 420a of the card manufacturer 400a receives the media ID storage module unit from the center 600a (S104a).

Then, the media ID storage module implementation unit 430a of the card manufacturer 400a implements, in each memory card 100a, a media ID storage module unit (S105a). Specifically, in step S104a, if a media ID storage device is received from the center 600a as the media ID storage module unit, in step S105a, the received media ID storage device is implemented in each memory card. Also, if a media ID storage circuit IP is received from the center 600a as the media ID storage module unit, the card manufacturer implements a media ID storage device manufactured according to the media ID storage circuit IP in each memory card 100a.

Next, the encrypted card-specific key acquisition unit 450a acquires an encrypted card-specific key from each memory card 100a (S106a). The card device key/encrypted media key group order form transmission unit 440a transmits, to the center 600a, the encrypted card-specific key and card device key/encrypted media key group order form (S107a). FIG. 47 shows an exemplary card device key/encrypted media key group order form. The card device key/encrypted media key group order form 855 shown in FIG. 47 is data that is sent by the card device key/encrypted media key group order form transmission unit 440a when ordering the card device key/encrypted media keys from the center 600a. As shown in FIG. 47, a card manufacturer ID of the card manufacturer, a number of orders of the card device keys (number of memory cards to be manufactured), and information indicating whether the encrypted media key group is necessary are written in the card device key/encrypted media key group order form 855. Here, the column indicating the number of ordered card device keys is filled in with a number of ordered card device keys required by the card manufacturer 1400. The column for information indicating whether the encrypted media keys are necessary is filled in with "YES" when necessary.

This structure enables the card manufacturer to order the required number of card device keys. Note that the details of the encrypted card-specific key, the card device key, and the encrypted media key group are described later.

Next, the card device key/encrypted media key group order form reception unit 660a of the center 600a receives an encrypted card-specific key and card device key/encrypted media key order form from the card manufacturer 400a (S108a).

The encrypted card-specific key decryption unit 621a generates a card-specific key by decrypting an encrypted card-specific key with use of a later-described common key (S109a). The device key/encrypted media group generation unit 623a generates a card device key, a card device key ID for identifying the card device key, an apparatus device key, an apparatus device key ID for identifying the apparatus device key and an encrypted media group for identifying the apparatus device key (S110a). The device key/encrypted media group generation unit 623a encrypts the card device key with use of a card-specific key (S111a). The card device key/device media keys issuing unit 670a issues an encrypted card device key and card device ID/encrypted media key group (S112a). Note that the details of the encrypted media key group are described later. As described later, the apparatus device key and the apparatus device key ID are issued to the device manufacturer. Here, after receiving the card device key/encrypted media key group order form, the device key/encrypted media group generation unit 623a generates a card device key and encrypted media key group, but the invention is not limited to this structure. For example, the device key/encrypted media group generation unit 623a of the center may generate and store in advance the card device key, the later-described apparatus device key, and an encrypted media key, and issue the stored card device key, apparatus device key, and encrypted media key in accordance with an order from the card manufacturer or the device manufacturer.

The card device key/encrypted media key group reception unit 460a of the card manufacturer 400a receives the encrypted card device key and card device key ID/encrypted media key group (S113a). The card device key/encrypted media key group implementation unit 470a implements the received encrypted card device key and card device key ID/encrypted media key group in the memory card 100a (S114a).

2.4 Structure of Media ID Storage Module Unit 610a

Figure 18:
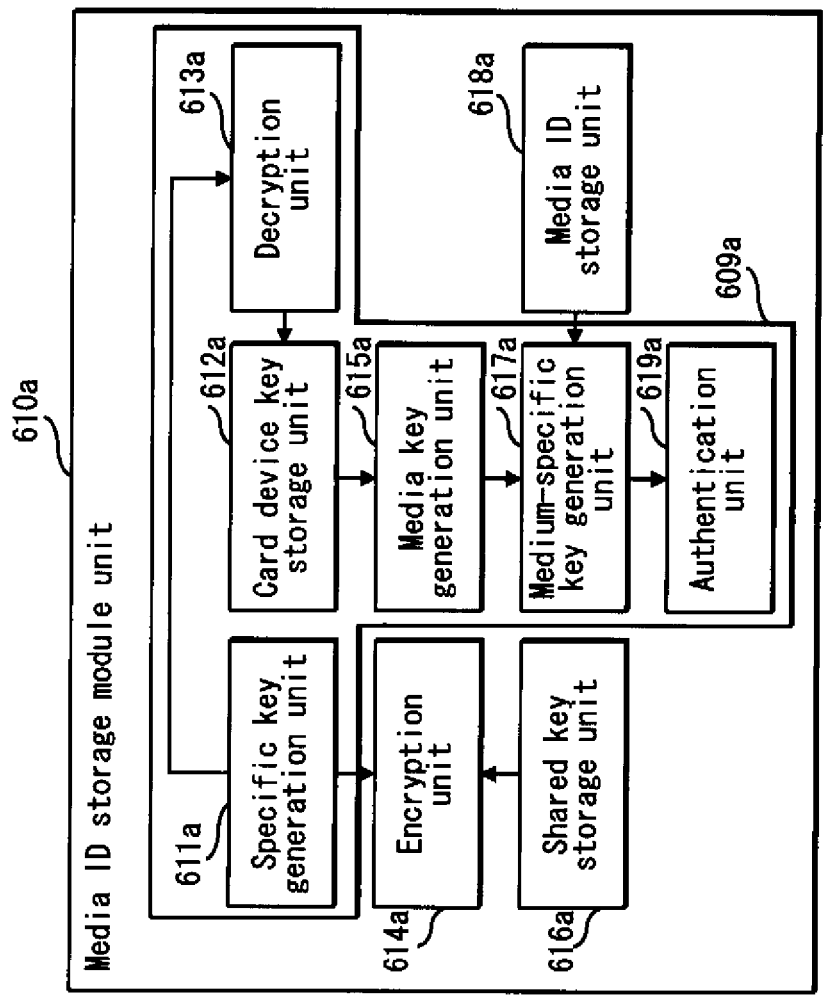
FIG. 18 shows a structure of a media ID storage module unit 610a according to embodiment 2.

FIG. 18 shows a structure of a media ID storage module unit 610a.

The media ID storage module unit 610a is a tamper-resistant module, and as shown in FIG. 18, includes a specific key generation unit 611a, a card device key storage unit 612a, a decryption unit 613a, an encryption unit 614a, a media key generation unit 615a, a common key storage unit 616a, a medium-specific key generation unit 617a, a media ID storage unit 618a and an authentication unit 619a. The specific key generation unit 611a, the card device key storage unit 612a, the decryption unit 613a, the media key generation unit 615a, the medium-specific key generation unit 617a and the authentication unit 619a constitute the certification unit 609a. As described later, the certification unit 609a generates certification information indicating the validity of the media ID storage module unit 610a.

Here, since the form of realizing the media ID storage module unit 610a and issuing the media ID storage module unit 610a from the center 600a to the card manufacturer 400a are the same as embodiment 1, description thereof is omitted.

Next, when the media ID storage module units 610a are implemented on the memory cards 100a, the specific key generation unit 611a of the media ID storage module unit 610a generates different 128-bit numerical values as card-specific keys that are different for each media ID storage module unit respectively. Generally, in semiconductor devices such as LSIs, as a way of generating specific data that is different for each semiconductor device, specific data for each semiconductor device is set by an electric fuse, etc., or a PUF (Physical Unclonable Function) or the like is implemented on a semiconductor device, and different data is generated for each semiconductor device, using variations in implementation of the PUF. The specific key generation unit 611a uses such methods.

The card device key storage unit 612a stores a 128-bit card device key, received from the decryption unit 613a, specific to each memory card.

The decryption unit 613a decrypts the encrypted card device key according to the following expression with use of the AES decryption function.

Card device key=AES-D(card-specific key, encrypted card device key)

Note that since AES encryption is widely known, description thereof is omitted here. Also, the encrypted card device key is given, from the center, according to the following expression.

Encrypted card device key=AES-E(card-specific key, card device key)

Here, the card-specific key is a specific key that is different for each media ID storage module unit generated by the specific key generation unit 611a.

The encryption unit 614a encrypts a card-specific key according to the following expression with use of the AES encryption function, and outputs the encrypted card-specific key to an external device.

Encrypted card-specific key=AES-E(common key, card-specific key)

From among the encrypted media key group, the media key generation unit 615a selects one encrypted media key corresponding to the card device key ID identifying the card device key. Next, the media key generation unit 615a generates the media key by decrypting, according to the AES decryption function with use of the card device key, the one encrypted media key selected from the encrypted media key group, according to the following expression.

Media key=AES-D(card device key, encrypted media key)

Here, the encrypted media key group is issued by the center. An exemplary encrypted media key group is shown in FIG. 19. As shown in FIG. 19, the encrypted media key group 860 includes a plurality of pairs, and each pair is made up of an ID and an encrypted media key. The ID is a card device key ID or an apparatus device key ID. The card device key ID is identification information uniquely identifying the card device key, and the apparatus device ID is identification information uniquely identifying the apparatus device key. Each encrypted media key is generated by encrypting the 128-bit media key, according to the AES encryption function, with use of the 128-bit card device key identified by the card device key ID corresponding to the encrypted media key, or the 128-bit apparatus device key identified by the apparatus device key ID corresponding to the encrypted media key.

The common key storage unit 616a stores, in advance, a 128-bit common key shared with the center 600a.

The medium-specific key generation unit 617a generates a medium-specific key according to the media key and the media ID (in other words, the media identification information) according to the following expression, with use of the one-way function G.

Medium-specific key=G(media key, media ID)

Note that the one-way function G can be realized with use of AES encryption as a specific example.

Medium-specific key=AES-D(media key, media ID) (+)media ID

Here, (+) represents an exclusive-or operation.

When the media ID storage module units are implemented in the memory cards 100a, the media ID storage unit 618a generates 128-bit numerical values that are different from each other, as specific media IDs that are different for each media ID storage module unit. The specific form of realization is same as the form of realization of the specific key generation unit 611a.

The authentication unit 619a performs mutual authentication with the authentication unit of the recording/playback device 200a. The details of the mutual authentication are described later.

2.5 Operations Performed Between the Center 600a and the Device Manufacturer 500a The following describes the operations performed between the center 600a and the operation manufacturer 500a with reference to the flowchart shown in FIG. 20.

As shown in FIG. 20, the apparatus device key order form transmission unit 510a of the device manufacturer 500a transmits the apparatus device key order form to the center 600a (S201a).

FIG. 21 shows an exemplary apparatus device key order form. As shown in FIG. 21, a card manufacturer ID, a number of orders for apparatus device keys (number of recording/playback devices to be manufactured), and information indicating whether the encrypted media key group is necessary are written in the apparatus device key order form 870. Here, the card manufacturer ID is a specific value that is different for each device manufacturer, and is given by the center 600a at the time of the license contract. The column for the number of orders of apparatus device keys is filled in with the number of orders for the recording/playback devices implementing the apparatus device keys that are to be manufactured. The column for information indicating whether the encrypted media key group is necessary is filled in with "YES" when necessary.

This structure enables the device manufacturer 500a to order the apparatus device keys.

Next, the apparatus device key order form reception unit 680a of the center 600a receives an apparatus device key order form from the device manufacturer 500a (S202a). The apparatus device key issuing unit 690a issues, to the device manufacturer, the apparatus device key generated in step S110a and an apparatus device key ID that identifies the apparatus device key according to the number of orders of apparatus device keys of the apparatus device key order form, and when "YES" is written in the column of the order form for information indicating whether the encrypted media key group is necessary, issues an encrypted media key group to the device manufacturer (S203a).

Note that there are cases in which the encrypted media key group is issued to the device manufacturer even when "NO" is written in the column of the order form for information indicating whether the encrypted media key group is necessary, in cases when the center has updated the encrypted media key group.

Next, the apparatus device key reception unit 520a of the device manufacturer 500a receives an apparatus device key, an apparatus device key ID, and an encrypted media key group from the center 600a (S204a). Then, when manufacturing recording/playback devices 200a, the apparatus device key implementation unit 530a of the device manufacturer 500a implements the apparatus device key, the apparatus device key ID, and, if necessary, the encrypted media key group, respectively in each of the recording/playback devices 200a (S205a).

2.5 Structure of the Recording/Playback System 300a

Figure 22:
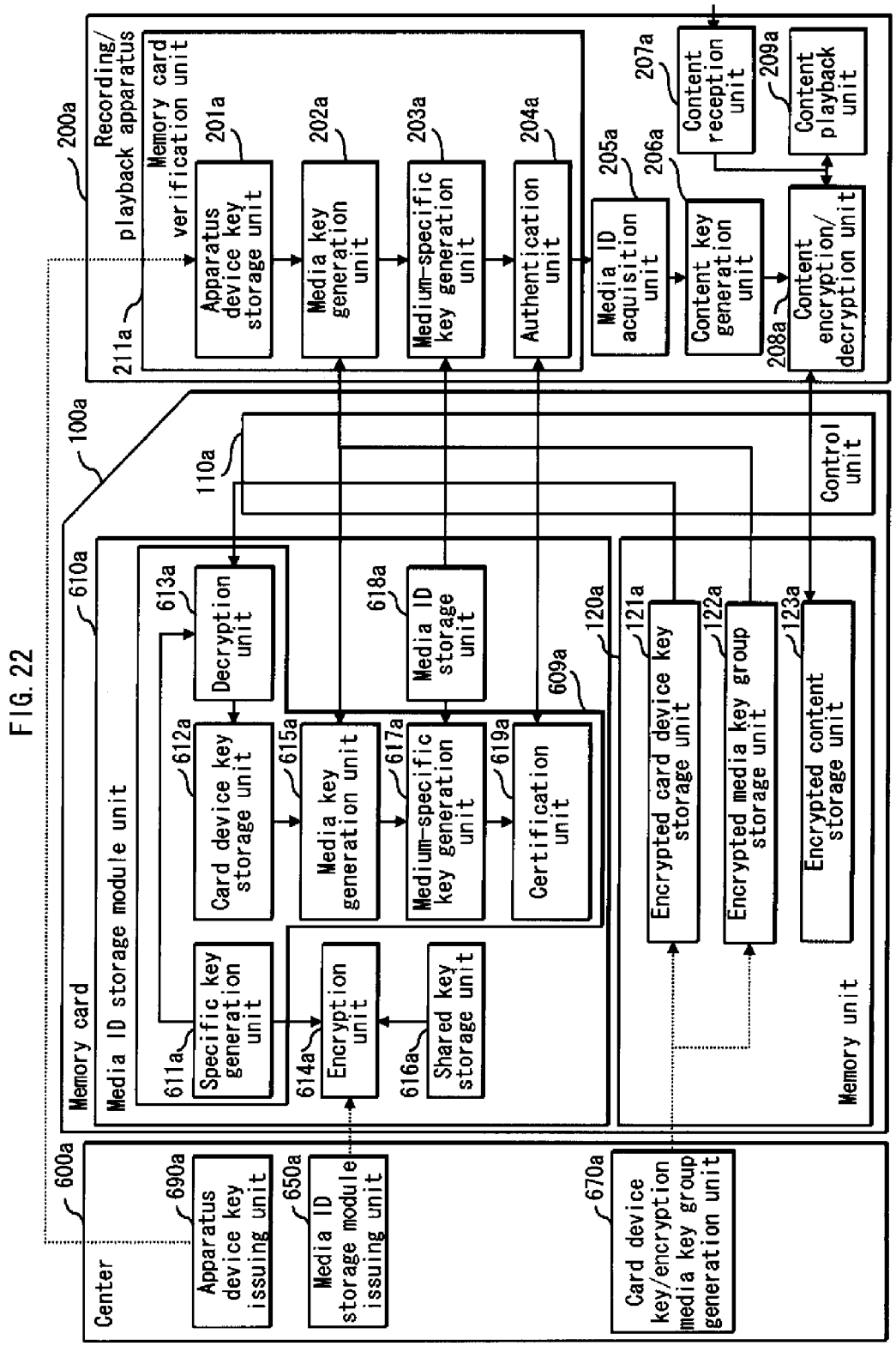
FIG. 22 shows a structure of a recording/playback system 300a (a memory card 100a and a recording/playback device 200a) according to embodiment 2.

FIG. 22 shows a detailed structure of the memory card 100a and the recording/playback device 200a that constitute the recording/playback system 300a.

(1) Detailed Structure of the Memory Card 100a

As shown in FIG. 22, the memory card 100a includes a control unit 110a, a memory unit 120a, and a media ID storage module unit 610a.

The control unit 110a performs a predetermined processing to perform control on the media ID storage module unit 610a and the memory unit 120a, and performs the predetermined control in accordance with a request from the recording/playback device 200a. Specifically, the control unit 110a, in accordance with a request from the recording/playback device 200a, requests a media ID from the media ID storage module unit 610a, acquires the media ID, and transmits the media ID to the recording/playback device 200a. Also, the control unit 110a, in accordance with a request from the recording/playback device 200a, acquires the encrypted media key group from the media unit 120a, and transmits the encrypted media key group to the recording/playback device 200a. Also, the control unit 110a stores, in the memory unit 120a, the encrypted content received from the recording/playback device.

The memory unit 120a further includes an encrypted card device key storage unit 121a, an encrypted media key group storage unit 122a, and an encrypted content storage unit 123a. The encrypted card device key storage unit 121a of the memory unit 120a is an area in which reading and writing cannot be performed from the recording/playback device 200a. The encrypted card device key storage unit 121a stores therein an encrypted card device that the card manufacturer 400a received from the center 600a at the time of manufacturing the memory card, and a card device key ID that identifies the card device. Note that although here, the encrypted card device key storage unit 121a is an area in which reading and writing cannot be performed from the recording/playback device 200a, the present invention is not limited to this. For example, the encrypted card device key storage unit may be an area in which writing cannot be performed from the recording/playback device 200a.

The encrypted media key group storage unit 122a of the memory unit 120a is an area in which only reading can be performed from the recording/playback device 200a, and the encrypted media key group storage unit 122a stores the encrypted media key group received from the center 600a by the card manufacturer 400a at the time of manufacturing the memory card. Note that although a case is anticipated here in which the encrypted media key group is not updated and the encrypted media key group storage unit 122a is an area in which reading from the recording/playback device 200a only is possible, the present invention is not limited to this structure. For example, the encrypted media key group storage unit 122a may be an area in which data can be read and written from the recording/playback device 200a in a case when the encrypted media key group is updated.

The encrypted content storage unit 123a of the memory unit 120a is an area in which data can be read and written by the recording/playback device 200a, and content encrypted by the recording/playback device 200a is stored in the encrypted content storage unit 123a.

Also, when the card manufacturer 400a has received a media ID storage module unit in the form of a semiconductor device such as an LSI from the center 600a, the received media ID storage module unit is implemented as is in the media ID storage module unit 610a. When the card manufacturer 400a has received a circuit IP instead of a media ID storage module unit from the center 600a, a semiconductor device such as an LSI manufactured according to the circuit IP received by the card manufacturer 400a is implemented in the media ID storage module unit 610a. Since the inner structure of the media ID storage module 610a has already been described, description thereof is omitted here.

Here, the control unit 110a is, for example, made up of a semiconductor device such as an LSI, the memory unit 120a is, for example, made up of a flash memory, and the media ID storage module unit 610a is made up of a semiconductor device such as an LSI.

(2) Detailed Structure of the Recording/Playback Device 200a

As shown in FIG. 22, the recording/playback device 200a includes a memory card verification unit 211a, a media ID acquisition unit 205a, a content key generation unit 206a, a content reception unit 207a, a content encryption/decryption unit 208a, and a content playback unit 209a. The memory card verification unit 211a includes an apparatus device key storage unit 201a, a media key generation unit 202a, a medium-specific key generation unit 203a, and an authentication unit 204a.

The memory card verification unit 211a, with use of the medium-specific key generated with use of the encrypted media key group received from the memory card 100a, performs mutual authentication with the memory card 100a. Performing the mutual authentication processing enables distinguishing whether the memory card 100a is an authorized memory card or an unauthorized memory card.

The following describes the apparatus device key storage unit 201a, the media key generation unit 202a, the medium-specific key generation unit 203a, and the authentication unit 204a, which constitute the memory card verification unit 211a.

The apparatus device key storage unit 201a stores a 128-bit specific apparatus device key that is different for each recording/playback device, and an apparatus device key ID that identifies the apparatus device key.

The media key generation unit 202a has a similar structure to the media key generation unit 615a of the memory card 100a. The media key generation unit 202a acquires the encrypted media key group by reading the encrypted media key group from the encrypted media key group storage unit 122a of the memory card 100a, and selects one of the encrypted media key group corresponding to the apparatus device key ID. Next, the media key generation unit 202a decrypts the selected encrypted media key according to the following expression with use of the AES decryption function, using the apparatus device key as the key, thereby generating the media key, and outputs the generated media key to the medium-specific key generation unit 203a.

Media key=AES-D(apparatus device key, encrypted media key)

An exemplary encrypted media key group is shown in FIG. 19. As shown in FIG. 19, the encrypted media keys included in the encrypted media key group 860 has been generated by encrypting the 128-bit media key according to the AES encryption function, with use of the 128-bit card device key, or with use of the apparatus device key.

The medium-specific key generation unit 203a has a similar structure to the medium-specific key generation unit 617a of the memory card 100a. The medium-specific key generation unit 203a acquires the media ID via the control unit 110a from the media ID storage unit 618a of the memory card 100a, and with use of the one-way function G, generates the medium-specific key from the media ID according to the following expression, and outputs the acquired media ID and generated medium-specific key to the authentication unit 204a.

Medium-specific key=G(media key, media ID)

Note that the one-way function G can be realized with use of AES encryption as a specific example according to the following expression.

Medium-specific key=AES-D(media key, media ID)
(+)media ID

Here, (+) represents an exclusive-or operation.

The authentication unit 204a receives a media ID and a medium-specific key from the medium-specific key generation unit 203a. Next, with use of the received medium-specific key, the authentication unit 204a performs mutual authentication processing with the authentication unit 619a of the memory card 100a. The details of the mutual authentication processing are described later. The authentication unit 204a outputs the media ID received from the medium-specific key generation unit 203a to the media ID acquisition unit 205a only when the mutual authentication with the authentication unit 619a of the memory card 100a has succeeded.

The media ID acquisition unit 206 acquires the media ID from the authentication unit 204a only when the mutual authentication by the authentication unit 204a has succeeded, and in that case, transmits the acquired media ID to the content key generation unit 206a.

The content key generation unit 206a generates a content key according to the media ID received from the media ID acquisition unit 205a. The specific method of generating the content key is described later. The content key generation unit 206a outputs the generated content key to the content encryption/decryption unit 208a.

The content reception unit 207a receives digitally broadcast digital content or digitally distributed digital content, and transmits the received digital content to the content encryption/decryption unit 208a.

The content encryption/decryption unit 208a receives the content key from the content key generation unit 206a. Next, the content encryption/decryption unit 208a encrypts the digital content received from the content reception unit 207a with use of the received content key, and transmits the encrypted digital content to the memory card 100a. Also, the content encryption/decryption unit 208a receives the encrypted digital content from the memory card 100a, decrypts the received encrypted digital content with use of the received content key, thus generating the digital content, and transmits the generated digital content to the content playback unit 209a. The details of the content encryption and decryption are described later.

The content playback unit 209a plays back the decrypted digital content received from the content encryption/decryption unit 208a.

Figure 23:
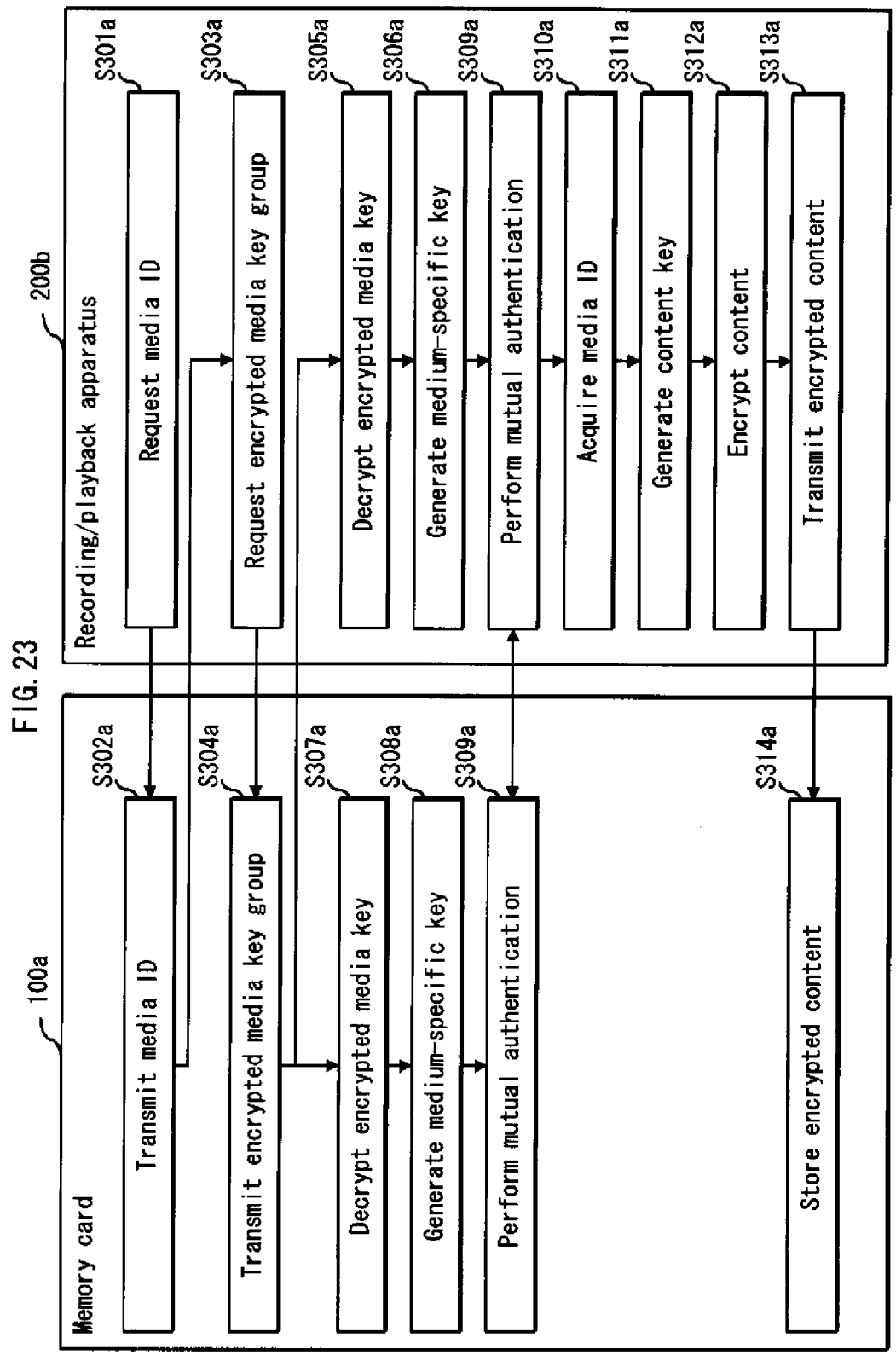
FIG. 23 is a flowchart showing operations of the recording/playback system 300a (the memory card 100a and the recording/playback device 200a) at the time of recording according to embodiment 2.

2.6 Operations of the Recording/Playback System 300a (1) Operations of the Recording/Playback System 300a at the Time of Recording The following describes operations of the recording/playback system 300a at the time of recording with reference to the flowchart in FIG. 23.

As shown in FIG. 23, first, the medium-specific key generation unit 203a of the recording/playback device 200a requests the media ID from the memory card 100a (S301a). The control unit 110a of the memory card 100a, according to the request of the media ID from the recording/playback device 200a, acquires the media ID from the media ID storage unit 618a, and transmits the acquired media ID to the recording/playback device 200a (S302a). The media key generation unit 202a of the recording/playback device 200a requests the encrypted media key group from the memory card 100a (S303a). The control unit 110a of the memory card 100a, according to the request of the encrypted media key group from the recording/playback device 200a, acquires the encrypted media key group from the encrypted media key group storage unit 122a of the memory unit 120a, and transmits the acquired encrypted media key group to the recording/playback device 200a (S304a).

Next, the media key generation unit 202a of the recording/playback device 200a selects, from among the encrypted media key group received from the memory card 100a, one encrypted media key corresponding to the apparatus device key ID acquired from the apparatus device key storage unit 210a. Next, the media key generation unit 202a generates the media key according to the following expression using the AES decryption function with use of the one encrypted media key selected from the encrypted media key group, and the apparatus device key acquired from the apparatus device key storage unit 201a, and transmits the generated media key to the medium-specific key generation unit 203a (S305a).

Media key=AES-D(apparatus device key, encrypted media key)

The medium-specific key generation unit 203a of the recording/playback device 200a generates the medium-specific key according to the following expression with use of the media ID acquired in step S301a, the media key received from the media key generation unit 202a, and the one-way function G.

Medium-specific key=G(media key, media ID)

Note that the one-way function G can be realized with use of AES encryption, as a specific example.

Medium-specific key=AES-D(media key, media ID)
(+)media ID

Here, (+) represents an exclusive-or operation (S306a).

Similarly to the media key generation unit 202a of the recording/playback device 200a, the media key generation unit 615a of the memory card 100a also selects, from among the encrypted media key group of the encrypted media key group storage unit 122a of the memory unit 120a, one encrypted media key corresponding to the card device key ID acquired from the encrypted card device key storage unit 121a. Next, the media key generation unit 615a generates the media key according to the following expression with use of the one encrypted media key selected from the encrypted media key group, and the card device key acquired from the card device key storage unit 612a, and transmits the generated media key to the medium-specific key generation unit 617a (S307a).

Media key=AES-D(card device key, encrypted media key)

Similarly to the medium-specific key generation unit 203a of the recording/playback device 200a, the medium-specific key generation unit 617a of the memory card 100a generates the medium-specific key according to the following expression with use of the media ID acquired from the media ID storage unit 618a, the media key acquired form the media key generation unit 615a, and the one-way function G.

Medium-specific key=G(media key, media ID)

Note that the one-way function G can be realized with use of AES encryption, as a specific example.

Medium-specific key=AES-D(media key, media ID)
(+)media ID

Here, (+) represents an exclusive-or operation.

The authentication unit 619a of the memory card 100a and the authentication unit 204a of the recording/playback device 200a perform mutual authentication with each other (S309a). The details of the mutual authentication are described later.

If the mutual authentication fails in step S309a, the processing ends. Thus, decryption of the encrypted content is prohibited, and encryption of the content is prohibited.

If the mutual authentication succeeds in step S309a, the media ID acquisition unit 205a acquires the media ID from the authentication unit 204a (S310a).

The content key generation unit 206a generates a content key for the media ID acquired from the media ID acquisition unit 205a according to the following expression with use of the one-way function F, and transmits the generated content key to the content encryption/decryption unit 208a (S311a).

Content key=F(media ID)

The one-way function F can be realized with use of AES encryption as a specific example according to the following expression.

Content key=AES(content key generation private key, media ID)(+)media ID

Here, (+) represents an exclusive-or operation. Also, the content key generation private key is 128 bits, is privately held in common with all the recording/playback devices, and is stored in advance in the content key generation unit 207. Since AES encryption is widely known, description thereof is omitted here.

Note that here, although AES encryption is used as an example of the content key generation function, any one-way function that generates a 128-bit random number as a content key according to a 128-bit media ID may be used.

The content encryption/decryption unit 208a, with use of the content key received from the content key generation unit 206a, encrypts the digitally-broadcast digital content or the digitally distributed digital content received from the content reception unit 207a (S312a). The content encryption/decryption unit 208a transmits the encrypted digital content to the memory card 100a (S313a).

Here, the encryption of the content is performed according to the following expression, for example.

Encrypted digital content=AES-ECBC(content key, digital content)

Here, AES-ECBC indicates performing AES encryption with use of CBC mode (Cipher Block Chaining). Since CBC mode is widely known, description thereof is omitted. Note that although here, an example of AES-CBC is used, the present invention is not limited to this structure.

Here, the control unit 110a of the memory card 100a receives encrypted digital content from the recording/playback device 200a, and stores the received encrypted digital content in the encrypted content storage unit 123a (S314a).

(2) Exemplary Mutual Authentication Processing

Figure 24:
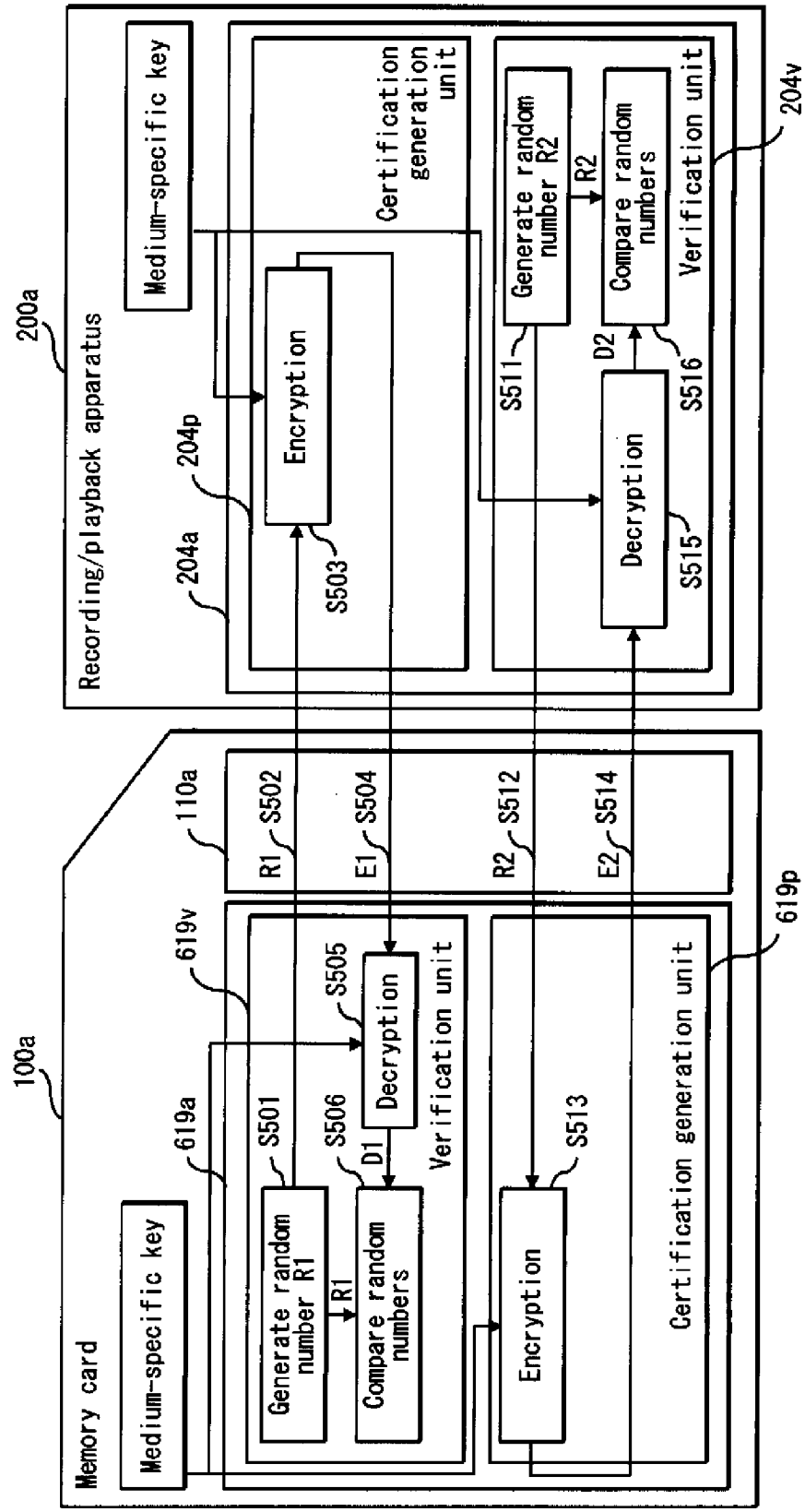
FIG. 24 shows exemplary authentication processing performed by the recording/playback system 300a (the memory card 100a and the recording/playback device 200a) according to embodiment 2.

Next, the following describes exemplary mutual authentication processing with reference to the process chart in FIG. 24. The mutual authentication processing described here is challenge and response authentication.

The authentication unit 619a of the memory card 100a generates a random number R1 as challenge data (S501). The authentication unit 619a of the memory card 100a transmits the generated random number R1 to the recording/playback device 200a as the challenge data. The authentication unit 204a of the recording/playback device 200a receives the random number R1 as the challenge data (S502).

The authentication unit 204a of the recording/playback device 200a encrypts the random number R1, as the received challenge data, with use of the medium-specific key received from the medium-specific key generation unit 203a, and generates the encrypted random number E1=AES-E (medium-specific key, random number R1) as response data (S503). Here, the encrypted random number E1 is certification information used by the recording/playback device for certifying the validity of the recording/playback device. The authentication unit 204a transmits the encrypted random number E1 to the memory card 100a as the response data, and the authentication unit 619a of the memory card 100a receives the encrypted random number E1 as the response data (S504).

The authentication unit 619a of the memory card 100a decrypts the encrypted random number E1, as the received response data, with use of the medium-specific key acquired from the medium-specific key generation unit 617a, thus generating the random number D1=AES-D (medium-specific key, encrypted random number E1) (S505). The authentication unit 619a of the memory card 100a compares the generated random number D1 and the random number R1 generated in S501 (S506). If the random number D1 matches the random number R1, the authentication unit 619a proceeds to the next step S511, and if the random number D1 does not match the random number R1, mutual authentication processing ends.

The authentication unit 204a of the recording/playback device 200a generates a random number R2 as the challenge data (S511). The authentication unit 204a of the recording/playback device 200a transmits the random number R2 to the memory card 100a as the generated challenge data. The authentication unit 619a of the memory card 100a receives the random number R2 as the challenge data (S512).

The authentication unit 619a of the memory card 100a encrypts the random number R2 as the received challenge data with use of the medium-specific key received from the medium-specific key generation unit 617a, thus generating the encrypted random number E2=AES-E (medium-specific key, random number R2) as the response data (S513). Here, the encrypted random number E2 is certification information used by the memory card 100a for certifying the validity of the memory card 100a. The authentication unit 619a transmits the encrypted random number E2 to the recording/playback device 200a as the response data, and the authentication 204a of the recording/playback device 200a receives the encrypted random number E2 as the response data (S514).

The authentication unit 204a of the recording/playback device 200a decrypts the received encrypted random number E2 with use of the medium-specific key acquired from the medium-specific key generation unit 203a, thus generating the random number D2=AES-D (medium-specific key, encrypted random number E2) (S515). The authentication unit 204a of the recording/playback device 200a compares the generated random number D2 to the random number R2 generated in S511 (S516). If the random number D2 matches the random number R2, the authentication unit 204a transmits the media ID to the media ID acquisition unit 205a. If the random number D2 does not match the random number R2, the mutual authentication processing ends.

In the process chart shown in FIG. 24, steps S501, S502, S505, and S506 constitute a verification unit 619v in the authentication unit 619a. Also, steps S503 and S504 constitute a certification generation unit 204p in the authentication unit 204a.

Furthermore, in the process chart shown in FIG. 24, steps S511, S512, S515, and S516 constitute a verification unit 204v in the authentication unit 204a. Also, steps S513 and S514 constitute a certification generation unit 619p in the authentication unit 619a.

The above-described AES-E is an AES encryption function, and the above-described AES-D is an AES decryption function. Note that although AES is used in the above description, the present invention is not limited to this. Another common-key encryption method may be used. Also, although the challenge and response type authentication protocol is used in the above description, the present invention is not limited to this. Another authentication protocol may be used.

(3) Operations of the Recording/Playback System 300a at the Time of Recording

Figure 25:
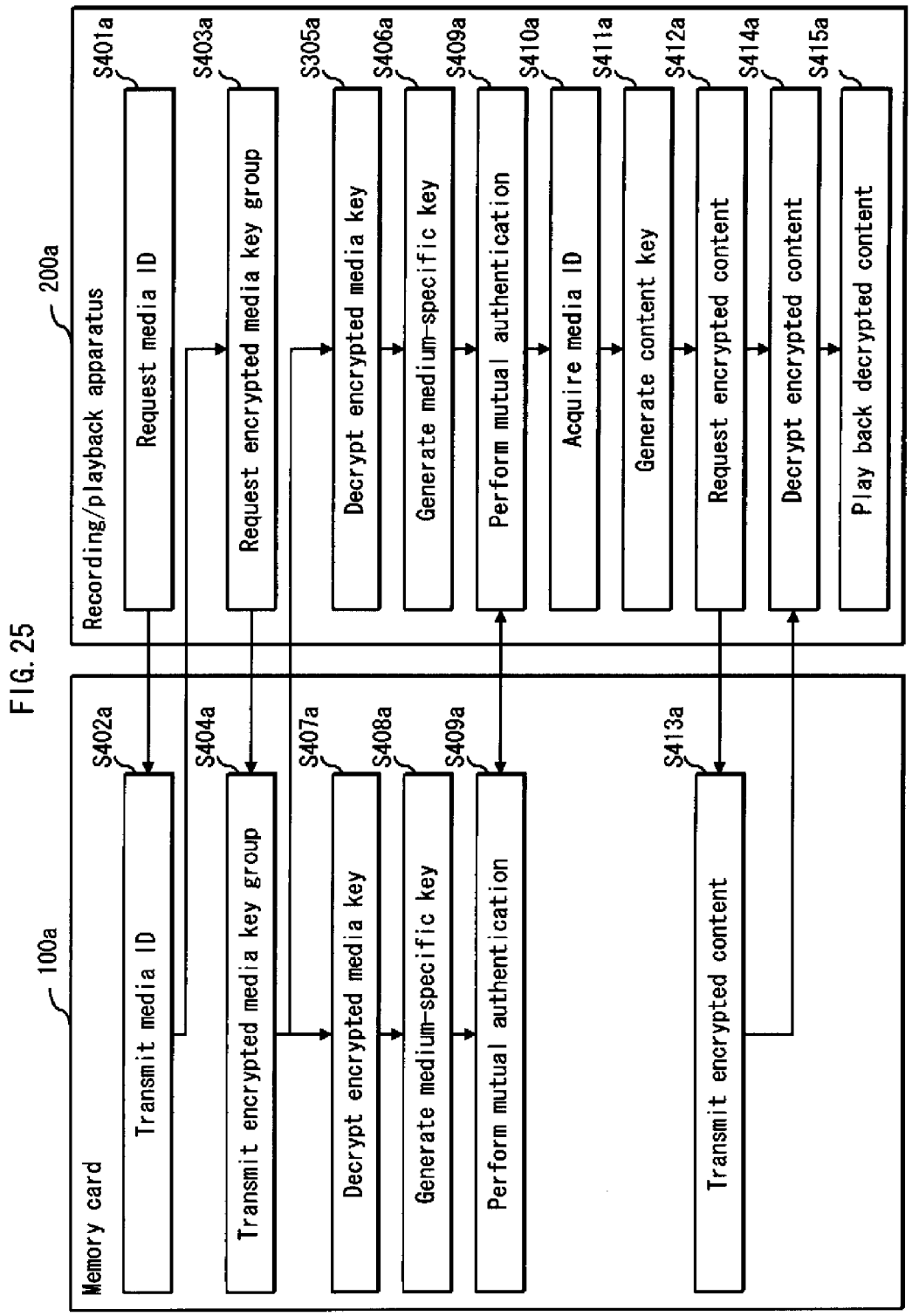
FIG. 25 is a flowchart showing operations of the recording/playback system 300a (the memory card 100a and the recording/playback device 200a) at the time of playback according to embodiment 2.

The following describes operations at the time of reading the encrypted content from the memory card 100a and playing back the encrypted content with reference to the flowchart shown in FIG. 25.

Note that since the steps from S401a to S411a shown in FIG. 25 are exactly the same operations, respectively, as the steps S301a to S311a shown in FIG. 23, description thereof is omitted here.

The content encryption/decryption unit 208a of the recording/playback device 200a requests the memory card 100a to transmit the encrypted content (S412a). In accordance with the transmission request for encrypted content from the recording/playback device 200a, the control unit 110a of the memory card 100a reads the encrypted content from the encrypted content storage unit 123a, and transmits the encrypted content to the recording/playback device 200a (S413a). The content encryption/decryption unit 208a decrypts the encrypted content received from the memory card 100a with use of the content key received from the content key generation unit 206a, and transmits the decrypted content to the content playback unit 209a (S414a).

Here, the decryption of the content is represented by the following expression.

Decrypted digital content=AES-DCBC(content key, encrypted digital content)

Here, AES-DCBC indicates performing AES decryption with use of CBC mode (Cipher Block Chaining).

The content playback unit 209a plays back the decrypted content received from the content encryption/decryption unit 208a (S415a).

2.7 Distinguishing Unauthorized Memory Cards

As described above, according to embodiment 2, even if the card manufacturer manufactures an unauthorized memory card, the memory card verification unit 211a of the recording/playback device 200a can distinguish whether the memory card is a legitimately manufactured memory card or an unauthorized memory card. This structure is described with reference to FIG. 26.

Figure 26:
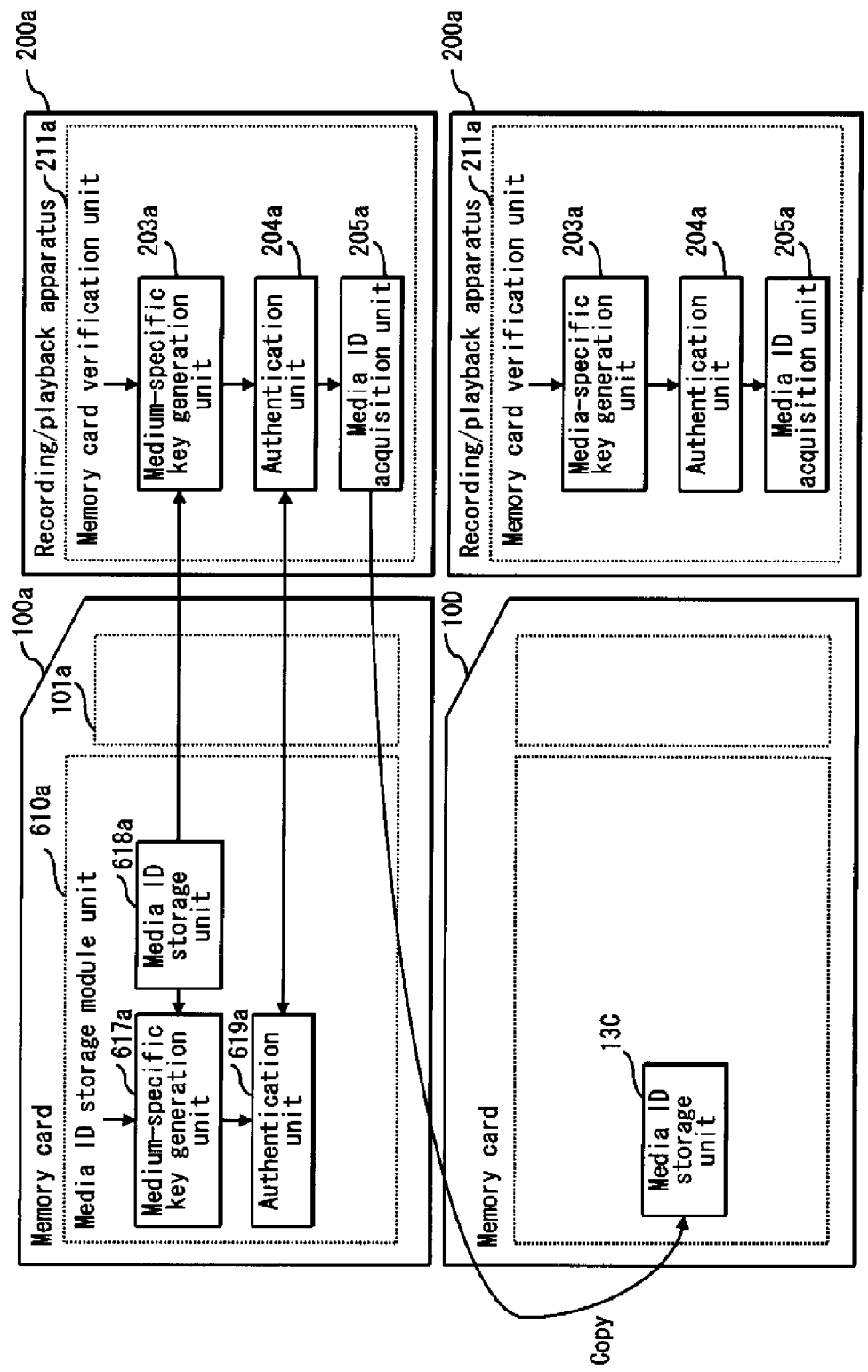
FIG. 26 illustrates effects of the recording/playback system 300a according to embodiment 2.

In FIG. 26, the memory card 100a is the memory card according to embodiment 2 (hereinafter referred to as an authorized memory card), the recording/playback device 200a is the recording/playback device according to embodiment 2 (hereinafter referred to as the authorized recording/playback device), and a memory card 10D is a memory card (hereinafter referred to as the unauthorized memory card) manufactured by an unauthorized card manufacturer by acquiring a media ID by operating the memory card 100a and the recording/playback device 200a of embodiment 2, and storing the media ID in the media ID storage unit 13C of the memory card 10D, which has a conventional structure.

At this time, even if an attempt is made to perform recording/playback processing on the authorized recording/playback device 200a with use of the unauthorized memory card 10D, since the unauthorized memory card 10D cannot generate the medium-specific key, the mutual authentication processing with the authentication unit 204a of the memory card verification unit 211a fails. That is to say, even if the card manufacturer manufactures an unauthorized memory card, the authorized recording/playback device 200a can distinguish whether the memory card is an unauthorized memory card or an authorized memory card.

2.8 Variations (1) Although in embodiment 1, RSA that is a message recovery signature is used for generating the center issue signature by the manufacturer public key certificate and generating the memory card issue signature in the media ID signature data, the present invention is not limited to this.

For example, instead of message recovery signature (a method in which the signed data is recovered by signature verification of the signature data), an attached signature method may be used (signature verification is performed with use of signature data and signed data attached to the signature data). Specifically, instead of RSA, an elliptic curve cryptosystem may be used.

Also, for example, in place of using a public key encryption-type signature algorithm such as RSA or an elliptic curve cryptosystem, for example, a common key encryption-type algorithm such as a MAC (Message Authentication Code) algorithm, which uses AES encryption, may be used. In this case, the media ID storage module unit 610 of the memory card 100 may include a MAC generation private key storage unit instead of the manufacturer private key storage unit 612 and a MAC generation unit instead of the signature generation unit 613, and the recording/playback device 200 may include a MAC generation private key storage unit instead of the center public key storage unit 202 or the manufacturer public key storage unit 205, and a MAC verification unit instead of the signature verification unit 204. Since the MAC algorithm is publicly known, description thereof is omitted here. Note that in this case, the MAC generation private key storage unit and the MAC verification unit of the recording/playback device 200 may be issued from the center as tamper-resistant modules.

(2) Although in embodiment 1, the media ID storage module unit 610 of the memory card 100 includes the manufacturer private key storage unit 612, and the media ID signature is generated with use of the manufacturer private key, the present invention is not limited to this structure.

Figure 27:
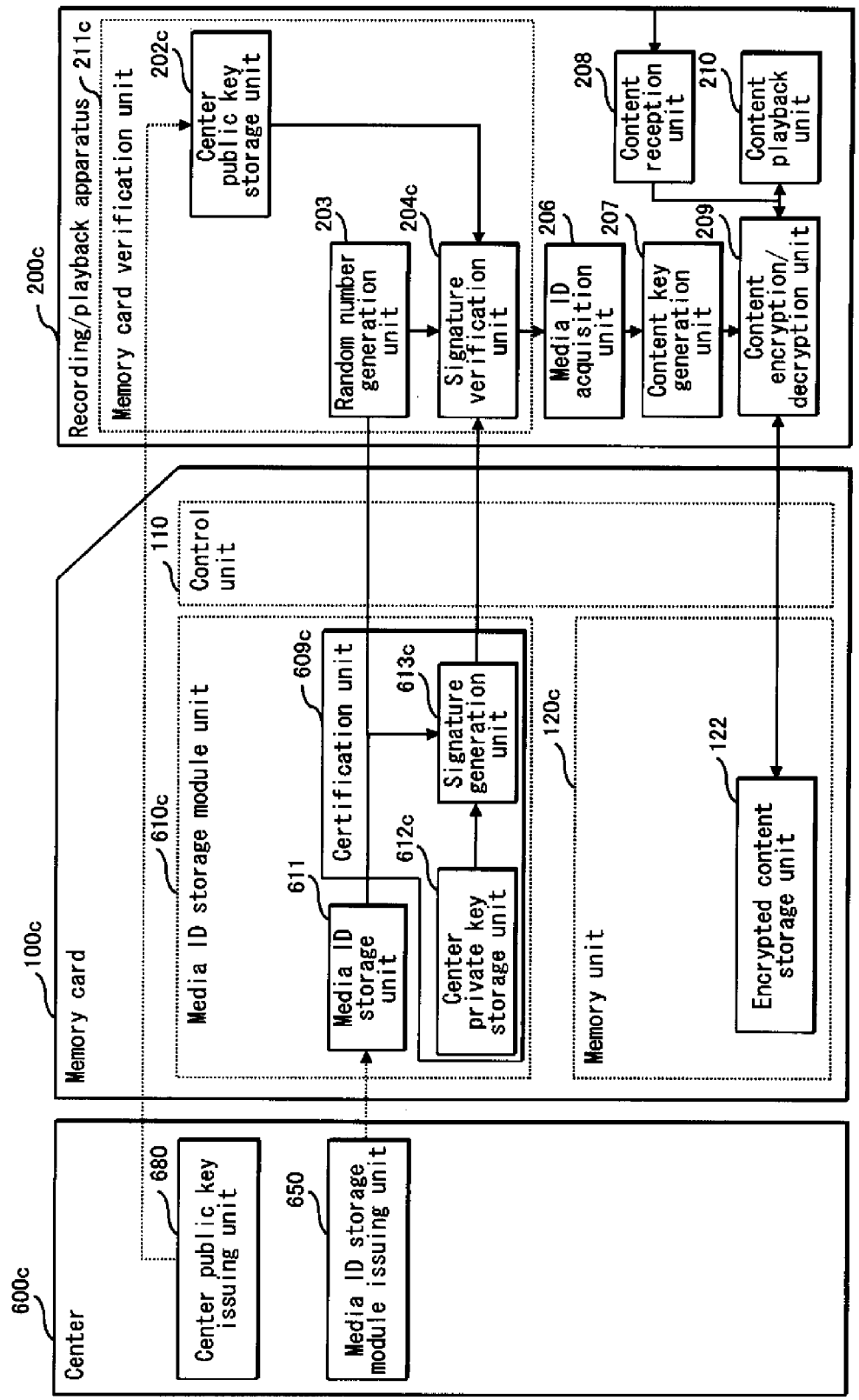
FIG. 27 shows a structure of a recording/playback system 300c (a memory card 100c and a recording/playback device 200c) as a variation of embodiment 1.

For example, as shown in FIG. 27, the center private key storage unit 612c may be included in the media ID storage module unit 610c of a memory card 100c in place of the manufacturer private key storage unit 612, and the media ID signature may be generated with use of the center private key. In this case, as shown in FIG. 27, the recording/playback device 200c verifies the media ID signature with use of the center public key.

Specifically, as shown in FIG. 27, the center 600 is replaced with a center 600c, the memory card 100 is replaced with a memory card 100c, and the recording/playback device 200 is replaced with a recording/playback device 200c.

The center 600c has a similar structure to the center 600, but does not include the manufacturer public key certificate issuing unit 660.

Also, the memory card 100c has a similar structure to the memory card 100, but includes a media ID storage module unit 610c and the memory unit 120c in place of the media ID storage module unit 610 and the memory unit 120. The media ID storage module unit 610c is a tamper-resistant module, and includes a center private key storage unit 612c and a signature generation unit 613c instead of the center private key storage unit 612 and the signature generation unit 613. The center private key storage unit 612c and the signature generation unit 613c constitute a certification unit 609c. The memory unit 120c does not include the manufacturer public key certificate storage unit 121, and does include the encrypted content storage unit 122.

The recording/playback device 200c has a similar structure to the recording/playback device 200, but includes a memory card verification unit 211c in place of the memory card verification unit 211. The memory card verification unit 211c includes a center public key storage unit 202c, a random number generation unit 203, and a signature verification unit 204c.

The center private key storage unit 612c stores therein the center private key.

The signature generation unit 613c generates media ID signature data with use of the RSA signature generation function. The media ID signature data is made up of a random number, a media ID, and a memory card issue signature. Here, the media ID is the media ID stored in the media ID storage unit 611. The random number is the random number received from the random number generation unit 203 of the recording/playback device 200. The memory card issue signature is generated by RSA-SIGN (center private key, random number||media ID). The signature generation unit 613c outputs the generated media ID signature data to the recording/playback device 200c via the control unit 110c.

The center public key storage unit 202c stores therein the center public key.

The signature verification unit 204c verifies the media ID signature data received from the memory card 100c with use of the center public key received from the center public key storage unit 202c. The verification of the signature in this case is message recovery verification. If the verification succeeds, the signature verification unit 204c extracts the media ID (identification information) from the media ID signature data that is the target of verification, and transmits the extracted media ID to the media ID acquisition unit 206.

(3) In embodiment 2, as shown in FIG. 22, a specific key generation unit 611a, an encryption unit 614a, and a common key storage unit 616a are provided in the media ID storage module unit 610a. In the structure described in embodiment 2, as shown in FIG. 15, in the card manufacturer 400a, after implementing the media ID storage module unit in the memory card 100a, the card manufacturer 400a acquires the encrypted card-specific key from the memory card 100a, and transmits the encrypted card-specific key to the center 600a. The encrypted card-specific key is decrypted by the center 600a. The card device key is encrypted with use of the card-specific key, and the encrypted card device key is transmitted to the card manufacturer 400a. The card manufacturer 400a implements the encrypted card device key in the memory card 100a. However, when the media ID storage module unit is issued from the center 600a to the card manufacturer 400a as a semiconductor device, the present invention is not limited to this structure.

Figure 28:
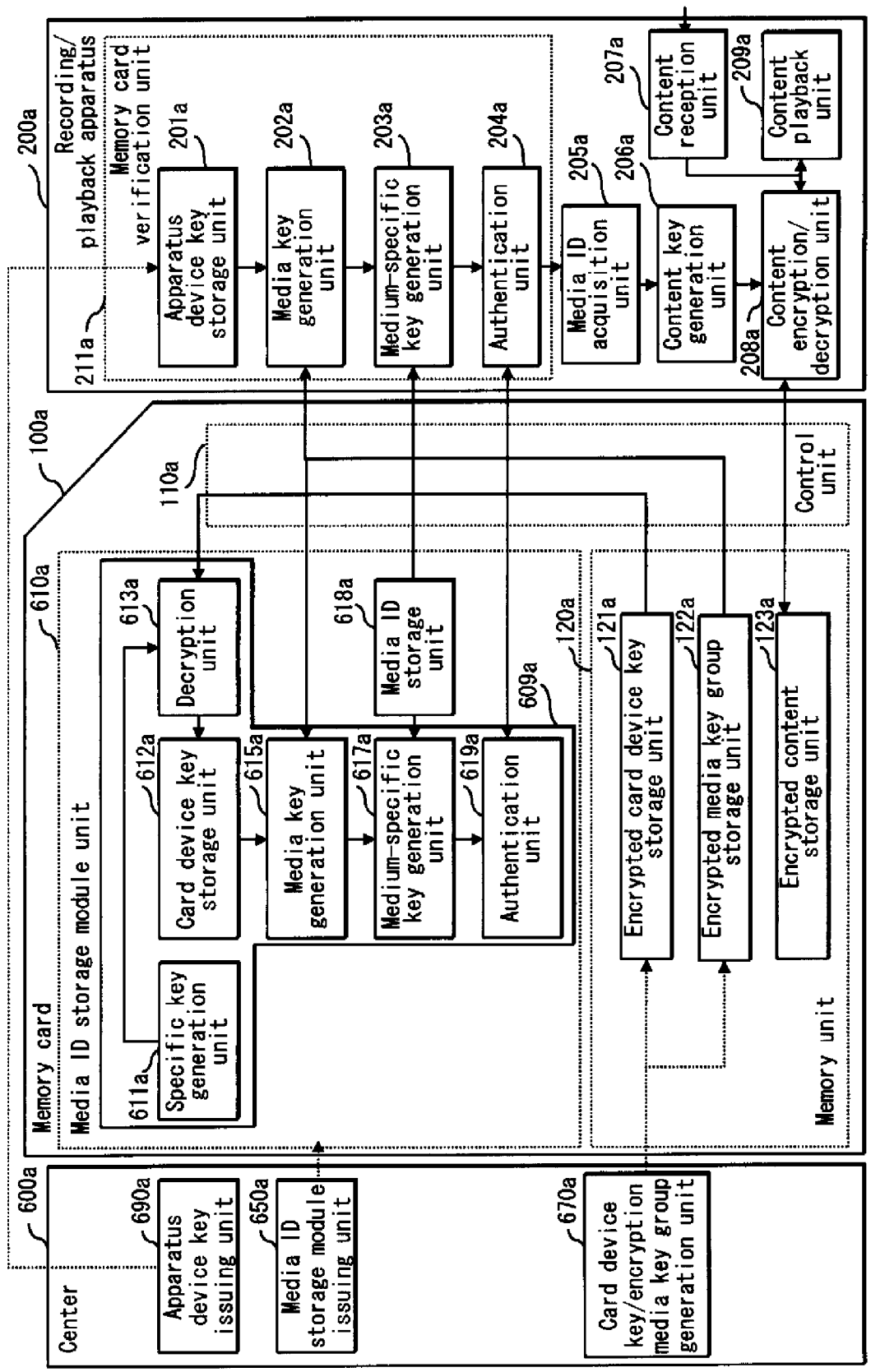
FIG. 28 shows a structure of a recording/playback system (the memory card 100a and the recording/playback device 200a) as a variation of embodiment 2.

For example, as shown in FIG. 28, the following structure may be used: omitting the encryption unit 614a and the common key storage unit 616a from the media ID storage module unit 610a, implementing the media ID storage module unit as a semiconductor device in the center 600a, and configuring the device so that the center 600a acquires the card-specific key generated by the specific key generation unit 611a from the memory card 100a, encrypts the card device key with use of the acquired card-specific key, and issues the encrypted card device key along with the media ID storage module.

(4) Embodiments 1 and 2 describe the recording/playback devices 200 and 200a as devices having the functions of both recording and playing back digital content. However, the recording/playback device may be realized as a playback device that only has the playback function, or a recording device that only has the recording function.

(5) Embodiments 1 and 2 describe a structure in which the control unit of the memory card and the media ID storage module are realized as separate semiconductor devices. However, the present invention is not limited to this structure. For example, a structure may be used in which the function of the control unit is incorporated into the media ID storage module, and the control unit of the memory card and the media ID storage module are on a single semiconductor.

3. Embodiment 3

The following describes another embodiment of the present invention with reference to the drawings.

3.1 Overall Structure

Figure 29:
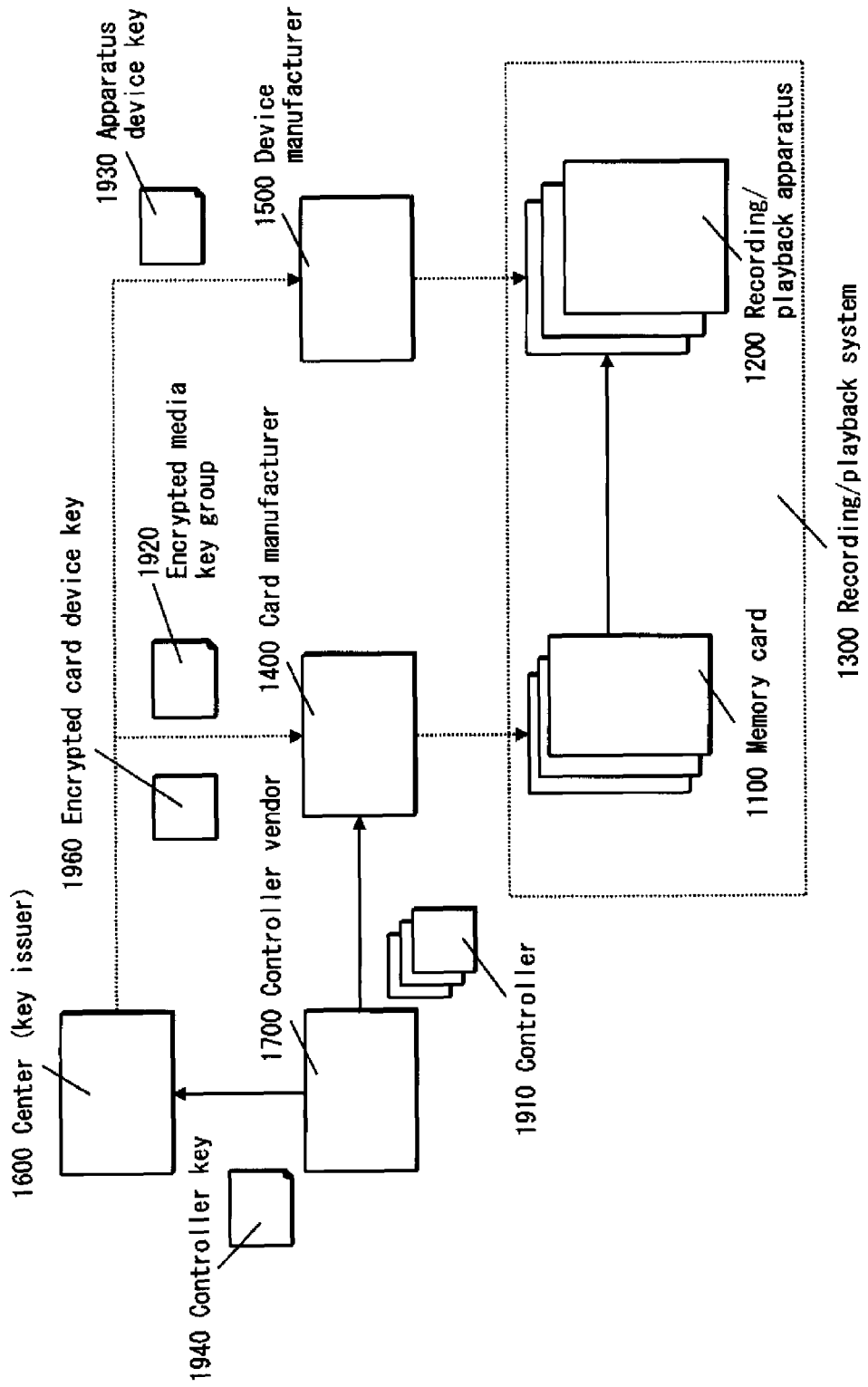
FIG. 29 shows an overall structure of a recording/playback system 1300, a center 1600, a controller vendor 1700, a card manufacturer 1400, and a device manufacturer 1500 according to embodiment 3.

FIG. 29 shows an overall structure of recording/playback system 1300, a card manufacturer 1400 pertaining to the manufacture of the recording/playback system 1300, a device manufacturer 1500, a center (key issuing authority 1600), and a controller vendor 1700 according to embodiment 3. The controller vendor 1700 is trusted by the center 1600. The recording/playback system 1300 is made up of the plurality of memory cards 100, . . . , and a plurality of recording/playback devices 1200, . . . . Note that the card manufacturer 1400, the device manufacturer 1500, the center 1600 and the controller vendor 1700 represent, respectively, devices that a card manufacturer, a device manufacturer, a center, and a controller vendor have.

The center 1600 performs the following processing (a) through (d).

(a) The center 1600 receives a controller key 1940 from the controller vendor 1700. The controller vendor 1700 is licensed by the center 1600 to manufacture a controller 1910. The controller 1910 is implemented on the memory card 1100.

(b) The center 1600 generates the encrypted card device key and the encrypted media key group. The encrypted card device key is generated by encrypting the card device key with use of the received controller key 1940. The encrypted media key group includes a plurality of encrypted media keys. The plurality of encrypted media keys is generated by encrypting one media key with use of a plurality of card device keys and a plurality of apparatus device keys. Note that a different card device key exists for each memory card, and a different apparatus device key exists for each recording/playback device.

(c) The center 1600 issues an encrypted card device key 1960 and an encrypted media key group 1920 to the card manufacturer 1400. The card manufacturer 1400 is licensed by the center 1600 to manufacture the memory card 1100.

(d) The center 1600 issues an apparatus device key 1930 necessary for manufacturing the recording/playback device 1200 to the device manufacturer 1500. The device manufacturer 1500 is licensed by the center 1600 to manufacture the recording/playback device 1200.

Note that the details of the controller 1910, the encrypted card device key 1960, the encrypted media key group 1920, the apparatus device key 1930, and the controller key 1940 are described later.

The controller vendor 1700 generates the controller key 1940, transmits the controller key 1940 to the center 1600, and issues the controller 1910 to the card manufacturer 1400. Here, the controller 1910 is semiconductor device that controls the memory mounted in the memory card 1100, and provides an interface with the recording/playback device equipped with the memory card 1100. Specifically, the controller 1910 is configured as a semiconductor chip such as an LSI. Also, the controller 1910 is a tamper-resistant module. For this reason, the structure and information in the controller 1910 cannot be analyzed from outside the controller 1910.

The card manufacturer 1400 implements, in the memory card 1100, the controller 1910 received from the controller vendor 1700, the encrypted card device key 1960 and the encrypted media key group 1920 received from the center 1600.

The device manufacturer 1500 implements the apparatus device key 1930 received from the center 1600 in the recording/playback device 1200.

3.2 Structure of the Center 1600, the Controller Vendor 1700, the Card Manufacturer 1400, and the Device Manufacturer 1500

Figure 30:
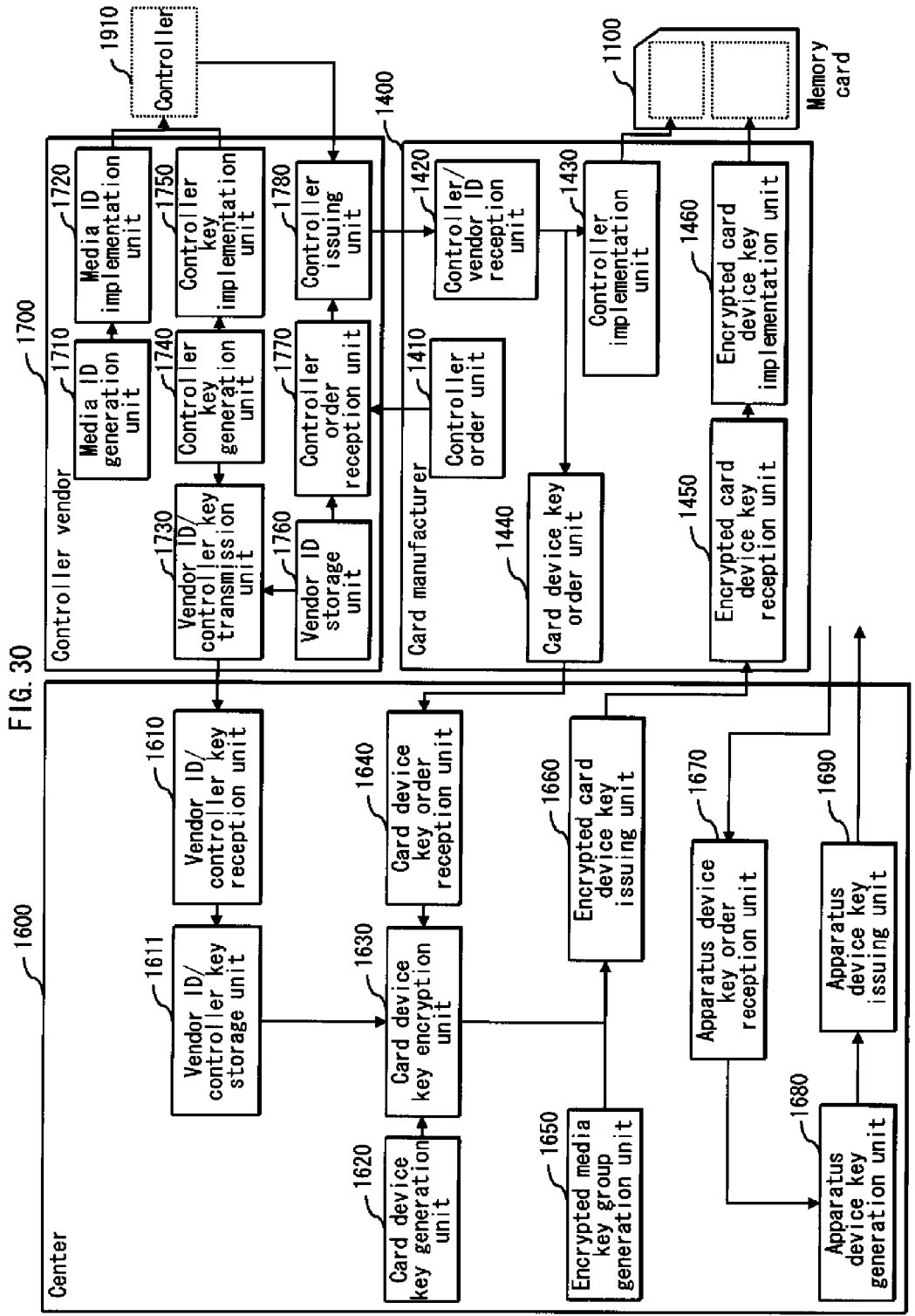
FIG. 30 shows a structure of the center 1600, the controller vendor 1700, and the card manufacturer 1400 according to embodiment 3.
Figure 31:
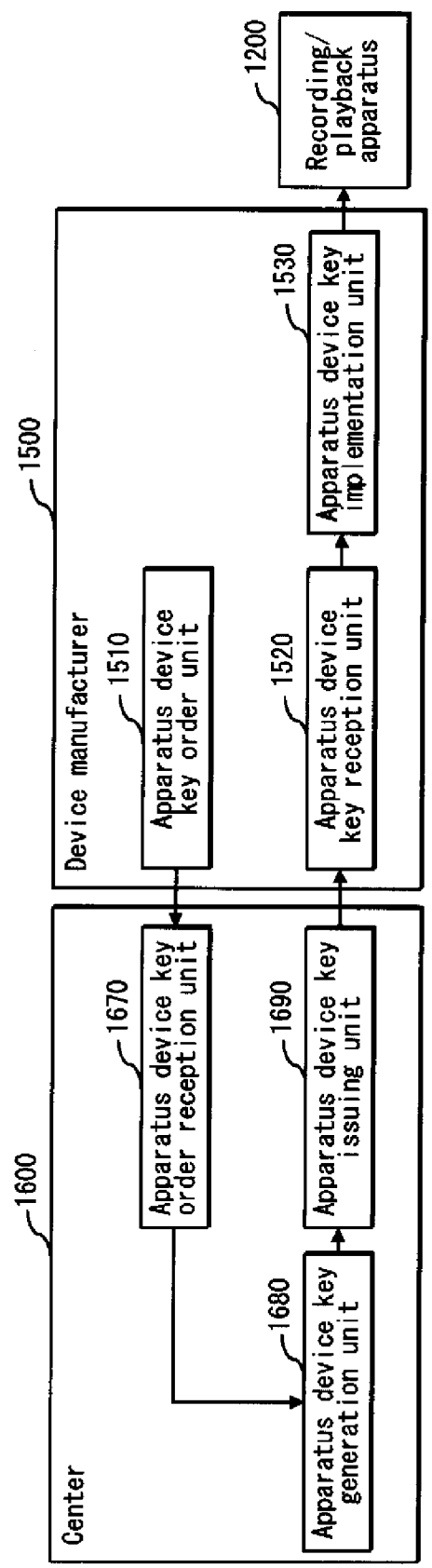
FIG. 31 shows a structure of the center 1600 and the device manufacturer 1500 according to embodiment 3.

FIG. 30 shows the structure of the center 1600, the controller vendor 1700, and the card manufacturer 1400. Also, FIG. 31 shows the structure of the center 1600 and the device manufacturer 1500.

As shown in FIG. 30, the center 1600 includes a vendor ID/controller key reception unit 1610, a vendor ID/controller key storage unit 1611, a card device key generation unit 1620, a card device key encryption unit 1630, a card device key order form reception unit 1640, an encrypted media key group generation unit 1650, an encrypted card device key issuing unit 1660, an apparatus device key order form unit 1670, an apparatus device key generation unit 1680, and an apparatus device key issuing unit 1690.

As shown in FIG. 30, the controller vendor 1700 includes a media ID generation unit 1710, a media ID implementation unit 1720, a vendor ID/controller key transmission unit 1730, a controller key generation unit 1740, a controller key implementation unit 1750, a vendor ID storage unit 1760, a controller order reception unit 1770 and a controller issuing unit 1780.

As shown in FIG. 30, the card manufacturer 1400 includes a controller order unit 1410, a controller/vendor ID reception unit 1420, a controller implementation unit 1430, a card device key order unit 1440, an encrypted card device key reception unit 1450, and an encrypted card device key implementation unit 1460.

As shown in FIG. 31, the device manufacturer 1500 includes an apparatus device key order unit 1510, an apparatus device key reception unit 1520 and an apparatus device key implementation unit 1530.

Here, the above units are realized by, for example, a computer such as a PC connected to the network, a storage device such as a hard disk connected to the computer, semiconductor manufacturing equipment, etc. Also, the operations performed by the above units are described below with reference to the operation flowcharts.

3.3 Operations Performed Between the Center 1600, the Controller Vendor 1700, and the Card Manufacturer 1400

The operations performed between the center 1600, the controller vendor 1700, and the card manufacturer 1400 are described below with reference to the flowchart in FIG. 32.

Figure 32:
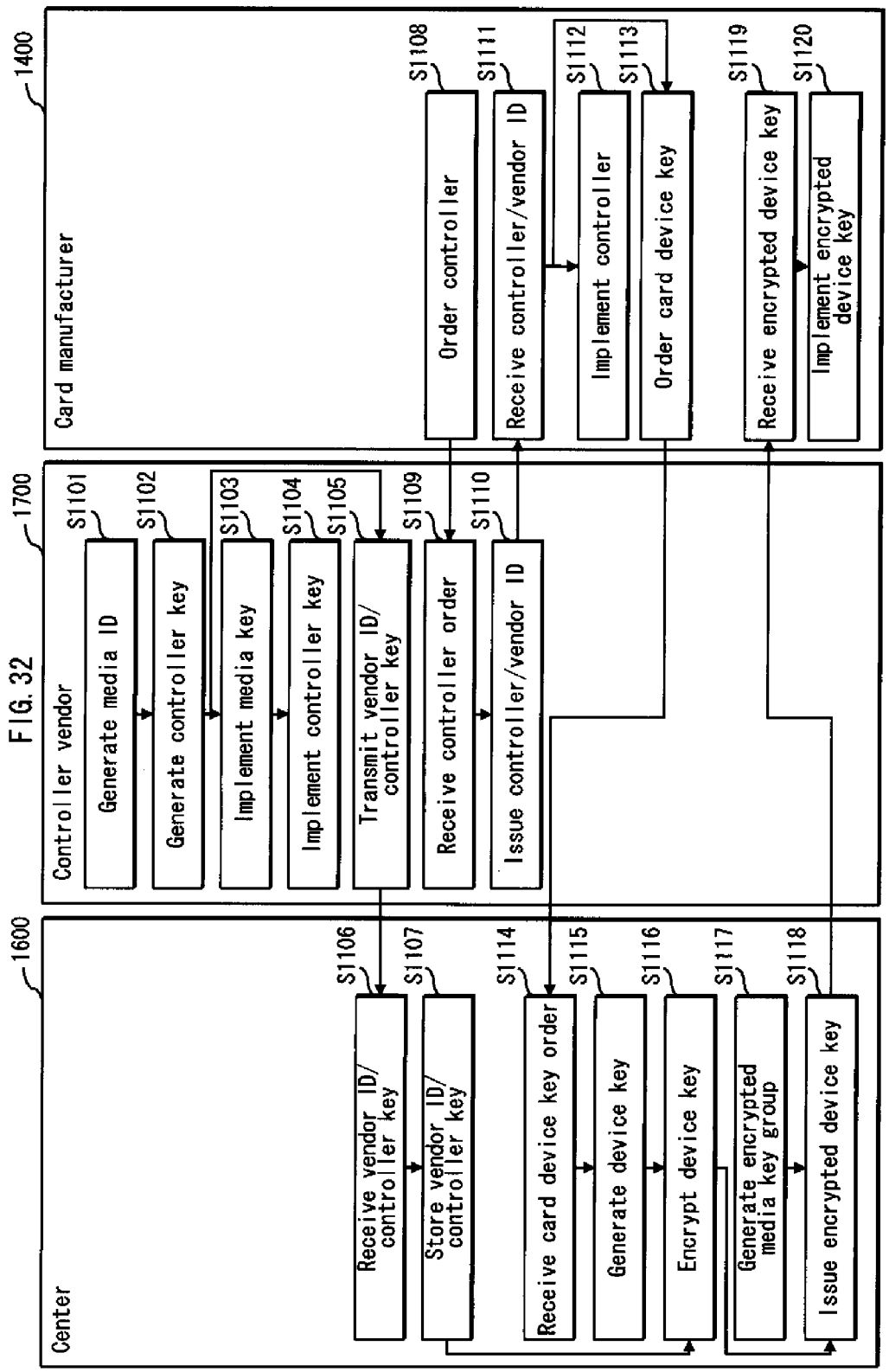
FIG. 32 is a flowchart showing operations of the center 1600, the controller vendor 1700, and the card manufacturer 1400 according to embodiment 3.

As shown in FIG. 32, the media ID generation unit 1710 of the controller vendor 1700 generates a media ID which is a unique value that is different for each controller manufactured (in other words, media identification information), and outputs the generated media ID to the media ID implementation unit 1720 (S1101). Here, the media ID is, for example, a 128-bit value.

Note that although here, the controller vendor 1700 generates the media ID, the present invention is not limited to this structure (see variation 2, described later).

Next, the controller key generation unit 1740 of the controller vendor 1700 generates a different controller key for each lot, and outputs the generated controller keys to the controller key implementation unit 1750 and the vendor ID/controller key transmission unit 1730 (S1102).

Here, the lot refers to the predetermined minimum manufacturing unit at the time of manufacturing. "A different controller key for each lot" means that, although the controller key is shared in common between a plurality of controllers manufactured in the same lot, the controller key is different between a plurality of controllers manufactured in different lots. The controller key is, for example, a 128-bit value. Note that although here, the controller key is different between different lots, the present invention is not limited to this (see variation 6, described later).

Next, the media ID implementation unit 1720 of the controller vendor 1700 implements the media ID generated by the media ID generation unit 1710 in the controller 1910 (S1103). Note that as means for implementing (storing) the unique media ID that is different for each controller, the following methods can be used. For example, such methods may include a method of storing the media ID specific to the controller 1910 by an electric fuse implemented in the controller 1910, a method of storing a media ID specific to the controller 1910 in an internal memory implemented in the controller 1910, and a method of storing the media ID specific to the controller 1910 by the PUF (Physical Unclonable Function) implemented in the controller 1910. Also, the media ID specific to each controller may be implemented by another structure aside from these.

Next, the controller key implementation unit 1750 implements the controller key generated by the controller key generation unit 1740 in the controller 1910 (S1104). By this process, a semifinished controller becomes a finished controller. Implementing controller keys that are different for each controller lot can be realized by a mask ROM, for example. Also, as a structure other than the mask ROM, a controller key specific to each lot may be implemented.

Next, the vendor ID/controller key transmission unit 1730 of the controller vendor 1700 reads a vendor ID from the vendor ID storage unit 1760, reads controller key identification information stored internally, receives a controller key from the controller key generation unit 1740, and transmits the read vendor ID, the read controller key identification information, and the received controller key to the center 1600 (S1105). Here, the vendor ID is stored in the vendor ID storage unit 1760, and is information that identifies the controller vendor 1700. Also, the controller key identification information is information that identifies a controller key generated by the controller vendor 1700. Here, although the controller key identification information is described as the controller key identification information stored internally, the present invention is not limited to this. For example, the controller key generation unit 1740 may be a structure that generates the controller key and controller key identification information that is information for identifying the controller key, and receives, from the controller key generation unit 1740, the generated controller key and controller key identification information.

Here, as the controller key identification information, when the controller key is different between lots, the lot number can be used. Also, the vendor ID is a unique value that is different for each controller vendor, and is for example given by the center 1600 at the time of the license contract.

Here, it is necessary for the controller vendor 1700 to privately transmit a controller key to the center 1600. For this reason, for example, the controller vendor 1700 encrypts the controller key with use of commercially available encryption software, and transmits the encrypted controller key to the center 1600. Here, an example of encryption is AES.

Next, the vendor ID/controller key reception unit 1610 receives the vendor ID, the controller key identification information and the controller key from the controller vendor 1700 (S1106). Then the vendor ID/controller key reception unit 1610 stores the received vendor ID, controller key identification information and controller key in the vendor ID/controller key storage unit 1611 (S1107).

FIG. 33 shows an example of controller key information 1810 stored in the center 1600. The controller key information 1810 is made up from a plurality of pairs, and each pair includes one vendor ID, one or two pieces of controller key identification information (lot numbers), and one controller key.

In the example of FIG. 33, for a controller vendor whose vendor ID=001, a controller key Kc001-003 whose lot number=003 is stored. Also, for a controller vendor whose vendor ID=002, a controller key Kc002-001 and a controller key Kc002-002 are stored for lot numbers 001 and 002, respectively. Also, for a controller vendor whose vendor ID=003, a controller key Kc003-001 whose lot number=001 is stored. The stored controller keys are used in the device key encryption of step S116, described later.

Next, the controller order unit 1410 of the card manufacturer 1400 orders a controller from the controller vendor 1700 (S1108).

Here, FIG. 34 shows an exemplary controller order form used for ordering the controller. The controller order form 1820 shown in FIG. 34 is data that is transmitted by the controller order unit 1410 to the controller vendor 1700 when ordering the controller. As shown in FIG. 34, a card manufacturer ID, a number of controllers ordered (number of memory cards to be manufactured), etc. are written in the controller order form. Here, the card manufacturer ID is a specific value that is different for each card manufacturer, and is given by the center 1600 at the time of the license contract, for example. The column for the number of ordered controllers is filled in with the number of controllers ordered that is required by the card manufacturer 1400. This enables the card manufacturer 1400 to order the controller 1910 from the controller vendor 1700 as necessary on a case-by-case basis.

Next, the controller order reception order 1770 of the controller vendor 1700 receives an order for controllers from the card manufacturer 1400 (S1109). The controller issuing unit 1780 issues, to the card manufacturer 1400, the controller 1910, the vendor ID of the controller vendor, and the controller key identification information of the controller key implemented in the controller 1910 (S1110).

Next, the controller/vendor ID reception unit 1420 of the card manufacturer 1400 receives, from the controller vendor 1700, the controller 1910, the vendor ID, and the controller key identification information corresponding to the controller (S1111).

Next, the controller implementation unit 1430 of the card manufacturer 1400 implements the controllers 1910 received from the controller vendor 1700 in the memory cards 1100, respectively (S1112).

Next, the card device key order unit 1440 of the card manufacturer 1400 orders a card device key from the center 1600 (S1113).

FIG. 35 shows an exemplary order form for card device keys. The card device key order form 1830 shown in FIG. 35 is data transmitted by the card device key order unit 1440 to the center 1600 when ordering card device keys. As shown in FIG. 35, a card manufacturer ID of the card manufacturer, a vendor ID of a controller vendor received in S1111, controller key identification information (a lot number), a number of orders for card device keys (number of memory cards to be manufactured), and information indicating whether the encrypted media key group is necessary are written in the card device key order form 1830. Here, the card manufacturer ID is a specific value that is different for each card manufacturer, and for example, is given by the center 1600 at the time of the license contract. The column for the number of orders of card device keys is filled in with the number of memory cards for which the card manufacturer 1400 implements card device keys and manufactures. The column for information indicating whether the encrypted media key group is necessary is filled in with "YES" when necessary.

This enables the card manufacturer to order the card device keys.

Next, the card device key order reception unit 1640 of the center receives an order form for card device keys from the card manufacturer 1400 (S1114). Then, the card device key generation unit 1620 generates card device keys and card device key IDs that identify the card device keys according to the number of device keys ordered in the order form for the card device keys (S1115).

Then, the card device key encryption unit 1630 acquires, from the vendor ID/controller key storage unit 1611, a vendor ID of the card device key order form and a controller key corresponding to the controller identification information (lot number). The card device key encryption unit 1630 encrypts the card device key generated in S1115 with use of the acquired controller key (S1116). For example, in the example of the card device key order form 1830 shown in FIG. 35, since the vendor ID is 002, and the controller key identification information is 001, the card device key encryption unit 1630 acquires KC002-001 as the controller key from the controller key information 1810 shown in FIG. 33.

Next, when "YES" is written in the column of the order form for card devices for information indicating whether the encrypted media key group is necessary, the encrypted media key group generation unit 1650 generates the encrypted media key group (S1117).

Note that here, the card device key generation unit 1620 and the encrypted media key group generation unit 1650, after receiving the order form for card device keys, generates the card device key and the encrypted media key group in accordance with the content of the order form. However, the present invention is not limited to this. For example, the card device key generation unit 1620 and the encrypted media key group generation unit 1650 may generate and store, in advance, the card device key and the encrypted media key group, and may issue the stored content according to an order from the card manufacturer.

Next, the encrypted card device key issuing unit 1660 issues, to the card manufacturer 1400, an encrypted card device key, a card device key ID, and as necessary, an encrypted media key group (S1118).

Note that even when the column of the order form for information indicating whether the encrypted media key group is necessary indicates "NO", there are cases when the encrypted media key group is issued to the card manufacturer 1400 when the center has updated the encrypted media key group.

An exemplary encrypted media key group is shown in FIG. 37. As shown in FIG. 37, the encrypted media key group 1840 includes a plurality of pairs, and each pair is made up of an ID and an encrypted media key. The ID is the card device key ID or the apparatus device key ID. The card device key ID is identification information that uniquely identifies the card device key, and the apparatus device key ID is identification information that uniquely identifies the apparatus device key. The encrypted media keys have been generated by encrypting the 128-bit media keys according to the AES encryption function, with use of the 128-bit card device key identified by the card device key corresponding to the encrypted media key, or with use of the 128-bit apparatus device key identified by the apparatus device key ID corresponding to the encrypted media key.

Next, the encrypted card device key reception unit 1450 of the card manufacturer 1400 receives, from the center 1600, the encrypted card device key, the card device key ID, and if necessary, the encrypted media key group (S1119).

Next, the encrypted card device key implementation unit 1460 of the card manufacturer 1400, to manufacture the memory cards 1100, implements, on each memory card 1100, the encrypted card device key, the card device key ID, and the encrypted media key group to be implemented in correspondence with the controller implemented on each memory card (S1120).

Implementation in this way enables correctly decrypting the encrypted card device keys implemented on the memory cards by using the controller keys stored on the controllers implemented on the memory cards.

3.4 Operations Performed Between the Center 1600 and the Device Manufacturer 1500

The following describes the operations performed between the center 1600 and the device manufacturer 1500 with reference to the flowchart shown in FIG. 38.

As shown in FIG. 38, the apparatus device key order unit 1510 of the device manufacturer 1500 orders the device key from the center 1600 (S1201).

FIG. 39 shows an exemplary order form for apparatus device keys. The apparatus device key order form 1850 shown in FIG. 39 is filled in with the device manufacturer ID of the device manufacturer, a number of apparatus device keys ordered (number of recording/playback devices to be manufactured), and information indicating whether the encrypted media key group is necessary. Here, the device manufacturer ID is a unique value that is different for each device manufacturer, and is given by the center 1600, for example at the time of the license contract. The column for the number of orders of apparatus device keys is filled in with the number of recording/playback devices that the device manufacturer 1500 implements apparatus device keys in and manufactures. The column for information indicating whether the encrypted media key group is necessary is filled in with "YES" when necessary.

This enables the device manufacturer 1500 to order the apparatus device keys.

Next, the apparatus device key order reception unit 1670 of the center 1600 receives the order form for the apparatus device keys from the device manufacturer 1500 (S1202). Then, the apparatus device key generation unit 1680 generates, according to the number of orders for the apparatus device keys on the order form for apparatus device keys, the apparatus device key and the apparatus device key ID that identifies the apparatus device key (S1203). Here, a structure is described in which, after receiving the order form for the apparatus device keys, the apparatus device key generation unit 1680 generates the apparatus device keys. However, the present invention is not limited to this structure. For example, the apparatus device key generation unit 1680 may generate and store apparatus device keys in advance, and issue the stored apparatus device keys according to an order from the device manufacturer. Then, the apparatus device key issuing unit 1690 issues the apparatus device key and the apparatus device key ID to the device manufacturer 1500 (S1204). Also, when the column of the order form for information indicating whether the encrypted media key group is necessary is "YES", the apparatus device key issuing unit 1690 issues the encrypted media key group.

Note that there are cases in which the encrypted media key group is issued to the device manufacturer 1500 even when "NO" is written in the column of the order form for information indicating whether the encrypted media key group is necessary, in cases when the center 1600 has updated the encrypted media key group.

Next, the apparatus device key reception unit 1520 of the device manufacturer 1500 receives an apparatus device key, an apparatus device key ID, and an encrypted media key group from the center 1600a (S1205).

Here, it is necessary for the center 1600 to privately issue the apparatus device key to the device manufacturer 1500. For this reason, for example, the center 1600 encrypts the apparatus device key with use of commercially available encrypting software, thus generating an encrypted apparatus device key, and transmits the encrypted controller key to the device manufacturer 1500. Here, an example of the encryption method used for encryption is AES.

Next, to manufacture the recording/playback devices 1200, the apparatus device key implementation unit 1530 of the device manufacturer 1500 implements, in the recording/playback devices 1200, the apparatus device keys and apparatus device key IDs, and as necessary, the encrypted media key group (S1206). Here, the apparatus device keys are implemented so that reading and writing thereof cannot be easily performed from outside the device.

3.5 Structure of the Recording/Playback System 1300

Figure 40:
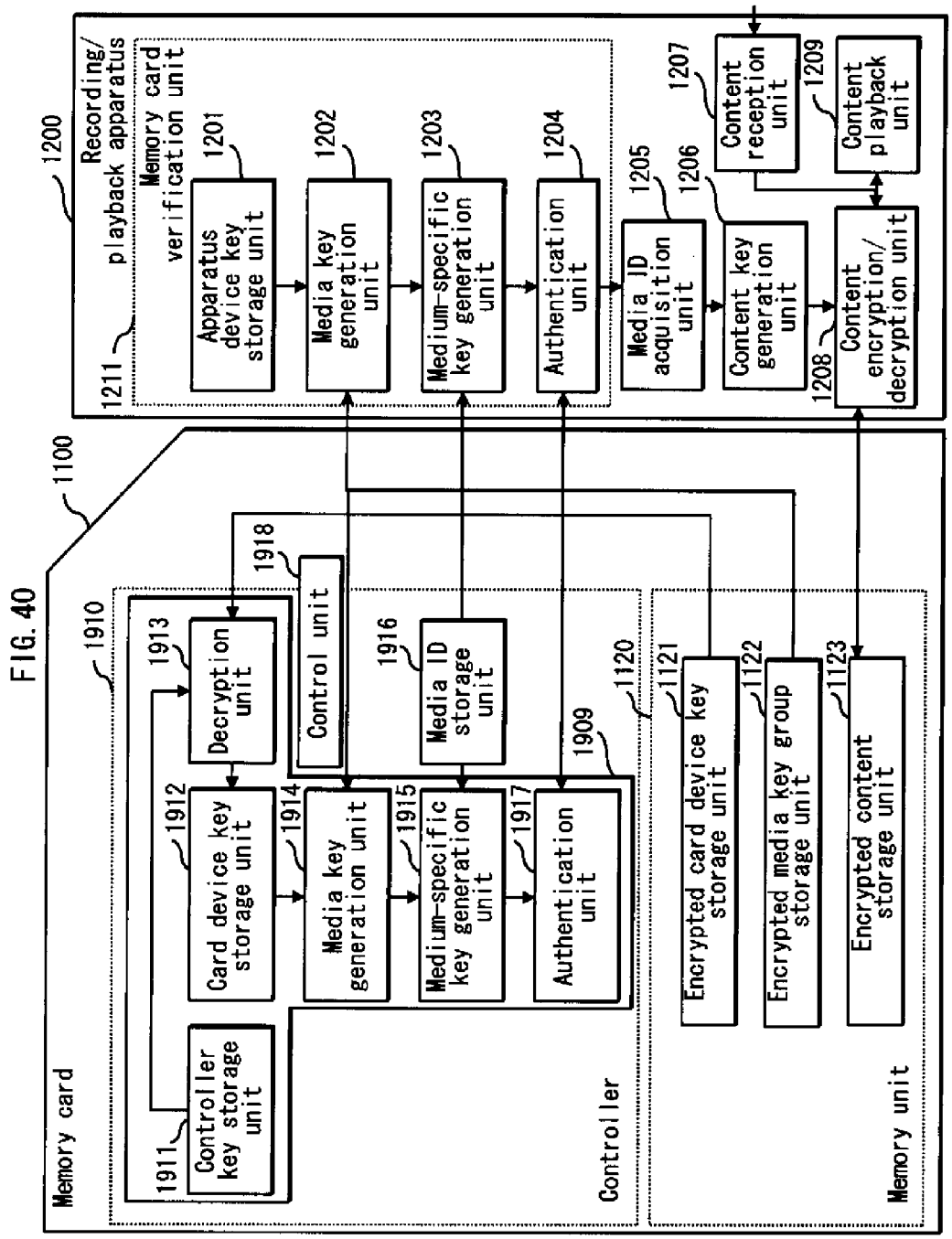
FIG. 40 shows a structure of a recording/playback system 1300 (a memory card 1100 and a recording/playback device 1200) according to embodiment 3.

FIG. 40 shows details of the structure of the memory card 1100 and the recording/playback device 1200 that make up the recording/playback system 1300.

(1) Detailed Structure of the Memory Card 1100

As shown in FIG. 40, the memory card 1100 includes a memory unit 1120 and the controller 1910.

(a) Structure of the Controller 1910

Figure 36:
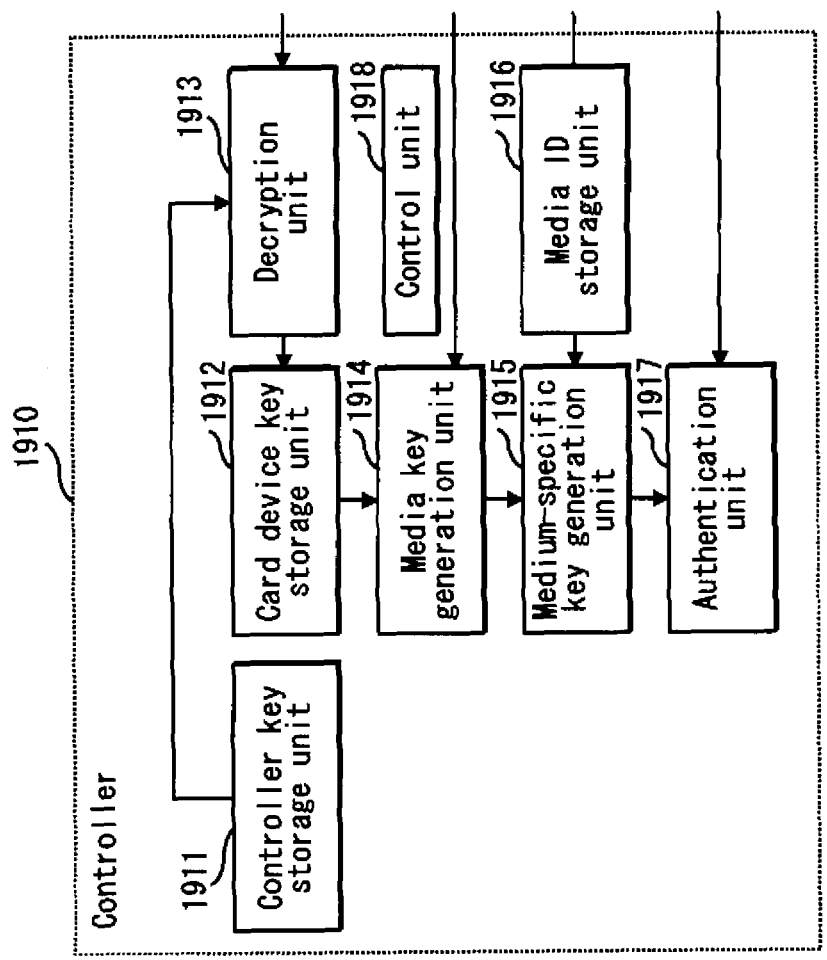
FIG. 36 shows a structure of a controller 1910 according to embodiment 3.

FIG. 36 shows the structure of a controller 1910. As shown in FIG. 36, the controller 1910 includes a controller key storage unit 1911, a card device key storage unit 1912, a decryption unit 1913, a media key generation unit 1914, a medium-specific key generation unit 1915, a media ID storage unit 1916, an authentication unit 1917, and a control unit 1918. The controller 1910 is made up of a semiconductor device such as an LSI. The controller key storage unit 1911, the card device key storage unit 1912, the decryption unit 1913, the media key generation unit 1914, the medium-specific key generation unit 1915, and the authentication unit 1917 make up the certification unit 1909.

A controller key that is different for each lot is stored in the controller key storage unit 1911 by the controller vendor 1700. The controller key storage unit 1911 is specifically realized by a mask ROM, etc.

The card device key storage unit 1912 stores a card device key, received from the later-described decryption unit 1913, that is different for each card.

The decryption unit 1913 generates the card device key by decrypting the encrypted card device key acquired from the memory unit 1120 of the memory card 1100 with use of the controller key acquired from the controller key storage unit 1991, according to the following expression with use of the AES decryption function.

Card device key=AES-D(controller key, encrypted card device key)

Note that since the AES encryption method is widely known, description thereof is omitted here.

Next, the decryption unit 1913 transmits the generated card device key to the card device key storage unit 1912.

Note that the encrypted card device key is generated according to the following expression with use of the AES encryption function, and is given from the center 1600 to the card manufacturer 1400. The card manufacturer 1400 implements the encrypted card device key in the memory units 1120 of the memory cards 1100.

Encrypted card device key=AES-E(controller key, card device key)

The media key generation unit 1914 acquires the encrypted media key group from the encrypted media key group storage unit 1122 of the memory unit 1120 of the memory card 1100, acquires the card device key ID from the card device key storage unit 1912, and selects one encrypted media key corresponding to the acquired card device key ID from among the acquired encrypted media key group. The media key generation unit 1914 then acquires the card device key from the card device key storage unit 1912, generates the media key by decrypting the selected encrypted media key according to the AES decryption function with use of the acquired card device key, and outputs the generated media key to the medium-specific key generation unit 1915.

Media key=AES-D(card device key, encrypted media key)

Here, the encrypted media key group is issued by the center 1600. As an example of the encrypted media key group, an encrypted media key group 1840 is shown in FIG. 37.

The medium-specific key generation unit 1915 acquires the media key from the media key generation unit 1914, and acquires the media ID from the later-described media ID storage unit 1916. The medium-specific key generation unit 1915, with use of the one-way function G, with use of the media key generated by the media key generation unit 1914, and the media ID acquired from the media ID storage unit 1916, generates the medium-specific key according to the following expression, and outputs the generated medium-specific key to the authentication unit 1917.

Medium-specific key=G(media key, media ID)

Note that the one-way function G can be realized with use of an AES decryption function as a specific example according to the following expression.

Medium-specific key=AES-D(media key, media ID) (+)media ID

Here, (+) represents an exclusive-or operation.

As described previously, the controller vendor 1700 stores a different 128-bit numerical value in the media ID storage unit 1916 as a specific media ID that is different for, each controller. The media ID storage unit 1916 is specifically realized by an electric fuse, a PUF, an internal memory of a semiconductor device, etc.

The authentication unit 1917 performs mutual authentication with the authentication unit 1204 of the recording/playback device 1200. The details of the mutual authentication are described later.

The control unit 1918 performs processing to perform a predetermined control on the memory unit 1120 of the memory card 1100. Also, the control unit 110 performs processing to perform the predetermined control in accordance with a request from the recording/playback device 1200. Specifically, according to the request from the recording/playback device 1200, the control unit 1918 transmits the media ID to the recording/playback device 1200. In accordance with the request from the recording/playback device 1200, the control unit 1918 acquires the encrypted media key group from the memory unit 1120, and transmits the acquired encrypted media key group to the recording/playback device 1200. Also, the control unit 1918 stores the encrypted content acquired from the recording/playback device 1200 in the memory unit 1120.

(b) Structure of the Memory Unit 1120

As shown in FIG. 40, the memory unit 1120 includes the encrypted card device key storage unit 1121, the encrypted media key group storage unit 1122, and the encrypted content storage unit 1123. The memory unit 1120 is, for example, constituted from a flash memory.

The encrypted card device key storage unit 1121 is an area in which, for example, writing cannot be performed from the recording/playback device 1200. In the encrypted card device key storage unit 1121, the encrypted card device key and the card device key ID received from the center 1600 at the time of manufacturing the memory card 1100 are stored by the card manufacturer 1400.

Note that although here, the encrypted card device key storage unit 1121 is described as an area in which writing cannot be performed from the recording/playback device 1200, the present invention is not limited to this structure. For example, the encrypted card device key storage unit 1121 may be an area in which reading cannot be performed from the recording/playback device 1200.

The encrypted media key group storage unit 1122 is an area in which, for example, data can be read from the recording/playback device 1200. The encrypted media key group received by the card manufacturer 1400 from the center 1600 at the time of manufacturing the memory cards 1100 is stored in the encrypted media key group storage unit 1122.

Note that although here, a case is anticipated in which the encrypted media key group is updated and the encrypted media key group storage unit 1122 is an area in which reading from the recording/playback device 1200 is possible, the present invention is not limited to this structure. For example, anticipating a case in which the encrypted media key group is not updated, the encrypted media key group storage unit 1122 may be an area in which data can be read only from the recording/playback device 1200.

The encrypted content storage unit 1123 is an area in which data can be read and written from the recording/playback device 1200. Content encrypted by the recording/playback device 1200 is stored in the encrypted content storage unit 1123.

(2) Detailed Structure of Recording/Playback Device 1200

As shown in FIG. 40, the recording/playback device 1200 includes a memory card verification unit 1211, a media ID acquisition unit 1205, a content key generation unit 1206, a content reception unit 1207, a content encryption/decryption unit 1208, and a content playback unit 1209. The memory card verification unit 1211 includes an apparatus device key storage unit 1201, a media key generation unit 1202, a medium-specific key generation unit 1203, and a certification unit 1204.

(a) Memory Card Verification Unit 1211

The memory card verification unit 1211 performs mutual authentication with the memory card 1100 with use of the medium-specific key generated with use of the encrypted media key group received from the media card 1100. This mutual authentication processing enables distinguishing whether the memory card 1100 is an authorized memory card or an unauthorized memory card.

The following describes the apparatus device key storage unit 1201, the media key generation unit 1202, the medium-specific key generation unit 1203 and the authentication unit 1204 that constitute the memory card verification unit 1211.

The 128-bit apparatus device key that is different for each recording/playback device and the apparatus device ID that identifies the apparatus device key are stored in the apparatus device key storage unit 1201 so that reading and writing thereof cannot be performed from outside the device.

The media key generation unit 1202 has a similar structure to the media key generation unit 1914 of the memory card 1100. The media key generation unit 1202 acquires the encrypted media key group from the encrypted media key group storage unit 1122 of the memory unit 1120 of the memory card 1100, acquires the apparatus device key ID from the apparatus device key storage unit 1201, selects one encrypted media key corresponding to the acquired apparatus device key ID from among the acquired encrypted media key group, and acquires the apparatus device key from the apparatus device key storage unit 1201. The media key generation unit 1202 generates the media key by decrypting the selected encrypted media key using the AES decryption function according to the following expression, with use of the acquired apparatus device key, and outputs the generated media key to the medium-specific key generation unit 1203.

Media key=AES-D(apparatus device key, encrypted media key)

Here, the encrypted media key group is acquired by the memory card 1100. As an example of the encrypted media key group, FIG. 37 shows an encrypted media key group 1840.

The medium-specific key generation unit 1203 has a similar structure to the medium-specific key generation unit 1915 of the memory card 1100. The medium-specific key generation unit 1203 acquires the media key from the media key generation unit 1202, and acquires the media ID from the media ID storage unit 1916 of the controller 1910 of the memory card 1100. The medium-specific key generation unit 1203, with use of the one-way function G, generates the medium-specific key according to the following expression according to the acquired media key and the media ID, and outputs the generated medium-specific key to the authentication unit 1204.

Medium-specific key=G(media key, media ID)

Note that the one-way function G can be realized with use of the AES decryption function, as a specific example.

Medium-specific key=AES-D(media key, media ID) (+)media ID

Here, (+) represents an exclusive-or operation.

The authentication unit 1204 performs mutual authentication processing with the authentication unit 1917 of the memory card 1100. The details of the mutual authentication processing is described later.

(b) Media ID Acquisition Unit 1205, Content Key Generation Unit 1206, Content Reception Unit 1207, Content Encryption/Decryption Unit 1208 and Content Playback Unit 1209

The media ID acquisition unit 1205 acquires the media ID from the authentication unit 1204 and transmits the acquired media ID to the content key generation unit 1206 only when the mutual authentication by the authentication unit 1204 succeeds.

The content key generation unit 1206 receives the media ID from the media ID acquisition unit 1205, and generates the content key according to the received media ID. A specific method of generating the content key is described later. Next, the content key generation unit 1206 outputs the generated content key to the content encryption/decryption unit 1208.

The content reception unit 1207 receives digitally broadcast digital content and digitally distributed digital content, and transmits the received digital content to the content encryption/decryption unit 1208.

The content encryption/decryption unit 1208 receives the content key from the content key generation unit 1206. Next, the content encryption/decryption unit 1208 encrypts the digital content received from the content reception unit 1207 with use of the content key received from the content key generation unit 1206, and transmits the generated encrypted content to the memory card 1100. Alternatively, the content encryption/decryption unit 1208 decrypts the encrypted digital content received from the memory card 1100 with use of the content key received from the content key generation unit 1206, thus generating the digital content, and transmits the generated digital content to the content playback unit 1209. The details of the encryption and decryption of the content are described later.

The content playback unit 1209 receives the digital content from the content encryption/decryption unit 1208, and plays back the received digital content.

3.6 Operations of the Recording/Playback System 1300

Figure 41:
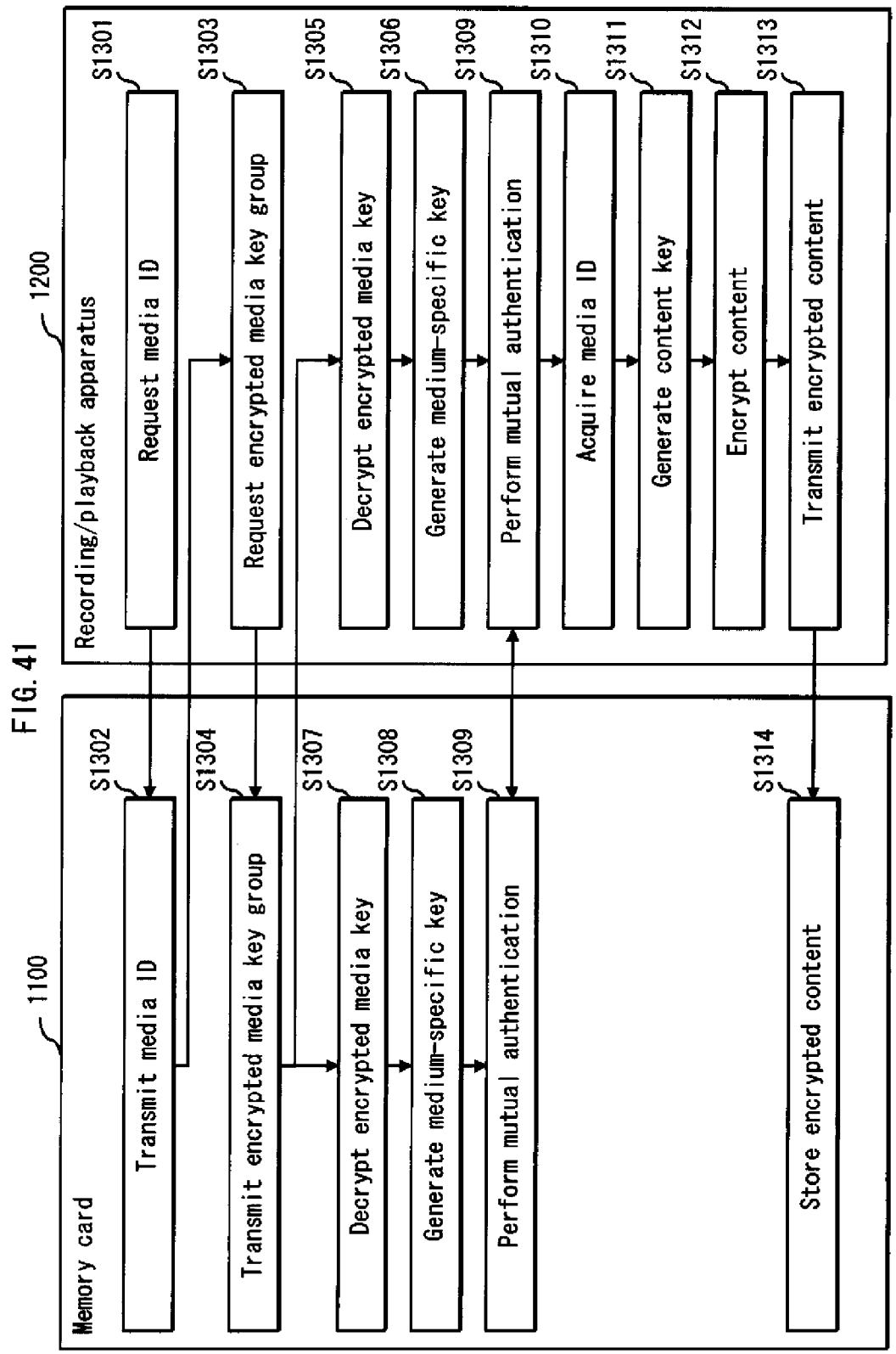
FIG. 41 is a flowchart showing operations of the recording/playback system 1300 (a memory card 1100 and a recording/playback device 1200) at the time of recording according to embodiment 3.

(1) Operations by the Recording/Playback Device 1200 at the Time of Recording The following describes the operations of the recording/playback device 1200 when recording content on the memory card 1100 with reference to the flowchart shown in FIG. 41.

As shown in FIG. 41, first, the medium-specific key generation unit 1203 of the recording/playback device 1200 requests the media ID from the memory card 1100 (S1301). The control unit 1918 of the memory card 1100, according to the request of the media ID from the recording/playback device 1200, acquires the media ID from the media ID storage unit 1916, and transmits the acquired media ID to the recording/playback device 1200 (S1302). The media key generation unit 1202 of the recording/playback device 1200 requests the encrypted media key group from the memory card 1100 (S1303). The control unit 1918 of the memory card 1100, according to the request of the encrypted media key group from the recording/playback device 1200, acquires the encrypted media key group from the encrypted media key group storage unit 1122 of the memory unit 1120, and transmits the acquired encrypted media key group to the recording/playback device 1200 (S1304).

Next, the media key generation unit 1202 of the recording/playback device 1200 selects, from among the encrypted media key group received from the memory card 1100, one encrypted media key corresponding to the apparatus device key ID acquired from the apparatus device key storage unit 1201. Next, the media key generation unit 1202 generates the media key according to the following expression using the AES decryption function with use of the one encrypted media key selected from the encrypted media key group, and the apparatus device key acquired from the apparatus device key storage unit 1201.

Media key=AES-D(apparatus device key, encrypted media key)

Then, the media key generation unit 1202 transmits the generated media key to the medium-specific key generation unit 1203 (S1305).

The medium-specific key generation unit 1203 of the recording/playback device 1200 generates the medium-specific key according to the following expression using the one-way function G with use of the media ID acquired in step S1302 and the media key received from the media key generation unit 1202.

Medium-specific key=G(media key, media ID)

Note that the one-way function G can be realized with use of AES encryption, as a specific example.

Medium-specific key=AES-D(media key, media ID) (+)media ID

Here, (+) represents an exclusive-or operation (S1306).

Meanwhile, the control unit 1918 of the memory card 1100 acquires the encrypted card device key from the encrypted card device key storage unit 1121 of the memory unit 1120, and transmits the encrypted card device key to the decryption unit 1913.

Then, the decryption unit 1913 decrypts the received encrypted card device key according to the following expression with use of the controller key acquired from the controller key storage unit 911.

Card device key=AES-D(controller key, encrypted card device key)

Next, the decryption unit 1913 transmits the decrypted card device key to the card device key storage unit 1912. Next, the control unit 1918 of the memory card 1100 acquires the encrypted media key group from the encrypted media key group storage unit 1122 of the memory unit 1120, and transmits the acquired encrypted media key group to the media key generation unit 1914.

Next, the media key generation unit 1914, similarly to the media key generation unit 1202 of the recording/playback device 1200, selects one encrypted media key corresponding to the card device key ID acquired from the encrypted card device key storage unit 1121, from among the received encrypted media key group. Next, with use of the one encrypted media key selected from among the encrypted media key group, and the card device key acquired from the card device key storage unit 1912, the media key generation unit 1202 generates the media key according to the following expression using the AES decryption function.

Media key=AES-D(card device key, encrypted device key)

Next, the media key storage unit 1914 transmits the generated media key to the medium-specific key generation unit 1915 (S1307).

The medium-specific key generation unit 1915 of the memory card 1100, similarly to the medium-specific key generation unit of the recording/playback device 1200, generates the medium-specific key according to the following expression using the one-way function G, with use of the media ID acquired from the media ID storage unit 1916 and the media key received from the media key generation unit 1914.

Medium-specific key=G(media key, media ID)

Note that the one-way function G can be realized with use of AES encryption, as a specific example.

Medium-specific key=AES-D(media key, media ID) (+)media ID

Here, (+) represents an exclusive-or operation (S1308).

The authentication unit 1917 of the memory card 1100 and the authentication unit 1204 of the recording/playback device 1200 perform mutual authentication (S1309). The details of the mutual authentication are described later.

If the mutual authentication fails in step S1309, the processing ends. In this way, decryption of the encrypted content is prohibited, or encryption of the content is prohibited.

If mutual verification succeeds in step S1309, the media ID acquisition unit 1205 acquires the media ID from the authentication unit 1204 (S1310).

The content key generation unit 1206 generates the content key according to the following expression, for example using the one-way function F, for the media ID acquired from the media ID acquisition unit 205, and transmits the generated content key to the content encryption/decryption unit 1208 (S1311).

Content key=F(media ID)

The one-way function F can be realized with use of AES encryption as a specific example according to the following expression.

Content key=AES(content key generation private key, media ID)(+)media ID

Here, (+) represents an exclusive-or operation. Also, the content key generation private key is 128 bits, is held privately in common with all of the recording/playback devices, and is stored in advance by the content key generation unit 1206. Since AES encryption is widely known, description thereof is omitted here.

Note that here, although AES encryption is used as an example of the content key generation function, any one-way function that generates a 128-bit random number as a content key according to a 128-bit media ID may be used.

The content encryption/decryption unit 1208 encrypts the digitally broadcast or digitally distributed digital content received by the content reception unit 1207, with use of the content key received from the content key generation unit 1206 (S1312). Then, the content encryption/decryption unit 1208 transmits the encrypted digital content to the memory card 1100 (S1313).

Here, the encryption of the content is performed according to the following expression, for example.

Encrypted digital content=AES-ECBC(content key, digital content)

Here, AES-ECBC indicates performing AES encryption with use of the CBC mode (Cipher Block Chaining). Since CBC mode is well-known, description thereof is omitted here. Note that although a case of using AES-CBC is used here, the present invention is not limited to this structure.

The control unit 1918 of the memory card 1100 receives the encrypted digital content from the recording/playback device 1200, and stores the received encrypted digital content in the encrypted content storage unit 1123 (S1314).

(2) Exemplary Mutual Authentication Processing

Figure 42:
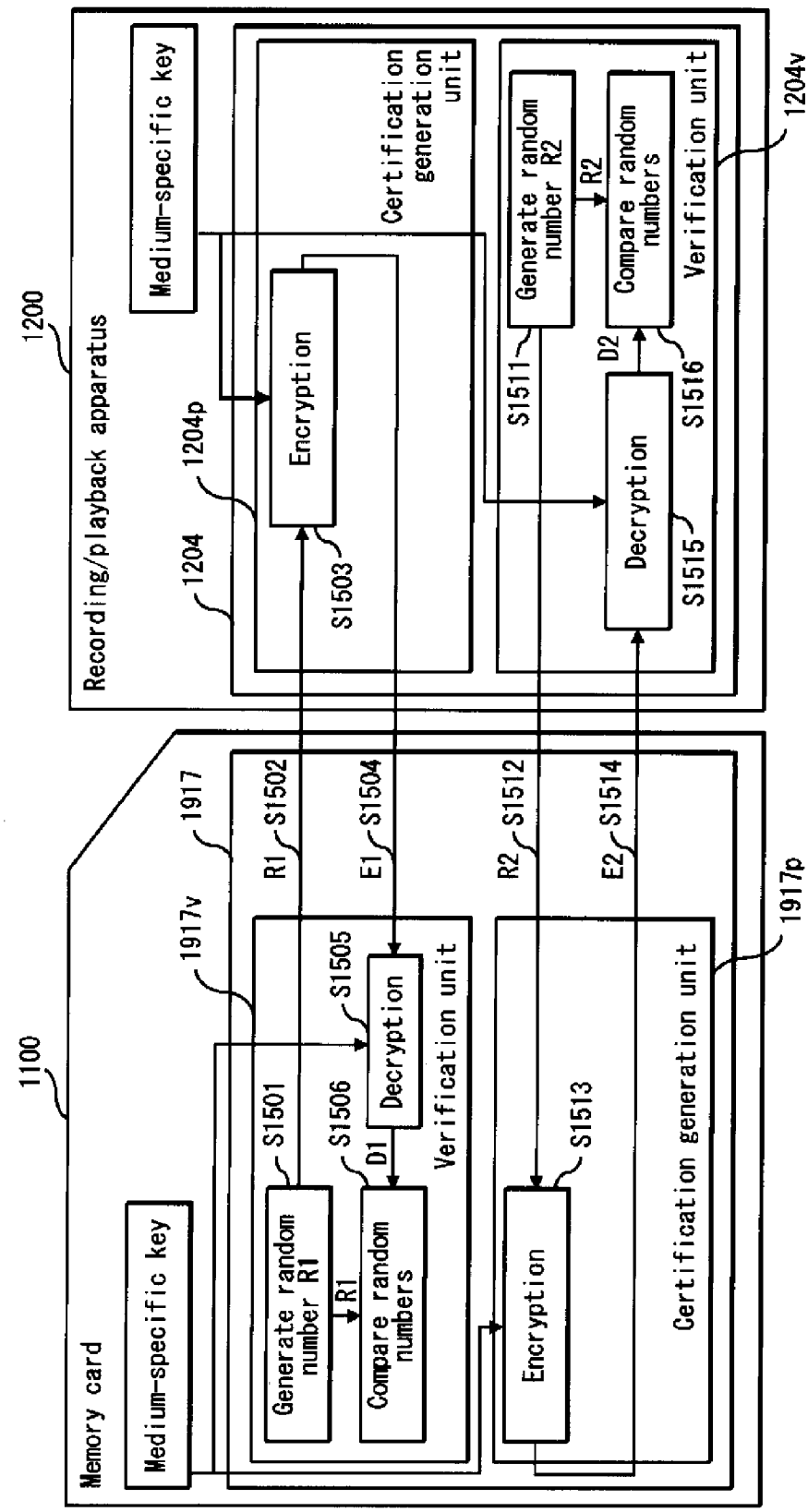
FIG. 42 shows exemplary authentication processing in the recording/playback system 1300 (the memory card 1100 and the recording/playback device 1200) according to embodiment 3.

Next, the following describes exemplary mutual authentication processing with reference to the process chart of FIG. 42. The mutual authentication processing described here is challenge-response type authentication.

The authentication unit 1917 of the memory card 1100 generates the random number R1 as challenge data (S1501). The authentication unit 1917 of the memory card 1100 transmits the random number R1 as the generated challenge data to the recording/playback device 1200. The authentication unit 1204 of the recording/playback device 1200 receives the random number R1 as the challenge data (S1502).

The authentication unit 1204 of the recording/playback device 1200 encrypts the random number R1 as the received challenge data with use of the medium-specific key received from the medium-specific key generation unit 1203, thus generating the encrypted random number E1=AES-E (medium-specific key, random number R1) as the response data (S1503). Here, the encrypted random number E1 as the response data is certification information for certifying the validity of the recording/playback device 1200. The encrypted random number E1 is transmitted to the memory card 1100 as the response data, and the authentication unit 1917 of the memory card 1100 receives the encrypted random number E1 as the response data (S1504).

The authentication unit 1917 of the memory card 1100 decrypts the encrypted random number E1 as the received response data with use of the medium-specific key received from the medium-specific key generation unit 1915, thus generating the random number D1=AES-D (medium-specific key, encrypted random number E1) (S1505). The authentication unit 1917 of the memory card 1100 compares the generated random number D1 and the random number R1 generated in S1501 (S1506), and if the random numbers match, processing proceeds to the next step S1511. If the random numbers do not match, the mutual authentication processing ends.

The authentication unit 1204 of the recording/playback device 1200 generates the random number R2 as challenge data (S1511). The authentication unit 1204 of the recording/playback device 1200 transmits the random number R2 as the generated challenge data to the memory card 1100. The authentication unit 1917 of the memory card 1100 receives the random number R2 as the challenge data (S1512).

The authentication unit 1917 of the memory card 1100 encrypts the random number R2 as the received challenge data with use of the medium-specific key received from the medium-specific key generation unit 1915, thus generating the encrypted random number E2=AES-E (medium-specific key, random number R2) as the response data (S1513). Here, the encrypted random number E2 as the response data is certification information used by the memory card 1100 for certifying the validity of the memory card 1100. The memory card 1100 transmits the encrypted random number E2 to the recording/playback device 1200 as the response data, and the authentication unit 1204 of the recording/playback device 1200 receives the encrypted random number E2 as the response data (S1514).

The authentication unit 1204 of the recording/playback device 1200 decrypts the encrypted random number E2 as the received response data with use of the medium-specific key acquired from the medium-specific key generation unit 1203, thus generating the random number D2=AES-D (medium-specific key, encrypted random number E2) (S1515). The authentication unit 1204 of the recording/playback device 1200 compares the generated number D2 and the random number R2 generated in S1511 (S1516), and if the random numbers match, transmits the media ID to the media ID acquisition unit 1205. If the random numbers do not match, the mutual authentication ends.

In the process chart shown in FIG. 42, steps S1501, S1502, S1505, and S1506 form a verification unit 1917v in the authentication unit 1917. Also, steps S1503 and S1504 form a certification generation unit 1204p in the authentication unit 1204.

Furthermore, in the process chart shown in FIG. 42, steps S1511, S1512, S1515, and S1516 form a verification unit 1204v in the authentication unit 1204. Also, steps S1513 and S1514 form a certification generation unit 1917p in the authentication unit 1917.

The AES-E is an AES encryption function, and the AES-D is an AES decryption function. Note that although AES is used in the above description, the present invention is not limited to this. Another common key encryption method may be used. Also, although the challenge-response type authentication protocol is used in the above description, the present invention is not limited to this. Another authentication protocol may be used.

Figure 43:
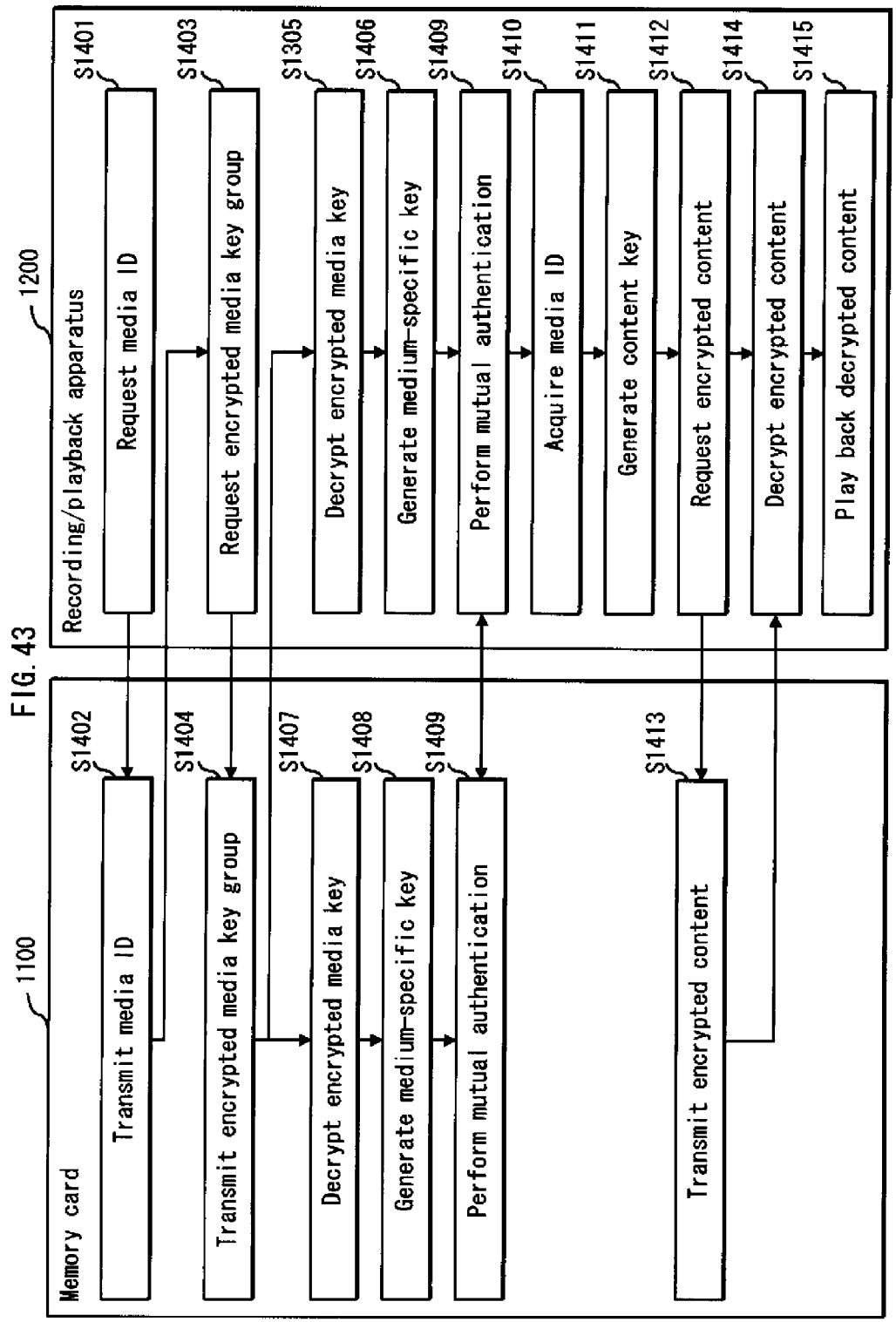
FIG. 43 is a flowchart showing the recording/playback system 1300 (the memory card 1100 and the recording/playback device 1200) at the time of playback according to embodiment 3.

(3) Operations Performed by the Recording/Playback Device 1200 at the Time of Playback The following describes the operations performed when the recording/playback device 1200 reads and plays back the encrypted content from the memory card 1100, with reference to the flowchart in FIG. 43.

Note that since the steps from S1401 to S1411 of FIG. 43 are the same as steps S1301 to S1311 of FIG. 41, respectively, description thereof is omitted here.

The content encryption/decryption unit 1208 of the recording/playback device 1200 requests the memory card 1100 to transmit the encrypted content (S1412). In response to the request from the recording/playback device 1200 to transmit the encrypted content, the control unit 1918 of the controller 1910 of the memory card 1100 reads the encrypted content from the encrypted content storage unit 1123, and transmits the read encrypted content to the recording/playback device 1200 (S1413). The content encryption/decryption unit 1208 receives the encrypted content from the memory card 1100, decrypts the received encrypted content with use of the content key received from the content key generation unit 1206 thus generating the content, and transmits the generated content to the content playback unit (S1414).

Here, decryption of the content is represented by the following expression:

Decrypted digital content=AES-DCBC(content key, encrypted digital content)

Here, AES-DCBC indicates performing AES decryption with use of CBC mode (Cipher Block Chaining).

The content playback unit 1209 receives the content from the content encryption/decryption unit 1208, and plays back the received content (S1415).

3.7 Distinguishing Unauthorized Memory Cards

According to the structure of embodiment 3 of the present invention, even if the card manufacturer 1400 manufactures an unauthorized memory card, the memory card verification unit 1211 of the recording/playback device 1200 can distinguish whether a memory card is a legitimately manufactured memory card or an unauthorized memory card. This is described with reference to FIG. 44.

Figure 44:
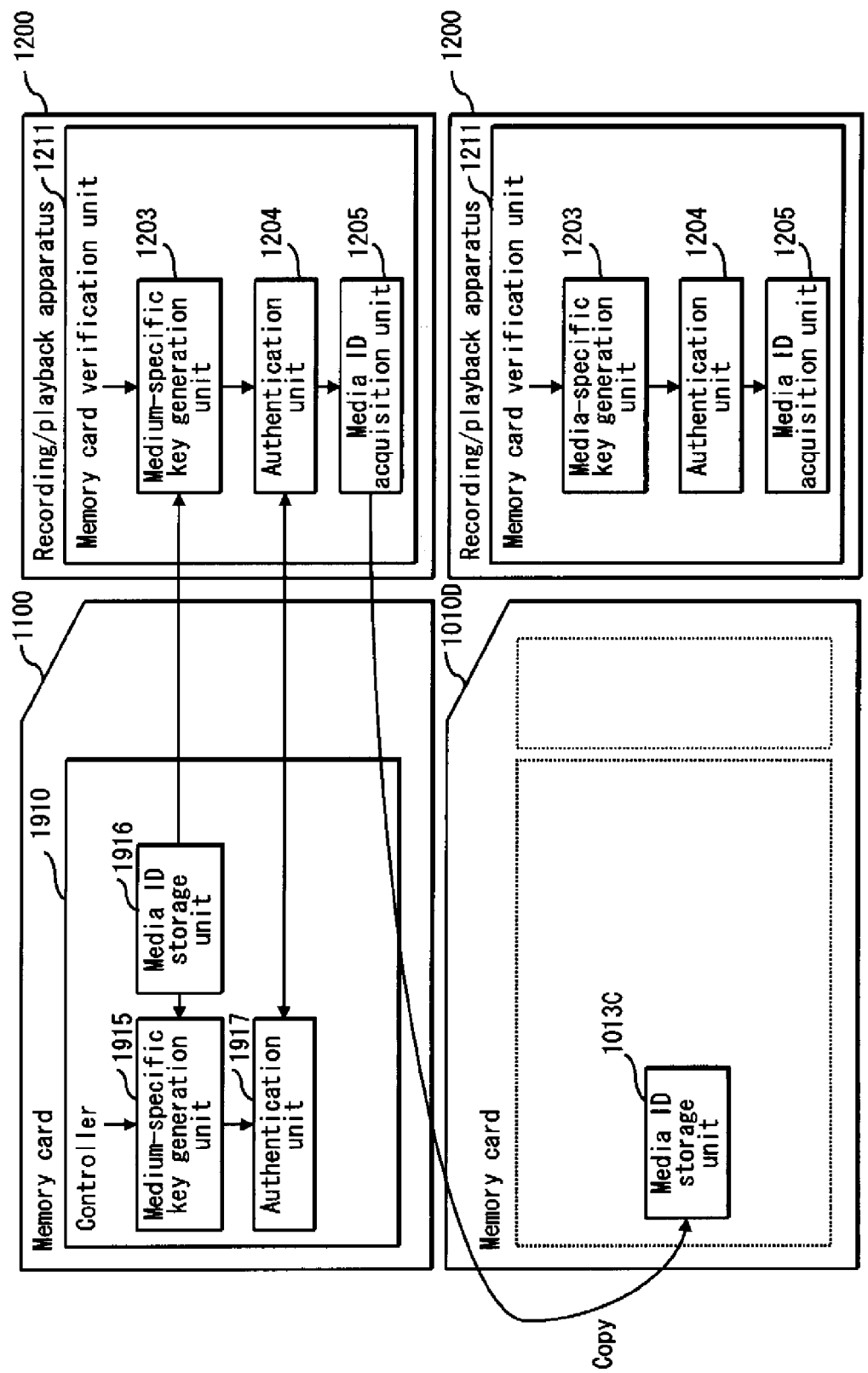
FIG. 44 illustrates effects of the recording/playback system 1300 according to embodiment 3.

In FIG. 44, the memory card 1100 is the memory card according to embodiment 3 (hereinafter referred to as the authorized memory card), the recording/playback device 1200 is the recording/playback device according to embodiment 3 of the present invention (hereinafter referred to as the authorized recording/playback device), and a memory card 1010D is a memory card (hereinafter referred to as the unauthorized memory card) manufactured by an unauthorized card manufacturer by acquiring a media ID by operating the memory card 1100 and the recording/playback device 1200 of embodiment 3 of the present invention, and storing the media ID in the media ID storage unit of the memory card 1010D, which has a conventional structure.

At this time, even if recording/playback processing is attempted by the authorized recording/playback device 1200 with use of the unauthorized memory card 1010D, the unauthorized memory card 1010D cannot generate the medium-specific ID. Accordingly, the mutual authentication processing by the authentication unit 1204 of the memory card verification unit 1211 of the authorized recording/playback apparatus 1200 fails. That is to say, even if an unauthorized memory card is manufactured, the authorized recording/playback apparatus 1200 is capable of distinguishing whether the memory card is an authorized memory card and an unauthorized memory card.

Also, the controller is tamper-resistant. For this reason, the operations and stored content of the media ID storage unit 1916, the medium-specific key generation unit 1915 and the authentication unit 1917 respectively cannot be analyzed from outside the device. Accordingly, these structures cannot be duplicated at the time of manufacturing the unauthorized memory card. That is to say, the only information that the card manufacturer can copy to the unauthorized memory card is the media ID transmitted to the recording/playback device 1200 for recording or playback processing. Accordingly, this structure enables preventing illicit actions such as emulating mutual verification with use of an unauthorized memory card.

3.8 Variations (1) Variation 1

Although in embodiment 3, the card manufacturer 1400 orders a card device key from the center 1600, and the center 1600 issues an encrypted card device key to the card manufacturer 1400, the present invention is not limited to this structure.

For example, (a) the controller vendor 1700 may order the card device key from the center 1600, (b) the center 1600 may issue the encrypted card device key to the controller vendor 1700, (c) the card manufacturer 1400 may order the controller from the controller vendor 1700, (d) the controller vendor 1700 may issue the encrypted card device key received from the center 1600 as well as the controller. The above structure facilitates management and implementation of the controller and the encrypted card device key to be implemented in the memory card in correspondence with the controller, since the card manufacturer 1400 receives, together, the controller and the encrypted card device key to be implemented in correspondence with the controller.

Also, (a) the card manufacturer 1400 may order a controller from the controller vendor 1700, (b) the controller vendor 1700 may order the card device key, from the center 1600, for the card manufacturer for which the order is received, (c) the center 1600 may issue the encrypted card device key to the controller vendor 1700, and (d) the controller vendor 1700 may issue the encrypted card device key received from the center 1600 to the card manufacturer 1400 along with the controller. The above structure facilitates management and implementation of the controller and the encrypted card device key to be implemented in the memory card in correspondence with the controller, since the card manufacturer 1400 receives, together, the controller and the encrypted card device key to be implemented in correspondence with the controller from the controller vendor 1700.

(2) Variation 2

Although in embodiment 3, the controller vendor 1700 generates a media ID, the present invention is not limited to this structure.

For example, (a) the center 1600 may generate a media ID, (b) notify the controller vendor 1700, and (c) the controller vendor 1700 may implement the media ID notified by the center 1600 in the controller.

Also, (a) the card manufacturer 1400 may generate a media ID, (b) notify the media ID to the controller vendor 1700, and (c) after checking the uniqueness of the media ID, the controller vendor 1700 may implement the media ID notified from the card manufacturer 1400 in the controller.

Also, (a) the center 1600 may generate at least one portion of the media ID, (b) notify the at least one portion of the media ID to the controller vendor 1700, (c) the controller vendor 1700 may generate the remaining portion of the media ID, (d) the controller vendor 1700 may form the media ID by concatenating the at least one portion of the media ID received from the center 1600 and the self-generated remaining portion of the media ID, and (e) implement the media ID on the controller.

More specifically, as a portion of the media ID issued by the center 1600, a specific vendor ID that is different for each controller vendor may be issued by the center 1600. In this case, even if the controller vendor 1700 freely generates the remaining portion of the media ID, the uniqueness of the media ID can easily be ensured, since the media ID is created by concatenating the vendor ID issued by the center 1600 and the value generated by the controller vendor 1700.

Also, (a) the center 1600 may issue at least one portion of the media ID to the card manufacturer 1400, (b) the card manufacturer 1400 may generate the remaining portion of the media ID, (c) the card manufacturer 1400 may form a media ID by concatenating the at least one portion of the media ID received from the center 1600 and the self-generated remaining portion, (d) the media ID formed by the card manufacturer 1400 may be notified to the controller vendor 1700, (e) after checking the uniqueness of the media ID notified from the card manufacturer 1400, the controller vendor 1700 may (f) implement the media ID in the controller.

More specifically, a specific card manufacturer ID issued by the center 1600 that is different for each card manufacturer may be used as the portion of the media ID issued by the center 1600. In this case, even if the card manufacturer ID 1400 freely generates the remaining portion of the media ID, the uniqueness of the media ID can be ensured since the media ID is created by concatenating the card manufacturer ID issued by the center 1600 and the value generated by the controller vendor 1700.

Also, (a) the controller vendor 1700 may generate at least one portion of the media ID, (b) the card manufacturer 1400 may generate the remaining portion of the media ID, (c) the card manufacturer 1400 may notify the generated remaining portion of the media ID to the controller vendor 1700, (d) the controller vendor 1700 may form the media ID by concatenating the self-generated at least one portion of the media ID and the remaining portion of the media ID received from the card manufacturer 1400, and (e) the media ID may be implemented in the controller.

Also, any of the above structures may be combined to achieve the present invention.

(3) Variation 3

Although in embodiment 3 and the above-described variation 2, the controller vendor 1700 implements the entire media ID in the controller, the present invention is not limited to this structure.

For example, (a) the controller vendor 1700 may implement any one portion only of the media ID in the controller, (b) the card manufacturer 1400 may store the remaining portion of the media ID in the memory unit of the memory card, and (c) the media ID may be formed by the controller by combining the portion of the media ID implemented in the controller and the remaining portion of the media ID stored in the memory unit. According to this structure, since the amount of data implemented in the controller can be reduced, the manufacturing cost of the controller can be lowered. Also, since only the information generated by the controller vendor 1700 itself (the any one part of the media ID) need be implemented in the controller, this structure enables separating the manufacturing processing of the controller and the processing for acquiring information (the remaining portion of the media ID) from the center.

More specifically, (a) the controller vendor 1700 may generate at least one portion of the media ID, (b) the at least one portion of the generated media ID may be implemented in the controller, (c) the center 1600 may issue the remaining portion of the media ID to the card manufacturer 1400, (d) the card manufacturer 1400 may store the remaining portion of the media ID received from the center 1600 in the memory unit, and (e) the portion of the media ID implemented in the controller and the remaining portion of the media ID stored in the memory unit may be concatenated by the controller.

(4) Variation 4

In embodiment 3 and variation 3, at least one portion of the media ID may be information related to the card device key. This structure enables checking the correlation between the media ID implemented in the controller and the encrypted card device key implemented in the memory unit of the memory card.

More specifically, for example, a portion of the media ID may include a hash value of a card device key calculated with use of a SHA hash function. In this case, the device may be configured so that the controller checks whether the portion of the media ID matches the hash value of the decrypted card device key, and the media ID acquisition unit acquires the media ID only in a case that the check is affirmative and authentication has succeeded. According to this structure, even in the event that an encrypted device key is copied in the memory unit of the memory card implemented in the controller in which a different media ID is implemented from the media ID including the "information pertaining to the card device key" corresponding to the encrypted device key, the portion of the media ID in the controller would not match the hash value of the decrypted card device key. Accordingly, the effect can be obtained that processing to record and play back content cannot be performed using an illegitimately copied encrypted device key.

(5) Variation 5

In embodiment 3, when performing a recording operation, the memory card 1100 executes the steps from S1307 to S1308 in FIG. 41 on a case-by-case basis thereby generating the medium-specific key. Alternatively, when performing the playback operation, the memory card 1100 executes the steps S1407 and S408 shown in FIG. 43 on a case-by-case basis, thereby generating the medium-specific key. However, the present invention is not limited to this structure.

For example, an encryption unit may be further provided in the controller 1910, and the following processing (a) to (d) may be performed:
(a) generate a medium-specific key by executing steps S1307 and S1308 shown in FIG. 41 only the first time performing the recording operation on the memory card, and executing steps S1407 and S1408 shown in FIG. 43 only the first time performing the playback operation,
(b) encrypt the generated medium-specific key, for use in the recording or playback from the second time onward, according to the following expression, with use of the controller key stored in the controller key storage unit 1911 of the controller 1910 by the encryption unit, Encrypted medium-specific key=AES-E(controller key, medium-specific key)

(c) store the encrypted medium-specific key in the memory unit 1120 of the memory card 1100,
(d) decrypt the encrypted medium-specific key, for use in the recording or playback from the second time onward, according to the following expression with use of the controller key stored in the controller key storage unit 1911 of the controller 1910, Medium-specific key=AES-D(controller key, encrypted medium-specific key).

Also, in a case of updating the encrypted media key group stored in the memory unit 1120 of the memory card 1100, similar processing may be performed when updating the encrypted media key group as the above-described case of performing the recording operation for the first time or the playback operation for the first time. That is to say, when the encrypted media key group is updated, the following processing may be performed. As in the above-described (a), steps similar to steps S1307 and S1308 in FIG. 41 are executed with use of the updated encrypted media key group, thus generating a new medium-specific key. Next, the above-described processing (b) and (c) are performed, and a new encrypted medium-specific key is generated. The generated new encrypted medium-specific key is stored in the memory unit 1120 of the memory card 1100. When the recording processing or playback processing is performed thereafter, the above-described processing (d) is executed and a new medium-specific key is generated.

According to this structure, the medium-specific key generation processing for the recording operation or the playback operation is only performed the first time, or only when the encrypted media key group is updated, and thereafter the processing for generating the medium-specific key can be reduced.

Also, the following processing (a) to (d) may be performed to generate the medium-specific key:
(a) the controller vendor 1700 transmits the generated media ID to the center 1600, (b) the center 1600 generates the medium-specific key according to the following expression Medium-specific key=G(media-key, media ID)

(c) the center 1600 generates the encrypted medium-specific key according to the following expression by the same process as the device key, Encrypted medium-specific key=AES-E(controller key, medium-specific key), (d) the center 1600 issues the encrypted medium-specific key to the card manufacturer 1400, similarly to the encrypted device key, (e) the card manufacturer 1400 implements the encrypted medium-specific key in the memory unit 1120 of the memory card 1100, (f) the memory card 1100 decrypts the controller key stored in the controller key storage unit 1911 of the controller 1910 according to the following expression, when the recording operation or the playback operation is performed, Medium-specific key=AES-D(controller key, encrypted medium-specific key).

This structure enables reducing the processing for generating the medium-specific key when performing the recording operation or the playback operation.

(6) Variation 6

Although in embodiment 3, the controller key is different for each lot (for each predetermined number of manufactured controllers as a set), the present invention is not limited to this structure.

For example, the controller key may be different for each predetermined number of lots.

Also, the controller key may be specific to the type of controller, not to the lot unit. In this case, model identification information of the controller may be used as controller key identification information.

Also, the controller key may be specific to the card manufacturer that issues the controller.

Also, similarly to the media ID, the controller key may be different for each controller. In this case, the media ID can be used as the controller key identification information.

(7) Variation 7

Although in embodiment 3, the size of the media ID and the controller key is 128 bits, the present invention is not limited to this. Another size may be used.

(8) Variation 8

Although in embodiment 3, in step S1110 shown in FIG. 32, the controller vendor 1700 issues the controller, the vendor ID and the controller key identification information to the card manufacturer 1400 at the same time, the present invention is not limited to this.

For example, (a) the controller vendor 1700 may issue the vendor ID and the controller key identification information upon receiving an order from the card manufacturer 1400, and (b) the controller vendor 1700 may issue the controller upon manufacture of the controller.

Also, the vendor ID may be issued only once, the first time the order for the controller is received from the card manufacturer 1400.

(9) Variation 9

In embodiment 3, in steps S1115 and S1117 of FIG. 32 and step S1203 of FIG. 38, the center 1600 generates the card device key, the apparatus device key, and the encrypted media key group according to the order from the card manufacturer 1400 and the device manufacturer 1500, the present invention is not limited to this structure.

For example, (a) the center 1600 may generate and store, in advance, the card device key, the apparatus device key, and the encrypted media key group, and (b) issue the stored contents according to an order from the card manufacturer 1400 or the device manufacturer 1500. This structure enables the center 1600 to promptly issue the card device key, the apparatus device key, and the encrypted media key group in response to an order from the card manufacturer 1400 or the device manufacturer 1500.

(10) Variation 10

Although in embodiment 3, after implementing the controller 1910 in the memory card 1100 (S1112 of FIG. 32), the card manufacturer 1400 orders the card device key (S1113 of FIG. 32), the present invention is not limited to this structure.

For example, (a) the card manufacturer 1400 may order the card device key from the card manufacturer 1600 upon receiving the vendor ID and the controller key identification information from the controller vendor 1700 (S1111 of FIG. 32).

(11) Variation 11

Although in embodiment 3, an example is described of a case in which the recording medium is a memory card, the recording medium may be any recording medium including a memory unit and a memory control semiconductor device.

(12) Variation 12

In embodiments 2 to 3 and the variations thereof, the encrypted media key group 1840 includes a plurality of pairs, each pair is made up of a card device ID or an apparatus device key ID, an encrypted media key, and an encrypted media key to be decrypted is selected according to the card device key ID or the apparatus device key ID. However, the present embodiment is not limited to this. For example, the following structure may be used. The encrypted media key group 1840 may be made up of a plurality of entries, an encrypted media key may be stored in each entry, and calculated from the card device key ID or the apparatus device key ID. According to the address information of the entry, from the encrypted media key group 1840, the encrypted media key corresponding to the card device key ID or the apparatus device key ID is selected. Also, although in embodiments 2 to 3 and the variations thereof, the encrypted media key group is generated by encrypting the media key with use of the card device key or the apparatus device key, the present invention is not limited to this structure. For example, the media key may be encrypted with use of an encryption key generated according to the card device key or the apparatus device key. In this case, the encryption key is generated according to the card device key or the apparatus device key, and the encrypted media key is decrypted with use of the generated encryption key.

Also, although in the embodiments 2 to 3 and the variations thereof, one device key is stored in each of the memory card and the recording/playback device, the present invention is not limited to this. For example, the following structure may be used. A device key set made up of a plurality of device keys is stored in the memory card or the recording/playback device, one device key is selected from the device key set, and the encrypted media key is decrypted with use of the selected device key. Also, technology such as CPRM, which is copyright protection technology for DVDs and SD memory cards, or MKB (Media Key Block) technology used in AACS, which is copyright protection technology for Blu-ray Disks, may be applied to configuring the encrypted media key group.

(13) Variation 13

In embodiments 2 to 3 and the variations thereof, the following structure may be used. Information indicating the version of the encrypted media key group is included in the encrypted media key group 1840, and the recording/playback device compares the encrypted media key group implemented therein and the version of the encrypted media key group read from the memory card, and if the version of the self-implemented encrypted media key group is newer, the encrypted media key group of the memory card is updated with use of the self-implemented encrypted media key group. Also, the following structure may be used. Information indicating the version of the encrypted media key group is included in the encrypted media key group 1840, the recording/playback device compares the self-implemented encrypted media key and the version of the encrypted media key read from the memory card, and if the version of the self-implemented encrypted media key group is older, the recording/playback device updates the self-implemented encrypted media key group with use of the encrypted media key group read from the memory card.

(14) Variation 14

In embodiments 2 and 3 and variations thereof, in the media key generation unit and the medium-specific key generation unit of the memory card or the recording/playback device, the encrypted media key group is decrypted with use of the card device key or the apparatus device key, the medium-specific key is generated with use of the obtained media key and the media ID, and mutual authentication is performed with use of this medium-specific key. However, the present invention is not limited to this. For example, an authentication key may be generated according to the media ID by the memory card or the recording/playback device, and mutual authentication may be performed with use of this authentication key.

(15) Variation 15

In embodiments 2 to 3 and the variations thereof, the recording/playback device generates a content key according to the obtained media ID, encrypts the digital content according to the content key, or decrypts the encrypted digital content according to the content key. However, the present invention is not limited to this structure. For example, the following structure may be used. The recording/playback device 1) randomly generates a content key, 2) encrypts the digital content according to the content key, 3) generates an encryption key according to the acquired media ID, 4) encrypts the content key according to the encryption key, 5) stores the encrypted digital content and the encrypted content key in the memory card, or 5) reads the encrypted digital content and the encrypted content key from the memory card, 6) generates the encryption key with use of the acquired media ID, 7) decrypts the encrypted content key according to the encryption key, 8) decrypts the encrypted digital content according to the encrypted content key.

4. Other Variations (1) The following describes a recording/playback system as another variation.

Figure 45:
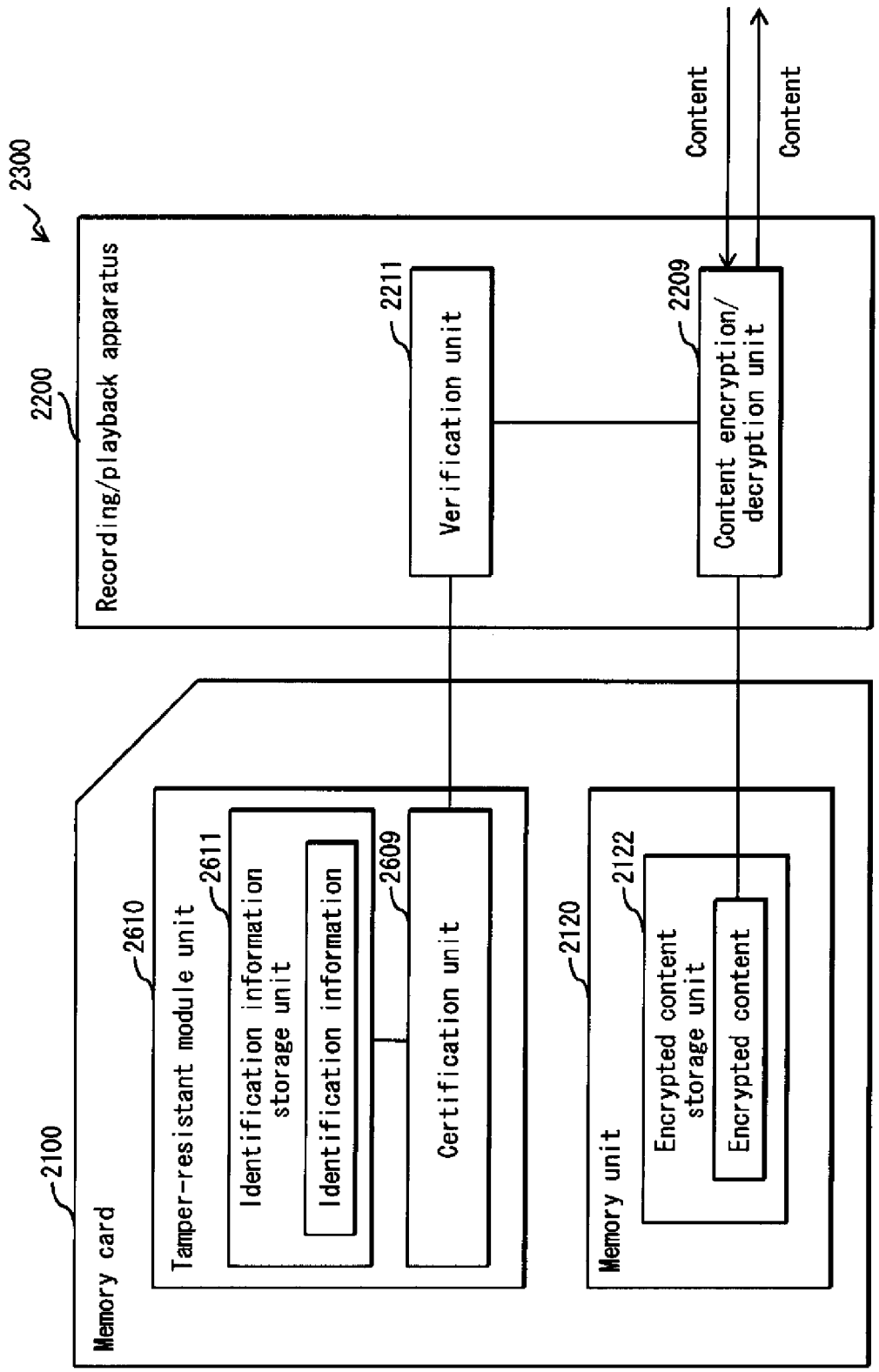
FIG. 45 shows a structure of a recording/playback system 2300 (a memory card 2100 and a recording/playback device 2200) as a variation.

As shown in FIG. 45, a recording/playback system 2300 includes a memory card 2100 that is a recording medium device and a recording/playback device 2200.

The memory card 2100 includes a tamper-resistant module block 2610 and a memory unit 2120. The tamper-resistant module block 2610 includes an identification information storage unit 2611 that stores therein specific identification information that is different for each of the tamper-resistant module blocks 2610, and a certification unit 2609 that generates certification information for certifying the validity of the memory card 2100 according to the identification information stored in the identification information storage unit 2611, and outputs the generated certification information.

The memory unit 2120 includes an encrypted content storage unit 2122 for storing encrypted digital content.

The recording/playback device 2200 includes a verification unit 2211 that acquires the certification information from the memory card 2100, and verifies the validity of the memory card 2100 according to the acquired certification information. If the verification fails, the verification unit 2211 prohibits decryption of the encrypted content or encryption of the decrypted content. The recording/playback device 2200 also includes a content encryption/decryption unit 2209 that, if the verification by the verification unit 2211 succeeds, encrypts the digital content according to the identification information, records the encrypted digital content in the encrypted content storage unit 2122 of the memory card 2100, or decrypts the encrypted digital content read from the encrypted content storage unit 2122 according to the identification information.

Figure 46:
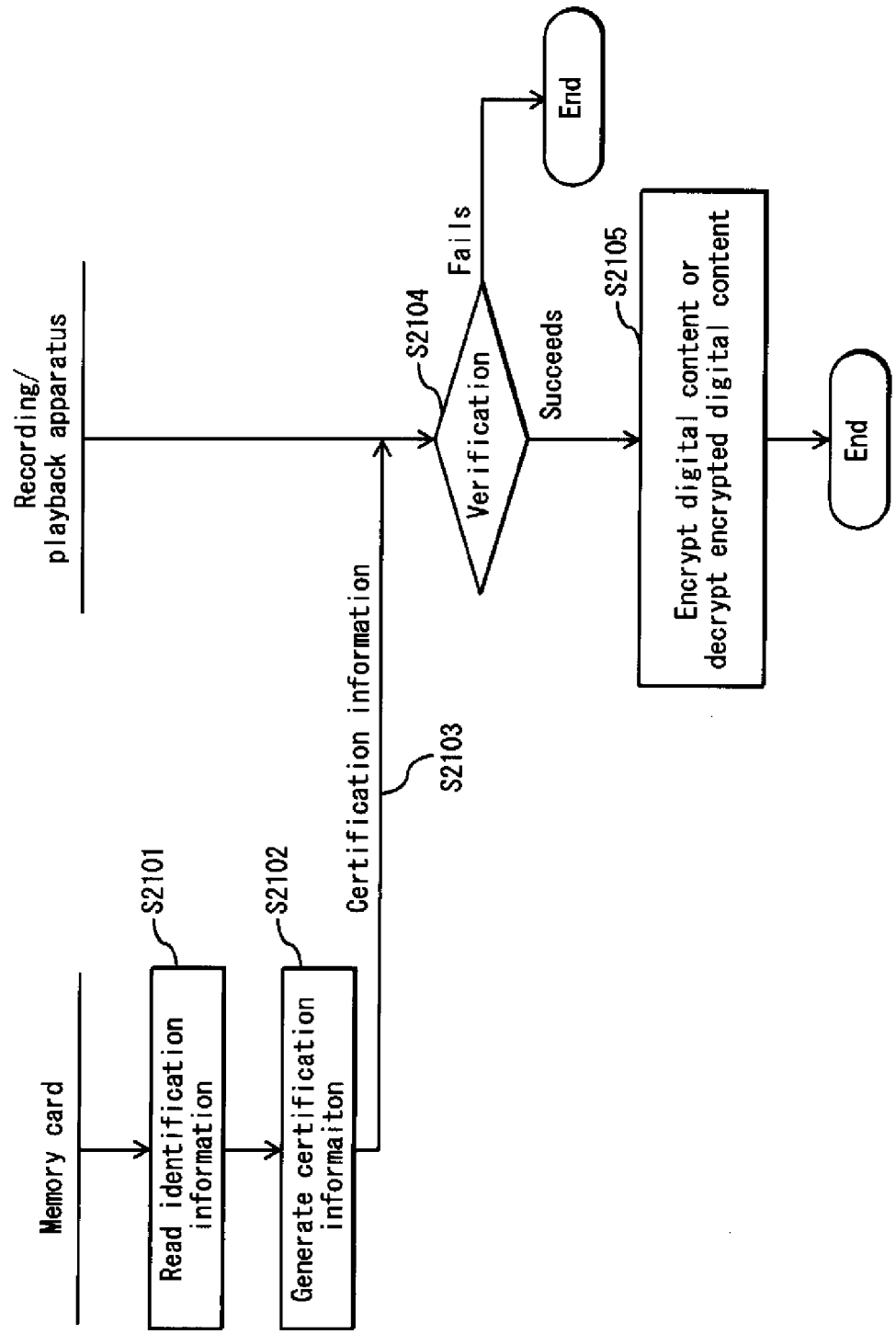
FIG. 46 is a flowchart showing operations of the recording/playback system 2300 (the memory card 2100 and the recording/playback device 2200) as the variation.

Next, the following describes the operation of the recording/playback system 2300 with reference to the flowchart shown in FIG. 46.

The certification unit 2609 of the memory card 2100 reads the identification information from the identification information storage unit 2611 (step S2101). The certification unit 2609 of the memory card 2100 generates the certification information that certifies the validity of the memory card 2100 according to the read identification information (step S2102). The certification unit 2609 of the memory card 2100 outputs the generated certification information to the recording/playback device 2200 (step 2203).

The verification unit 2211 of the recording/playback device 2200 acquires the certification information from the memory card 2100 (step S2103), and verifies the validity of the memory card 2100 according to the acquired certification information (step S2104). If the verification fails ("fails" in step S2104), the verification unit 2211 prohibits the decryption of encrypted content or the encryption of the content. If the verification by the verification unit 2211 succeeds ("succeeds" in step S2104), the content encryption/decryption unit 2209 encrypts the digital content according to the identification information and records the encrypted digital content in the encrypted content storage unit 2122 of the memory card 2100, or decrypts the encrypted digital content read from the encrypted content storage unit 2122 of the memory card 2100 according to the identification information (step S2105).

(2) In embodiments 1 to 3 and the variations thereof, AES is used as an example. However, the present invention is not limited to this structure. For example, instead of AES, another encryption algorithm may be used.

(3) In embodiments 1 to 3 and the variations thereof, a device having the functions both of recording and playing back digital content is described as the recording/playback device. However, the recording/playback device may be realized as a playback device that only has the playback function, or as a recording device that only has the recording function.

(4) In the embodiments 1 to 3 and the variations thereof, the recording/playback device includes a content playback unit. However, the recording/playback device may be configured not to have the playback unit. In this case, the recording/playback device may be configured to decrypt the content encrypted by the content encryption/decryption unit and output the generated decrypted content to an external display device.

(5) In embodiments 1 and 2, the center provides a media ID storage module unit to the card manufacturer. However, the present invention is not limited to this.

A media ID storage module vendor commissioned by the center may manufacture the media ID storage module unit, and provide the media ID storage module unit to the card manufacturer.

In this case, the controller vendor of embodiment 3 may be the same as the media ID storage module vendor.

Also, a tamper-resistant unit may be manufactured by integrating the media ID module unit 610 of embodiment 1 with the control unit 110, and the integrated tamper-resistant unit may be provided by the center, by a media ID storage module vendor commissioned by the vendor, or by a controller vendor that also is the media ID storage module vendor.

(6) In embodiment 3, the controller key that is specific to each of a predetermined unit is realized by hardware logic such as a mask ROM. However, the present invention is not limited to this structure. For example, individual controller keys may be generated for each controller according to a specific parameter that is different for each of a predetermined unit stored by the hardware logic such as the mask ROM, and a specific parameter that is different for each controller stored in an electric fuse, etc.

(7) The above-described devices may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions. Note that the above-described devices are not limited to being computer systems including all the elements of the microprocessor, the ROM, the RAM, the hard disk unit, the display unit, the keyboard, the mouse, etc., and may be constituted from any portion of these.

A portion or all of the constituent elements of the devices of the above embodiments and variations may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

Also, the constituent element units constituting the above-described devices may be realized on individual chips, or some or all of the constituent elements may be integrated on a single chip.

Also, here, an integrated circuit generated as described above may also be referred to as an IC, an LSI, a super LSI, or an ultra LSI, depending on the degree of integration. Also, the integration is not limited to LSI implementation, but instead may be realized by a dedicated circuit or a general-purpose process. After LSI manufacture, the use of a field programmable gate array (FPGA) or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the application of biotechnology is a possibility.

(9) A portion or all of the constituent elements of the devices of the above embodiments and variations may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper-resistant.

(10) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(11) The present invention may be any combination of the above embodiments and variations.

5. Further Remarks

As described above in (a), a recording/playback system according to a first aspect of the present invention is a recording/playback system composed of a recording medium device and a recording/playback device, wherein the recording medium device is tamper-resistant, including in an inner portion thereof an identification information storage unit composed of a generation unit operable to generate identification information specific to the recording medium device, and an authentication unit operable to perform authentication processing with the playback device according to the identification information, and an encrypted content storage unit operable to store the encrypted digital content, the recording/playback device including an authentication unit operable to perform authentication processing with the recording medium device according to the identification information of the recording medium device, and a content encryption unit operable to, if the authentication by the authentication unit succeeds, encrypt the digital content according to the identification information and record the encrypted digital content on the recording medium device, or decrypt the encrypted digital content read from the recording medium device according to the identification information and play back the decrypted digital content.

According to the recording/playback system of the present invention, the authentication unit of the recording/playback device performs authentication processing with the authentication unit of the tamper-resistant identification information storage unit of the recording medium device that has been made tamper-resistant, according to the identification information generated by the identification information generation unit of the tamper-resistant identification information storage unit of the recording/playback device. Then, only if the authentication processing succeeds, the authentication unit of the recording/playback device encrypts the digital content according to the identification information and records the encrypted digital content on the recording medium device, or reads the encrypted digital content recorded on the recording medium device, decrypts the encrypted digital content according to the identification information, and plays back the digital content.

For this reason, even if a manufacturer of recording medium devices illicitly duplicates the identification information of a recording medium device on a plurality of recording medium devices, authentication with the legitimate recording/playback device would fail unless the identification information storage unit is also duplicated in the unauthorized recording/playback device. Also, since the identification information storage unit is tamper-resistant, even a manufacturer of recording medium devices cannot analyze the content. Thus, even if the manufacturer of recording medium devices illicitly duplicates the identification information, encryption and recording of the digital content, or reading and decryption of the encrypted digital content, cannot be performed with use of that recording medium device. That is to say, the effect is realized of enabling preventing illicit actions by manufacturers of recording medium devices.

In the recording/playback system according to a second aspect of the present invention, the authentication unit of the recording medium device includes a manufacturer private key storage unit that stores a manufacturer private key that is different for each manufacturer of the recording medium device, a reception unit that receives a random number from the authentication unit of the recording/playback device, and a signature generation unit that generates a digital signature for the random number and the identification information with use of the manufacturer private key, and the recording medium device further includes a certificate storage unit that stores a manufacturer public key certificate issued with use of a center private key issued from a reliable center for a manufacturer public key corresponding to the manufacturer private key, and a transmission unit that transmits the manufacturer public key certificate to the recording/playback device. The authentication unit of the recording/playback device includes a random number generation unit that generates the random number and transmits the random number to the recording medium device, a center public key storage unit that stores the center public key corresponding to the center private key of the reliable center, a signature verification unit that verifies the validity of the manufacturer public key included in the manufacturer public key certificate received from the recording medium device, and a signature verification unit that performs authentication processing with the recording medium device by verifying the validity of the digital signature data received from the recording medium device with use of the manufacturer public key whose validity had been verified.

According to this structure, in order to perform authentication processing with the recording medium device, the recording/playback device need only store the center public key that is public information in the recording/playback device, and does not need to store private information (such as an apparatus device key that is specific to the recording/playback device) in the recording medium device. Thus, the effect is realized of facilitating implementation of the key storage unit. The reason is that the center public key is information that has been made public, and no security problem occurs even if this information is read by an unauthorized person. For this reason, although there is a need to protect against writing in the center public key storage unit that is public information, there is no need to protect against reading from the center public key storage unit. Meanwhile, there is a need to protect the apparatus device key storage unit that stores private information from both writing thereto and reading therefrom. Accordingly, the more such protection can be simplified, the more implementation is facilitated over a case of using private information.

In the recording/playback system according to a third aspect of the present invention, the recording medium device further includes an encrypted media key group storage unit that stores an encrypted media key group obtained by encrypting the media key with use of a plurality of device keys. The authentication unit of the recording medium device includes a device key storage unit that stores therein a device key that is different for each of the recording/playback devices, a media key generation unit that generates a media key by decrypting the encrypted media key with use of the device key of the recording apparatus device, a medium-specific key generation unit that generates a medium-specific key according to the media key and the identification information, and a mutual authentication unit that performs mutual authentication with the recording/playback device with use of the medium-specific key. The recording/playback device further includes a reading unit that reads the encrypted media key group from the recording medium device. The authentication unit of the recording/playback device includes a device key storage unit that stores therein a device key that is different for each of the recording/playback devices, a media key generation unit that generates a media key by decrypting the encrypted media key with use of the device key of the recording apparatus device, a medium-specific key generation unit that generates a medium-specific key according to the media key and the identification information, and a mutual authentication unit that performs mutual authentication with the recording/playback device with use of the medium-specific key.

According to this structure, the recording/playback device need only perform decryption of the encrypted media key group in order to perform the authentication processing with the recording medium device. For this reason, a common key encryption system such as AES encryption can be used as the algorithm used in decryption. In contrast, in a system that performs authentication using digital signatures, there is a need to use a public key encryption system such as RSA encryption to perform authentication processing (signature verification processing) with the recording medium device. The implementation of the common key encryption system achieves the effect of facilitating implementation of the authentication unit over a recording/playback system using a public key encryption system, since the common key encryption system has a simpler structure than the public key encryption system.

The recording medium device according to a fourth aspect of the present invention is a recording medium device in a recording/playback system composed of a recording medium device, a recording/playback device that records digital content on a recording medium device, or reads and plays back digital content recorded on a recording medium device, wherein the recording/playback device is tamper-resistant, and in an internal portion thereof, includes an identification information storage unit including a generation unit that generates identification information specific to each of the recording medium devices, and an authentication unit that performs authentication processing with the recording/playback device according to the identification information, and also includes an encrypted content storage unit that stores therein encrypted digital content.

In the recording medium device according to a fifth aspect of the present invention, the authentication unit of the recording medium device includes a manufacturer private key storage unit that stores therein a manufacturer private key that is different for each manufacturer of the recording medium devices, a reception unit operable to receive a random number from the authentication unit of the recording/playback device, and a signature generation unit operable to generate digital signature data for the random number and the identification information with use of the manufacturer private key, wherein the recording medium device further includes a certificate storage unit that stores therein a manufacturer public key certificate issued by a reliable center with use of the center private key for the manufacturer public key corresponding to the manufacturer private key.

In the recording medium device according to a sixth aspect of the present invention, the recording medium device further includes an encrypted media key group storage unit that stores therein an encrypted media key group obtained by encrypting the media key with use of a plurality of device keys, wherein the authentication unit of the recording medium device includes a device key storage unit that stores therein a device key that is different for each recording medium device, a media key generation unit that generates a media key by decrypting the encrypted media key with use of the device key of the recording medium device, a medium-specific key generation unit that generates a medium-specific key according to the media key and the identification information, and a mutual authentication unit that performs mutual authentication with the playback device with use of the medium-specific key.

The recording/playback device according to a seventh aspect of the present invention is a recording/playback device in a recording/playback system composed of a recording medium device and a recording/playback device, wherein the recording/playback device includes an authentication unit that performs authentication processing with the recording medium device according to the identification information of the recording medium device, a content encryption unit that, if the authentication by the authentication unit succeeds, encrypts the digital content according to the identification information and records the encrypted digital content on the recording medium device, or decrypts the encrypted digital content read from the recording medium device according to the identification information, and a playback unit that plays back the decrypted digital content.

In the recording/playback device according to an eighth aspect of the present invention, the authentication unit of the recording/playback device includes a random number generation unit that generates a random number and transmits the random number to the recording medium device, a center public key storage unit that stores therein a center public key corresponding to the center private key of the reliable center, a signature verification unit that, with use of the center public key, verifies the validity of the manufacturer public key included in the manufacturer public key certificate received from the recording medium device, and a signature verification unit that performs authentication processing with the playback device that verifies the validity of the signature data with the random number and the identification information received from the recording medium, with use of the manufacturer public key whose validity has been verified.

In the recording/playback device according to a ninth aspect of the present invention, the recording/playback device further includes a reading unit that reads an encrypted media key obtained by encrypting the media key with use of a plurality of device keys, wherein the authentication unit of the recording/playback device includes a device key storage unit that stores therein a device key that is different for each recording/playback device, a media key generation unit that generates a media key by decrypting the encrypted media key issued by the reliable center with use of the device key, a medium-specific key generation unit that generates a medium-specific key according to the media key and the identification information, and a mutual authentication unit that performs mutual authentication with the recording medium device with use of the medium-specific key.

The recording/playback method according to a tenth aspect of the present invention is a recording/playback method used in a recording/playback system composed of a recording medium device and a recording/playback device, wherein the recording medium device is tamper-resistant, including in an inner portion thereof an identification information storage unit composed of a generation unit operable to generate identification information specific to the recording medium device and an authentication unit operable to perform authentication processing with the playback device according to the identification information, and an encrypted content storage unit operable to store the encrypted digital content, the recording/playback method including an authentication step for performing authentication processing with the recording medium device according to the identification information of the recording medium device, and a content encryption step for, if the authentication in the authentication step succeeds, encrypting the digital content according to the identification information and record the encrypted digital content on the recording medium device, or decrypting the encrypted digital content read from the recording medium device according to the identification information and playing back the decrypted digital content.

The recording/playback program according to an eleventh aspect of the present invention is a recording/playback program used in a recording/playback system composed of a recording medium device and a recording/playback device, wherein the recording medium device is tamper-resistant, including in an inner portion thereof an identification information storage unit composed of a generation unit operable to generate identification information specific to the recording medium device and an authentication unit operable to perform authentication processing with the playback device according to the identification information, and an encrypted content storage unit operable to store the encrypted digital content, the recording/playback device including an authentication step for performing authentication processing with the recording medium device according to the identification information of the recording medium device, and a content encryption step for, if the authentication in the authentication step succeeds, encrypting the digital content according to the identification information and record the encrypted digital content on the recording medium device, or decrypting the encrypted digital content read from the recording medium device according to the identification information and play back the decrypted digital content.

The recording/playback program according to the twelfth aspect of the present invention is a recording/playback program recorded on a computer-readable recording medium.

The integrated circuit according to a thirteenth aspect of the present invention is an integrated circuit used in a recording medium device in a recording/playback system composed of a recording medium device and a recording/playback device that records digital content on the recording medium device or reads the digital content recorded on the recording medium device and plays back the read digital content, the integrated circuit being tamper-resistant, including in an inner portion thereof an identification information storage unit composed of a generation unit operable to generate identification information specific to the recording medium device and an authentication unit operable to perform authentication processing with the playback device according to the identification information, and an encrypted content storage unit operable to store the encrypted digital content.

(b) Alternatively, as described above, the recording/playback system according to the first aspect of the present invention may be a recording/playback system composed of a recording medium device and a recording/playback device, wherein the recording medium device is tamper-resistant, including in an inner portion thereof an identification information storage unit composed of a storage unit that stores identification information specific to the recording medium device and an authentication unit operable to perform authentication processing with the playback device according to the identification information, and an encrypted content storage unit operable to store the encrypted digital content, the recording/playback device including an authentication unit operable to perform authentication processing with the recording medium device according to the identification information of the recording medium device, and a content encryption unit operable to, if the authentication by the authentication unit succeeds, encrypt the digital content according to the identification information and record the encrypted digital content on the recording medium device, or decrypt the encrypted digital content read from the recording medium device according to the identification information and play back the decrypted digital content.

According to the recording/playback system of the present invention, the authentication unit of the recording/playback device performs authentication processing with the authentication unit of the tamper-resistant identification information unit of the recording medium device, according to identification information stored by the tamper-resistant identification information storage unit of the recording/playback device. Then, only if the authentication processing succeeds, the digital content is encrypted according to the identification information and recorded on the recording medium device, or the encrypted digital content recorded on the recording medium device is read and, according to the identification information, the encrypted digital content is decrypted and played back.

For this reason, even if a manufacturer of recording medium devices illicitly duplicates the identification information of a recording medium device on a plurality of recording medium devices, authentication with the legitimate recording/playback device would fail unless the identification information storage unit is also duplicated in the unauthorized recording/playback device. Also, since the identification information storage unit is tamper-resistant, even a manufacturer of recording medium devices cannot analyze the content. Thus, even if the manufacturer of recording medium devices illicitly duplicates the identification information, encryption and recording of the digital content, or reading and decryption of the encrypted digital content, cannot be performed with use of that recording medium device. That is to say, the effect is realized of enabling preventing illicit actions by manufacturers of recording medium devices.

In the recording/playback system of a second aspect of the present invention, the recording medium device further includes an encrypted device key storage unit that stores therein an encrypted device key obtained by encrypting a device key that is different for each recording/playback device, with use of a controller key that is different for each recording/playback device, or is different for each predetermined number of recording medium devices as a set, and an encrypted media key group storage unit that stores therein an encrypted media key group obtained by encoding the media key with use of each of a plurality of device keys, wherein the authentication unit of the recording medium device includes a controller key storage unit that stores therein the controller key, a decryption unit that decrypts the encrypted device key with use of the controller key, a device key storage unit that stores therein the device key decrypted by the decryption unit, a media key generation unit that generates the media key by decrypting the encrypted media key group, a medium-specific key generation unit that generates a medium-specific key according to the identification information, a mutual authentication unit that performs mutual authentication with the recording/playback device with use of the medium-specific key, the recording/playback device further including a read unit for reading the encrypted media key group from the recording medium device, the authentication unit of the recording/playback device including a device key storage unit for storing therein a device key that is different for each recording/playback device, a media key generation unit that generates a media key by decrypting the encrypted media key group with use of the device key of the recording/playback device, a medium-specific key generation unit that generates the medium-specific key according to the identification information, and a mutual authentication unit that performs mutual authentication with the recording medium device with use of the medium-specific key.

According to this structure, the recording/playback device need only decrypt the encrypted media key group to perform authentication processing with the recording medium device. This enables using common code encryption such as AES encryption as the algorithm used in decryption. In contrast, in a system that performs authentication with use of a digital signature, in order for the recording/playback device to perform authentication processing (signature verification processing) with the recording medium device, there is a need to use public key encryption such as RSA encryption. The implementation of the common key encryption system achieves the effect of facilitating implementation of the authentication unit over a recording/playback system using a public key encryption system, since the common key encryption system has a simpler structure than the public key encryption system.

The recording medium device according to a third aspect of the present invention is a recording medium device in a recording/playback system composed of a recording medium device, a recording/playback device that records digital content on a recording medium device, or reads and plays back digital content recorded on a recording medium device, wherein the recording/playback device is tamper-resistant, and in an internal portion thereof, includes an identification information storage unit including a generation unit that generates identification information specific to each of the recording medium devices, and an authentication unit that performs authentication processing with the recording/playback device according to the identification information, and also includes an encrypted content storage unit that stores therein encrypted digital content.

The recording medium device according to a fourth aspect of the present invention further includes an encrypted device key storage unit that stores therein an encrypted device key obtained by encrypting a device key that is different for each recording medium device, with use of a controller key that is different for each recording/playback device, or is different for each predetermined number of recording medium devices as a set, and an encrypted media key group storage unit that stores therein an encrypted media key group obtained by encoding the media key with use of each of a plurality of device keys, wherein the authentication unit of the recording medium device includes a controller key storage unit that stores therein the controller key, a decryption unit that decrypts the encrypted device key with use of the controller key, a device key storage unit that stores therein the device key decrypted by the decryption unit, a media key generation unit that generates the media key by decrypting the encrypted media key group, a medium-specific key generation unit that generates a medium-specific key according to the identification information, and a mutual authentication unit that performs mutual authentication with the recording/playback device with use of the medium-specific key.

The recording/playback device according to a fifth aspect of the present invention is a recording/playback device in a recording/playback system composed of a recording medium device and a recording/playback device, the recording/playback device including an authentication unit operable to perform authentication processing with the recording medium device according to the identification information of the recording medium device, a content encryption unit operable to, if the authentication by the authentication unit succeeds, encrypt the digital content according to the identification information and record the encrypted digital content on the recording medium device, or decrypt the encrypted digital content read from the recording medium device according to the identification information and play back the decrypted digital content, and a playback unit that plays back the decrypted digital content.

In the recording/playback device according to a sixth aspect of the present invention, the recording/playback device further includes a reading unit that reads an encrypted media key obtained by encrypting the media key with use of each of a plurality of device keys, wherein the authentication unit of the recording/playback device includes a device key storage unit that stores therein a device key that is different for each recording/playback device, a media key generation unit that generates a media key by decrypting the encrypted media key issued by the reliable center with use of the device key, a medium-specific key generation unit that generates a medium-specific key according to the media key and the identification information, and a mutual authentication unit that performs mutual authentication with the recording medium device with use of the medium-specific key.

The recording/playback method according to the seventh aspect of the present invention is a recording/playback method used in a recording/playback system composed of a recording medium device and a recording/playback device, wherein the recording medium device is tamper-resistant, including in an inner portion thereof an identification information storage unit composed of a storage unit that stores therein identification information specific to the recording medium device and an authentication unit operable to perform authentication processing with the playback device according to the identification information, and an encrypted content storage unit operable to store the encrypted digital content, the recording/playback method including an authentication step for performing authentication processing with the recording medium device according to the identification information of the recording medium device, and a content encryption step for, if the authentication in the authentication step succeeds, encrypting the digital content according to the identification information and record the encrypted digital content on the recording medium device, or decrypting the encrypted digital content read from the recording medium device according to the identification information and play back the decrypted digital content.

The recording/playback program according to an eighth aspect of the present invention is a recording/playback program used in a recording/playback system composed of a recording medium device and a recording/playback device, wherein the recording medium device is tamper-resistant, including in an inner portion thereof an identification information storage unit composed of a storage unit storing therein identification information specific to the recording medium device and an authentication unit operable to perform authentication processing with the playback device according to the identification information, and an encrypted content storage unit operable to store the encrypted digital content, the recording/playback device including an authentication step for performing authentication processing with the recording medium device according to the identification information of the recording medium device, and a content encryption step for, if the authentication in the authentication step succeeds, encrypting the digital content according to the identification information and record the encrypted digital content on the recording medium device, or decrypting the encrypted digital content read from the recording medium device according to the identification information and play back the decrypted digital content.

The recording/playback program according to the ninth aspect of the present invention is a recording/playback program recorded on a computer-readable recording medium.

The integrated circuit according to a tenth aspect of the present invention is an integrated circuit used in a recording medium device in a recording/playback system composed of a recording medium device and a recording/playback device that records digital content on the recording medium device or reads the digital content recorded on the recording medium device and plays back the read digital content, the integrated circuit being tamper-resistant, including in an inner portion thereof an identification information storage unit composed of a storage unit that stores therein identification information specific to the recording medium device and an authentication unit operable to perform authentication processing with the playback device according to the identification information, and an encrypted content storage unit operable to store the encrypted digital content.

(C) Also, as described above, one aspect of the present invention is a recording/playback system including a recording medium device and a recording/playback apparatus. The recording medium device includes an identification information storage unit and a memory unit including an encrypted content storage unit that stores encrypted content. The recording/playback apparatus includes a verification unit of the recording medium apparatus including an authentication unit that performs authentication processing with the recording medium device according to the identification information acquired from the recording medium apparatus, and a content encryption/decryption unit that, when the authentication by the authentication unit has succeeded, encrypts the digital content according to the identification information and stores the encrypted digital content in the encrypted content storage unit of the recording medium apparatus, or decrypts the encrypted digital content read from the encrypted content storage unit of the recording medium apparatus based on the identification information. The identification information storage unit is tamper-resistant, and includes therein an identification information storage unit that stores therein identification information that is different for each identification information storage unit, and an authentication unit that performs authentication with the recording/playback apparatus based on the identification information.

Here, the memory unit in the recording medium device further includes an encrypted device key storage unit that stores therein an encrypted device key, and an encrypted media key storage unit that stores therein an encrypted media key group. The identification information storage unit is a controller that is a semiconductor device. In addition to the identification information storage unit and the authentication unit, the controller includes a controller key storage unit that stores therein a controller key that is different for each controller or different for each predetermined number of controllers as a set, a decryption unit that decrypts the encrypted device key acquired from the encrypted device key storage unit of the memory unit with use of the controller key of the controller key storage unit, a media key generation unit that generates a media key according to the device key decrypted by the decryption unit and the encrypted media key group of the encrypted media key group storage unit of the memory unit, and a medium-specific key generation unit that generates the medium-specific key according to the media key generated by the media key generation unit and the identification information of the identification information storage unit. In addition to the authentication unit, the verification unit in the recording/playback device includes a device key storage unit that stores therein a device key that is different for each recording/playback device, a media key generation unit that generates a media key according to the encrypted media key group acquired from the encrypted media key storage unit of the recording media device, and a medium-specific key generation unit that generates a medium-specific key according to the media key generated by the media key generation unit and the identification information acquired from the recording medium device. The encrypted device key is generated by encrypting the device key that is different for each recording medium device with use of the controller key. The encrypted media key group is generated by encrypting the media key with use the device key of the recording medium device, or a plurality of device keys of the recording/playback device. The authentication unit of the recording medium device and the authentication unit of the recording/playback device may respectively perform mutual authentication with use of the medium-specific keys of generated by the respective medium-specific key generation units.

Here, the memory unit in the recording medium device further includes an encrypted media key storage unit that stores therein an encrypted media key group. The identification information storage unit includes, in addition to the identification information storage unit and the authentication unit, a device key storage unit that stores therein a device key that is different for each identification information storage unit, a media key generation unit that generates a media key according to the device key of the device key storage unit and the encrypted media key group of the encrypted media key group storage unit of the memory unit, and a medium-specific key generation unit that generates the medium-specific key according to the media key generated by the media key generation unit and the identification information of the identification information storage unit. The recording/playback device further includes a reading unit that reads the encrypted media key group from the recording/playback device. In addition to the authentication unit, the verification unit in the recording/playback device includes a device key storage unit that stores therein a device key that is different for each recording/playback device, a media key generation unit that generates a media key according to the encrypted media key group acquired from the encrypted media key storage unit of the recording media device, and a medium-specific key generation unit that generates a medium-specific key according to the media key generated by the media key generation unit and the identification information acquired from the recording medium device. The encrypted media key group is generated by encrypting the media key with use the device key of the recording medium device, or a plurality of device keys of the recording/playback device. The authentication unit of the recording medium device and the authentication unit of the recording/playback device may respectively perform mutual authentication with use of the medium-specific keys of generated by the respective medium-specific key generation units.

Here, in addition to the identification information storage unit and the authentication unit, the identification information storage unit of the recording medium device includes a manufacturer private key storage unit that stores therein a manufacturer private key that is different for each manufacturer of the recording medium device, and a signature generation unit that receives a random number from the verification unit of the recording/playback device and generates digital signature data for the random number and the identification information of the identification information storage unit with use of the manufacturer private key. The memory unit of the recording medium device further includes a manufacturer public key certificate storage unit that stores therein a manufacturer public key certificate issued by a reliable center with use of the center private key for the manufacturer public key corresponding to the manufacturer private key. The verification unit of the recording/playback device further includes a random number generation unit that generates a random number and transmits the random number to the recording medium device, a center public key storage unit that stores therein a center public key corresponding to the center private key from the reliable center, a signature verification unit that, with use of the center public key of the center public key storage unit, verifies the validity of the manufacturer public key included in the manufacturer public key certificate received from the recording medium device, and a signature verification unit that performs authentication processing with the recording medium device by verifying, with use of the manufacturer public key whose validity has been verified by the signature verification unit, the validity of the digital signature data received from the recording medium device.

Other aspects are a computer and storage device in a center that is a key issuing authority, a manufacturing device for a computer, a storage device and a controller in a controller vendor, a manufacturing device for a computer, a storage device, and a recording medium device in a manufacturer of recording medium devices, and a method for manufacturing the recording medium devices in a system formed from a network to which computers are connected. This method includes the following steps: (a) the controller vendor 1) generates identification information that is different for each controller to be manufactured, 2) generates a controller key that is different for each controller or for each predetermined number of controllers as a set, 3) stores the generated identification information in the identification information storage unit of the controller, 4) stores the generated controller key in the controller key storage unit of the controller, 5) transmits, to the center that is the key issuing authority, a vendor ID that is information identifying the controller vendor, controller key identification information that is information identifying the controller key, and the controller key, (b) the center 6) receives, from the controller vendor, the vendor ID that is information identifying the controller vendor, the controller key identification information that is information identifying the controller key, and the controller key, 7) stores the received vendor ID, controller key identification information, and controller key in the storage unit, (c) the recording medium device manufacturer 8) transmits order information for controllers to the controller vendor, (d) the controller vendor 9) receives the order information for controllers from the recording medium device manufacturer, 10) issues, to the recording medium device manufacturer, the controller ID, the vendor ID of the controller vendor, and the controller key identification information of the controller key stored in the controller, (e) the recording medium device manufacturer (11) receives, from the controller vendor, the controller, the vendor ID, and the controller key identification information, 12) implements the received controller in the recording medium device, 13) transmits, to the center, card device key order information including the vendor ID and the controller key identification information received from the controller, (f) the center 14) receives, from the recording medium device manufacturer, the card device key order information, 15) generates a device key according to the card device key order information, 16) acquires, from the storage unit, a controller key corresponding to the controller key identification information, encrypts the generated device key with use of the acquired controller key, thus generating the encrypted controller key, 17) generates an encrypted media key group obtained by encrypting the media key with use of a plurality of device keys of the recording medium device or a device key of the recording/playback device, 18) issues the generated encrypted device key to the recording medium device manufacturer and the encrypted media key group to the recording medium device manufacturer, (g) the manufacturer of the recording medium device 19) receives the encrypted device key and the encrypted key group from the center, and 20) stores the encrypted card device key received from the center in the encrypted card device key storage unit of the memory of the recording medium device, and stores the encrypted media key group received from the center in the encrypted media key group storage unit.

INDUSTRIAL APPLICABILITY

The recording/playback system of the present invention is useful as a recording/playback system for recording or playing back digitally broadcast or digitally distributed digital content, and has a function of protecting a copyright of digital content that has been digitally broadcast or digitally distributed, so that even if a card manufacturer manufactures an unauthorized memory card, the recording/playback system can distinguish whether the memory card is an authorized memory card or an unauthorized memory card, and only when the memory card is an authorized memory card, the recording/playback system records the digital content or plays back the recorded digital content.

REFERENCE SIGNS LIST 100 memory card
100a memory card
100c memory card
300 recording/playback system
300a recording/playback system
300c recording/playback system
400 card manufacturer
400a card manufacturer
500 device manufacturer
500a device manufacturer
600 center
600a center
600c center
1100 memory card
1200 recording/playback device
1300 recording/playback system
1400 card manufacturer
1500 device manufacturer
1600 center
1700 controller vendor
2100 memory card
2200 recording/playback device
2300 recording/playback system

The invention claimed is:

1. A recording-playback system comprising:
a recording medium device; and a recording-playback device, wherein
the recording medium device includes a controller that is tamper-resistant and a memory, the controller includes:
a first non-transitory memory that stores commands, an embedded value generated by a controller vendor, and a private key generated by a center; and
a first hardware processor that executes the commands to cause the controller to operate as
a generation subunit that generates controller-specific identification information by using the value stored in the first non-transitory memory and a value obtained from a center for a manufacturer of the recording medium device, the value obtained from the center stored in a center-issued value storage subunit of the memory, and
a certification subunit that, by using the private key stored in the first non-transitory memory, digitally signs the controller-specific identification information generated in the first hardware processor and a random number obtained from the recording-playback device so as to generate certification information that certifies a validity of the recording medium device, and outputs the generated certification information,
the memory includes
an encrypted content storage subunit that stores therein an encrypted digital content,
a public certificate storage subunit that stores a public key certificate generated by the center, the public key certificate being a digital signature for a public key corresponding to the private key stored in the first non-transitory memory, and
the center-issued value storage subunit that stores the value obtained from the center, wherein
the controller-specific identification information is a digital signing target of the certification subunit,
the controller-specific identification information is a media ID identifying the recording medium device, and
the value generated by the controller vendor is a portion of a media ID, and the value obtained from the center for the manufacturer of the recording medium device is the remaining portion of the media ID, and
the recording-playback device includes:
a second non-transitory memory that stores a program, and
a second hardware processor that executes the program to cause the recording-playback device to operate as:
a first verification unit that acquires the public key certificate from the recording medium device, and performs a digital signature verification for the public key certificate so as to verify the validity of the public key, a second verification unit that acquires the certification information from the recording medium device, performs a digital signature verification for the certification information so as to verify the validity of the recording medium device by using the verified public key corresponding to the private key, according to (i) the random number, (ii) the controller-specific identification information, and (iii) the acquired certification information, and when the verification has failed, prohibits a decrypting of the encrypted digital content or an encrypting of a digital content; and a content encryption-decryption that, when the verification has succeeded, encrypts, according to the controller-specific identification information, the digital content and records the encrypted digital content in the encrypted content storage subunit, or decrypts the encrypted digital content read from the encrypted content storage subunit according to the controller-specific identification information.

2. The recording-playback system of claim 1 wherein the certification subunit further:

stores therein a manufacturer private key of the manufacturer of the recording medium device, and receives the random number from the second verification unit of the recording-playback device, and generates the certification information by digitally signing the received random number and the controller-specific identification information stored in an identification information storage subunit, with use of the manufacturer private key, the memory further includes a manufacturer public key certificate storage unit that stores therein a manufacturer public key certificate issued by a center to the manufacturer public key corresponding to the manufacturer private key, with use of a center private key of the center, the second verification unit further:

generates the random number and transmit the generated random number to the recording medium device, stores therein a center public key corresponding to the center private key of the center, verifies a validity of the manufacturer public key included in the manufacturer public key certificate received from the recording medium device, and verifies the validity of the recording medium device by verifying a validity of the certification information by applying a digital signature verification to the certification information received from the recording medium device, along with the random number and the identification information.

3. The recording-playback system of claim 1, wherein the certification subunit further:

stores therein a manufacturer private key of the manufacturer of the recording medium device; and receives the random number from the verification unit of the recording-playback device, and generates the certification information by digitally signing the received random number and the controller-specific identification information with use of the manufacturer private key, the verification unit further:

stores therein a manufacturer public key of the manufacturer of the recording medium device, and (i) acquires the certification information from the recording medium device, digitally signs the random number, the controller-specific identification information, and the acquired certification information with use of the manufacturer public key, (ii) when the verification has failed, prohibits the decrypting of the encrypted content or the encrypting of the digital content, and (iii) when the verification has succeeded, acquires the controller-specific identification information, and the content encryption-decryption unit, when the verification has succeeded, encrypts the digital content or decrypt the encrypted digital content according to the controller-specific identification information.

4. The recording-playback system of claim 1, wherein the controller vendor is a manufacturer of the controller included in the recording medium device, and the center for the manufacturer of the recording medium device is a key issuing authority.

5. The recording-playback system of claim 4, wherein a media manufacturer manufactures the recording medium device.

6. A recording-playback device capable of decrypting an encrypted content stored by a recording medium device and encrypting and recording a content on the recording medium device, the recording medium device comprising:

a non-transitory memory that stores a program; and a hardware processor that executes the program to cause the recording-playback device to operate as:

a first verification unit that acquires the public key certificate from the recording medium device, and performs a digital signature verification for the public key certificate so as to verify the validity of the public key, a second verification unit that (i) acquires the certification information that certifies the validity of the recording medium device, the certification information being generated using a private key to digitally sign controller-specific identification information and a random number obtained from the recording-playback device, and (ii) performs a digital signature verification of the certification information so as to verify the validity of the recording medium device by using the verified public key corresponding to the private key, according to the random number, the controller-specific identification information, and the acquired certification information, and (iii) when the verification has failed, prohibits a decrypting of the encrypted digital content or an encrypting a digital content; and a content encryption-decryption unit that, when the verification has succeeded, encrypts the digital content according to the controller-specific identification information and records the encrypted digital content in the recording medium device, or to decrypt the encrypted digital content read from the recording medium device, and the controller-specific identification information is the digital signing target of the certification subunit, the controller-specific identification information is generated using an embedded value generated by a controller vendor and a value obtained from a center for a manufacturer of the recording medium device, the controller-specific identification information is a media ID identifying the recording medium device, and the value generated by the controller vendor is a portion of the media ID, and the value obtained from the center for the manufacturer of the recording medium device is the remaining portion of the media ID.

7. The recording-playback device of claim 6, wherein the second verification unit further:

stores therein a manufacturer public key of the manufacturer of the recording medium device, and (i) acquires the certification information by digitally signing the controller-specific identification information and the random number with use of a manufacturer private key of the manufacturer of the recording medium device, (ii) verifies the acquired certification information with use of the manufacturer public key, (iii) when the verification has failed, prohibits decrypting of the encrypted digital content or the encrypting of the digital content, and (iv) when the verification has succeeded, acquires the controller-specific identification information, and the content encryption-decryption unit, when the verification has succeeded, encrypts the digital content or decrypts the encrypted digital content according to the controller-specific identification information.

8. The recording-playback device of claim 7, wherein
the verification unit of the recording-playback device further generates the random number and transmits the generated random number to the recording medium device, and the verification unit acquires the certification information generated by digitally signing a concatenation of the identification information and the random number, and verifies the validity of the recording medium device according to the concatenation of the acquired certification information and the generated random number.

9. The recording-playback device of claim 7, wherein the verification unit further:
stores therein a center public key corresponding to a center private key of a reliable center, and
with use of the center public key of the center public key storage unit, verifies the validity of the manufacturer public key included in the manufacturer public key certificate received from the recording medium device.

10. The recording-playback device of claim 6, wherein
the controller vendor is a manufacturer of the controller included in the recording medium device, and
the center for the manufacturer of the recording medium device is a key issuing authority.

11. The recording-playback device of claim 10, wherein a media manufacturer manufactures the recording medium device.

12. A recording-playback method used by a recording-playback device that decrypts encrypted content stored by a recording medium device and encrypts and records a content on the recording medium device, the recording-playback method comprising:
acquiring the public key certificate from the recording medium device, and performing a digital signature verification for the public key certificate so as to verify the validity of the public key;
acquiring the certification information that certifies the validity of the recording medium device from the recording medium device, the certification information being generated using a private key to digitally sign controller-specific identification information and a random number obtained from the recording-playback device;
performing a digital signature verification for the certification information so as to verify the validity of the recording medium device by using the verified public key corresponding to the private key, according to the random number, the controller-specific identification information, and the acquired certification information;
when the verification has failed, prohibiting a decrypting of the encrypted digital content or an encrypting of a digital content; and when the verification has succeeded, encrypting the digital content according to the controller-specific identification information and recording the encrypted digital content in the encrypted content storage subunit, or decrypting the encrypted digital content read from the encrypted content storage subunit, and the controller-specific identification information is the digital signing target of the certification subunit, the controller-specific identification information is generated using an embedded value generated by a controller vendor and a value obtained from a center for a manufacturer of the recording medium device, the controller-specific identification information is a media ID identifying the recording medium device, and the value generated by the controller vendor is a portion of the media ID, and the value obtained from the center for the manufacturer of the recording medium device is the remaining portion of the media ID.

13. The recording-playback method of claim 12, wherein
the controller vendor is a manufacturer of the controller included in the recording medium device, and
the center for the manufacturer of the recording medium device is a key issuing authority.

14. The recording-playback device of claim 13, wherein a media manufacturer manufactures the recording medium device.

15. A non-transitory computer-readable recording medium having a computer program recorded thereon, the computer program being used in a recording-playback device capable of decrypting an encrypted content stored by a recording medium device and encrypting and recording a content on the recording medium device, the computer program causing a computer to execute a method comprising:
acquiring the public key certificate from the recording medium device, and performing a digital signature verification for the public key certificate so as to verify the validity of the public key;
acquiring the certification information that certifies the validity of the recording medium device from the recording medium device, the certification information being generated using a private key to digitally sign controller-specific identification information and a random number obtained from the recording-playback device;
performing a digital signature verification for the certification information so as to verify the validity of the recording medium device by using the verified public key corresponding to the private key, according to the random number, the controller-specific identification information, and the acquired certification information;
when the verification has failed, prohibiting a decrypting of the encrypted digital content or an encrypting of a digital content; and
when the verification has succeeded, encrypting the digital content according to the controller-specific identification information and recording the encrypted digital content in the encrypted content storage subunit, or decrypting the encrypted digital content read from the encrypted content storage subunit according to the controller-specific identification information, and the controller-specific identification information is the digital signing target of the certification subunit, the controller-specific identification information is generated using an embedded value generated by a controller vendor and a value obtained from a center for a manufacturer of the recording medium device, the controller-specific identification information is a media ID identifying the recording medium device, and the value generated by the controller vendor is a portion of the media ID, and the value obtained from the center for the manufacturer of the recording medium device is the remaining portion of the media ID.

16. An integrated circuit capable of decrypting an encrypted content stored by a recording medium device and encrypting and recording a content on the recording medium device, the integrated circuit comprising:

a first verification circuit that acquires the public key certificate from the recording medium device, and performs a digital signature verification for the public key certificate so as to verify the validity of the public key, a second verification circuit that (i) acquires the certification information that certifies the validity of the recording medium device from the recording medium device, the certification information being generated using a private key to digitally sign controller-specific identification information and a random number obtained from the recording-playback device, (ii) performs a digital signature verification so as to verify the validity of the recording medium device by using the verified public key corresponding to the private key, according to the random number, the controller-specific identification information, and the acquired certification information, and (iii) when the verification has failed, prohibit a decrypting of the encrypted digital content or an encrypting of a digital content; and a content encryption-decryption circuit that, when the verification has succeeded, encrypts the digital content according to the controller-specific identification information and records the encrypted digital content in the encrypted content storage subunit, or decrypts the encrypted digital content read from the encrypted content storage subunit according to the controller-specific identification information, and the controller-specific identification information is the digital signing target of the certification subunit, the controller-specific identification information is generated using an embedded value generated by a controller vendor and a value obtained from a center for a manufacturer of the recording medium device, the controller-specific identification information is a media ID identifying the recording medium device, and the value generated by the controller vendor is a portion of the media ID, and the value obtained from the center for the manufacturer of the recording medium device is the remaining portion of the media ID.

17. A recording medium device, comprising:
a tamper-resistant controller; and
a memory, wherein
the tamper-resistant controller includes:
a non-transitory memory that stores commands and an embedded value generated by a controller vendor; and
a hardware processor that executes the commands to cause the controller to operate as a generation subunit operable to generate controller-specific identification information by using the value stored in the non-transitory memory and a value obtained from a center for a manufacturer of the recording medium device, the value obtained from the center stored in a center-issued value storage subunit of the memory and a certification subunit that, by using the private key stored in the non-transitory memory, digitally signs the controller-specific identification information generated in the non-transitory memory and a random number obtained from a recording-playback device so as to generate certification information that certifies a validity of the recording medium device, and outputs the generated certification information, the memory includes an encrypted content storage subunit that stores therein an encrypted digital content, a public certificate storage subunit that stores a public key certificate generated by the center, the public key certificate being a digital signature for a public key corresponding to the private key stored in the non-transitory memory, and the center-issued value storage subunit that stores the value obtained from the center, wherein the controller-specific identification information is the digital signing target of the certification subunit, the controller-specific identification information is a media ID identifying the recording medium device, and the value generated by the controller vendor is a portion of a media ID, and the value obtained from the center for the manufacturer of the recording medium device is the remaining portion of the media ID.

18. The recording medium device of claim 17, wherein the certification subunit further generates the certification information, as response data, according to the controller-specific identification information and challenges data from the recording-playback device, which is the random number, with use of the private key, and outputs the generated certification information as the response data.

19. The recording medium device of claim 17, wherein the certification subunit further:

stores therein a manufacturer private key of the manufacturer of the recording medium device as the private key, and with use of the manufacturer private key, generates the certification information.

20. The recording medium device of claim 19 wherein the signature generation subunit acquires the random number from the recording-playback device, and digitally signs a concatenation of the controller-specific identification information and the acquired random number.

21. The recording medium device of claim 19 wherein the memory of the recording medium device further includes a manufacturer public key certificate storage subunit that stores therein a manufacturer public key certificate issued from a center, with use of a center private key of the center, to a manufacturer public key corresponding to the manufacturer private key.

22. The recording medium device of claim 7, wherein the controller-specific identification information is generated according to vendor-specific information unique to the controller vendor, in addition to the value generated by the controller vendor and the value received from the center for the manufacturer of the recording medium device.

23. The recording medium device of claim 17, wherein the controller vendor is a manufacturer of the controller included in the recording medium device, and the center for the manufacturer of the recording medium device is a key issuing authority.

24. The recording medium device of claim 23, wherein a media manufacturer manufactures the recording medium device.

25. The recording medium device of claim 17, wherein the controller-specific identification information is generated by concatenating the value generated by the controller vendor and the value obtained from the center for the manufacturer of the recording medium device.

* * * * *